(12) United States Patent
Freed et al.

(10) Patent No.: US 6,269,473 B1
(45) Date of Patent: Jul. 31, 2001

(54) METHOD AND APPARATUS FOR THE DEVELOPMENT OF DYNAMICALLY CONFIGURABLE SOFTWARE SYSTEMS

(75) Inventors: Erik Freed, Berkeley; Brian Anderson, Albany; Thomas James Noyes; Richard John Saville, both of San Francisco, all of CA (US)

(73) Assignee: Evolve Software, Inc., San Francisco, CA (US)

( * ) Notice: Subject to any disclaimer, the term of this patent is extended or adjusted under 35 U.S.C. 154(b) by 0 days.

(21) Appl. No.: 09/046,624

(22) Filed: Mar. 23, 1998

(51) Int. Cl.[7] ...................................................... G06F 9/45
(52) U.S. Cl. ................................. 717/1; 717/2; 717/10; 703/22; 706/919; 706/45; 709/332
(58) Field of Search ......................... 395/701, 500.43, 395/500.38; 706/919–920, 922, 45–47, 55, 50, 49; 707/104, 103; 709/300, 317, 332; 717/1, 2, 10; 703/22

(56) References Cited

U.S. PATENT DOCUMENTS

| | | | |
|---|---|---|---|
| 5,361,360 | * | 11/1994 | Ishigami et al. ...................... 395/712 |
| 5,437,025 | * | 7/1995 | Bale et al. ............................ 707/103 |
| 5,539,862 | * | 7/1996 | Short et al. ........................... 706/45 |
| 5,581,663 | * | 12/1996 | Zlotin et al. .......................... 706/46 |
| 5,671,415 | * | 9/1997 | Hossain ................................ 395/701 |
| 5,706,405 | * | 1/1998 | Short et al. ........................... 706/45 |
| 5,797,135 | * | 8/1998 | Whalen et al. ........................ 706/53 |
| 5,812,849 | * | 9/1998 | Nykiel et al. ......................... 395/701 |
| 5,842,192 | * | 11/1998 | Garcia et al. ......................... 706/45 |
| 5,960,200 | * | 9/1999 | Eager et al. .......................... 395/705 |
| 5,987,247 | * | 11/1999 | Lau ...................................... 395/702 |

OTHER PUBLICATIONS

Endler et al., "Programming Generic Dynamic Reconfigurations for Distributed Applications," International Workshop on Configurable Distributed Systems, pp. 68–79, 1992.*

(List continued on next page.)

Primary Examiner—Kakali Chaki
Assistant Examiner—Tuan Q. Dam
(74) Attorney, Agent, or Firm—Limbach & Limbach, LLP

(57) ABSTRACT

A software modeling environment is presented that supports the development and execution of software that can be dynamically configured. This is achieved by introducing a design-time object modeling construct called a dynamically configurable type (DCT) that supports the subdivision of an object into a plurality of subsets of semantics and allows dynamic merging of these semantic subsets together in different combinations in order to allow the resultant object to exhibit different semantics over time to serve different purposes. Specific process modeling constructs are included which take advantage of this semantic merging capability. Also included are other supporting design-time and run-time constructs and services. One embodiment of the present invention allows this software modeling environment to be integrated into a standard software development environment, enhancing the modeling capabilities already present.

89 Claims, 78 Drawing Sheets

OTHER PUBLICATIONS

Oueichek et al., "Dynamic Configuration Management in the Guide Object–oriented Distribute System," Proceedings of the Third Int'l. Conf. on Configurable Distributed Systems, pp. 28–35, May 6–8, 1996.*

Warren et al., "A Model for Dynamic Configuration which Preserves Application Integrity," Proceedings of the Third Int'l. Conf. on Configurable Distributed Systems, pp. 81–88, May 6–8, 1996.*

James Rumbaugh, "OO MYTHS: Assumptions From a Language View", Joop, Modeling & Design, Feb. 1997, (4 pp.).*

Harold Ossher and William Harrison, "Combination of Inheritance Hierarchies", OOPSLA '92, Conference Proceedings, Oct. 18–22 1992, Vancouver, British Columbia, Canada, ACM Sigplan Notices, vol. 27, No. 10 (pp. 25–40).*

William Harrison and Harold Ossher, "Subject–Oriented Programming (A Critique of Pure Objects)", OOPSLA '93, Conference on Object Oriented Programming Systems, Languages, and Applications, Conference Proceedings, Sep. 26–Oct. 1 1993, ACM Sigplan Notices, vol. 28, No. 10 (pp. 411–428).*

* cited by examiner

METHOD AND APPARATUS FOR THE DEVELOPMENT OF DYNAMICALLY CONFIGURABLE SOFTWARE SYSTEMS

RELATED DOCUMENTS

This application includes a Microfiche Appendix which contains a computer listing of code that implements a specific embodiment of the present invention. The appendix includes copyrighted material consisting of four (4) sheets of microfiche with a total of three-hundred thirty-four (334) frames. The copyright owner has no objection to the facsimile reproduction by anyone of the patent document or the patent disclosure, as it appears in the Patent and Trademark Office patent file or records, but otherwise reserves all copyright rights whatsoever in the appendix.

BACKGROUND OF THE INVENTION

1. Field of the Invention

The present invention relates to the object oriented software and in particular, it relates to designing and developing highly configurable software systems. More specifically, the present invention relates to a set of programming constructs and services that provide high levels of modularity, abstraction, dynamism and configurability.

2. Description of the Related Art

Supporting the creation of full-featured, easy to use, high performance, flexible, and reliable software that effectively and efficiently automates enterprise business practices is arguably the highest dollar value challenge for software development environments. Over the last few decades, software development environments have attempted to meet this challenge with increasingly sophisticated software models and the tools to support them. However they have not gotten better fast enough. Enterprise software problems have increased in complexity much faster than enterprise software solutions have increased in simplicity.

Modern enterprise software problems are generally more complex due to broader automation requirements, a changing user profile, and increased business practice diversity and dynamism. Additionally there is huge market pressure to reduce the costs and delivery schedules for adapting this more sophisticated enterprise software to meet specific, as opposed to generic business requirements. The technology industry so far has not responded with the appropriate software development environments to meet this new world's challenges.

1. Forces Driving Complexity

Previous enterprise software was expected to automate a single static business process. Today, enterprise software is expected to automate multiple, dynamic business processes. In addition, enterprise software is expected to provide seamless inter-operability and information access across these processes.

The users of enterprise applications have also changed. Previously, enterprise software was expected to maximize the productivity of inexpensive unskilled information-workers. Now the expectation is to maximize the productivity of expensive skilled knowledge-workers. This means enterprise software is expected to deliver complicated general unstructured information access and analysis.

As well, business practices in a modem enterprise have gotten more diverse and dynamic. The business world where enterprise software exists has changed dramatically because of more diversity in choice of business practices, more sophisticated and complicated business practices, more frequent mergers and acquisitions, greater expansion into global marketplaces, frequent governmental regulatory changes, more sophisticated continuous improvement BPR processes and increased economic uncertainty.

Enterprise software is not only meant to be usable in these complicated scenarios, but to drive them as a key player in these now normal enterprise processes.

2. Customer Requirements

These forces driving change in the business environment have a profound affect on the requirements of the enterprise software that supports these businesses. Current development methods are not well equipped to handle them.

Currently software is designed to meet the needs of potential customers by analyzing the generic requirements of a broad set of customers. These requirements then become input to the software development process where a version of the software that meets those requirements is generated. As new or changing requirements are captured from potential a or existing user base, a new version of the software is generated as quickly as possible to meet them.

While this procedure works adequately for limited, relatively static domains and customer profiles, it is a big problem for other domains and customer profiles. Customers often have a complex mixture of specific-requirements that generic requirements cannot capture. Further, their requirements may not be consistent across all of their users. As well, requirements may change faster than the vendor's development process can meet them. And some customer requirements may be so specific that it is not cost effective for the vendor to attempt to meet them.

This problem has been understood for a while within the industry. As a result, many customers develop their own software in-house because their vendors cannot solve these problems.

If the software vendor is not willing to accept the loss of sales to customers who are not well served by generic software, two approaches are applicable; static-customization, and dynamic-configuration.

Static customization is defined as a software package that is provided with a form of a development environment so that the customer's or vendor's developers can statically modify the package to match their requirements. This strategy includes the component style architectures built on standard object models such as OLE, Java beans etc. This approach has several drawbacks. The customer must either have in-house development expertise or hire hard to find and expensive consultants. It is slow and expensive and has to be repeated as requirements change. And lastly, when the vendor supplies upgrades to software, the customer's customizations often have to be performed over again.

Dynamic Configuration is defined as a software package that is provided with a broad and/or deep set of run-time options that can be set by the customer and that dynamically configure the software to meet customer specific requirements. This approach also has its drawbacks. Current software development environments do not adequately support the complex modeling problem presented by this high degree of run-time configurability because the software-models they are based on do not provide adequate solutions to the problems faced.

3. Limitations of Software Models

Current software models do not support solutions to the problems posed by a modem enterprise software system. They fall short in important features of modularity, abstraction, dynamism and configurability that are vital to application developers. This makes sense in that the traditional history of software environments is that they are first designed to meet the requirements of low-level system implementers and only for application level developers second. For example, both Java and C++ were first designed to solve system level problems. Software environments are typically implemented by people with low-level system expertise, and they naturally craft solutions for the problems that they face and understand.

In many ways, the entities that system designers model and the entities that application designers model are inherently different. System entities are short-lifetime, static and single-dimension. Application entities are long-lived, dynamic and multi-dimensional. System software deals with entities that have a lifetime that is linked to the process in which they are running. For instance, a memory-buffer is gone from the system's memory the second the process is stopped. In contrast, an application entity typically has a lifetime that is linked to real world external entities. They have a lifetime that is as long as the application needs to keep track of those real-world entities. An employee entity needs to be continuously managed even if the system that created it is modified. This aspect of persistence at the application level software leads to many new and different challenges as compared to system level software.

Another difference between system and application software is that application software faces run-time evolution. This is the natural and inescapable fact that real world persistent entities change their roles over time. An employee may be a contractor one day, and a full-time employee the next. A company may be bought by another and face different policies. System software typically has no concept of run-time evolution because the entities that they represent do not change significantly in their lifetimes. Application software has to deal with this problem constantly.

Still another difference between system and application software is that application software faces much more difficult design-time evolution. This is the also inescapable fact that software applications change over time, and the entities they create along the way are a persistent legacy for each new version of the software to manage. The software system design needs to be able to change, but still contain the same entities. System software as long it implements the same protocol or application programmer's interface (API), can store its internal memory buffers in any form it choses.

Unlike system software, application software has much more complicated multi-dimensional entities. The requirements of an employee type with all of the variations that customers require to meet their policies, and all of the contexts in which they are used, is substantively different from the system memory-buffer. A normal application entity is used in many processes, in different countries, different user-interface styles, by people of different expertise, and in many different business environments. This is a major multi-dimension challenge.

Current software models have a substantial list of shortcomings in more than a few areas. The current discussion of these shortcomings will focus on object-models because they are the current state of the art.

One of the challenges that an object system designer faces is that they want to modify the objects they have designed to achieve new objects that are different from the previous objects, but still act like the previous objects when they want them to. They also want to be able to re-use the code they wrote for these objects. This is commonly done by using inheritance hiearchies; but there is a large drawback to this technique: inheritance is static in nature. Once an object is created, it is restricted to one definition for its complete lifetime. This is not a problem for system software, but presents a substantial problem for application software.

There are other techniques that can be used with object models such as delegation or parameterization; but since the object models do not support these techniques directly, they leave the software designer to provide these features for themselves. This demands unnecessary complex code with all of the inherent time and expense. What is needed is, a software model that supports a more dynamic object specialization technique.

In addition, these object modifications may be needed in more than one area simultaneously. Object models are one-dimensional. One cannot talk about dimensions of an object, because the current models do not directly support designs that divide up an object into multiple dimensions. For example in standard object models, an employee's compensation logic is not kept separate from its project-skills. Therefore these object models force the software designer to utilize informal techniques that break down when the number of dimensions becomes large. What is needed is, a software model that supports objects that are divided up into multiple dimensions in a formal sense so they do not have to rely on hard to manage, ad-hoc and unstructured techniques.

Object models have little or no concept of process modeling; the modeling of how groups of objects are used to implement the business operations they were designed to support. In standard object models, process models are constructed with a preponderance of code external to the group of objects in non-re-usable and complex manners. What is needed is, a software model that supports process models that are contained inside the object so they are re-usable and can be managed as part of the object.

Finally the history of software models is the history of the increased application of two techniques: modularity and abstraction. Modularity is the dividing of a large problem into multiple easier to handle smaller ones. Abstraction is the separation of what is desired, from how it is implemented in the specification of an object. But object models have inherent flaws in modularity and abstraction. A substantial amount of the code, associated with an object's usage that could be internal to the object, must be implemented in multiple external objects. At best this causes dramatically reduced re-use. At worst, it causes the real code for an object, which is the combination of what is rightly inside, and what ended up outside, to be confusing and fragile. This is a major flaw just where object models should be strongest. What is needed, is a software model that permits all the code associated with an object to be placed directly in that object. This would allow the software designer to achieve higher modularity and abstraction.

SUMMARY OF THE INVENTION

The present invention is a software modeling environment that supports the development of software that can be extensively configured at run-time. In addition to extensive configurability at run-time, the present invention provides high levels of modularity, abstraction, and dynamism. This is achieved by introducing a new type of modeling construct called a dynamically configurable type (DCT) and its corresponding run-time instantiation, the dynamically configurable object (DCO), as well as other supporting design-time and run-time constructs and services.

A method for developing dynamically configurable software systems (DCSS) includes several steps according to a preferred embodiment of the invention. First one or more dynamically configurable types ((DCTs) are created and defined. Each DCT includes an associated plurality of collections of semantics. The DCTs are collectively representative of a software solution to a problem. The DCTs are used to model the run-time behavior of dynamically configurable objects (DCOs) which are instances of the DCTs. Second, for each DCT, a plurality of property sets are defined and created such that each property set is representative of a collection of semantics. Third, for each of the property sets which are defined and created, a number of properties are defined and created. Fourth, for each property, a feature set containing a set of features is defined and created. Each feature set defines combinable characteristics of the associated property. Fifth, for each feature in the feature set, a feature kind which defines a kind of combinable characteristic that the feature represents in the associated property is created and defined. Sixth, a precedence is assigned for each feature. The precedence determines how the feature will be chosen when compared to another feature of the same kind in properties of the same identity in other property sets during the merge. In other words, the present invention merges different features of the properties in the property sets to implement a software solution to the problem based on precedence, wherein the precedence identifies the feature that is the result of the merge. The identity for the properties being merged is shared among a common set of identities based on a shared identity in a common set of identities defined by a union of identities of all the property sets from each of those DCTs that are on an inclusive path from a specific DCT to a most general DCT wherein the DCTs are disposed in a hiearchy. Finally, the present invention couples the DCTs to services that at run-time will support DCOs. This includes the ability to combine the property-sets together in permutations at run-time in order to allow the DCOs to have different semantics over time to serve different purposes so that a software solution based on the DCOs allows dynamic configurability.

In another aspect of the present invention the software modeling environment is integrated into a standard software development environment, enhancing the modeling capabilities already present.

These and other features and advantages of the present invention will be understood upon consideration of the following detailed description of the invention and the accompanying drawings.

DETAILED DESCRIPTION OF THE INVENTION

Figure 1:
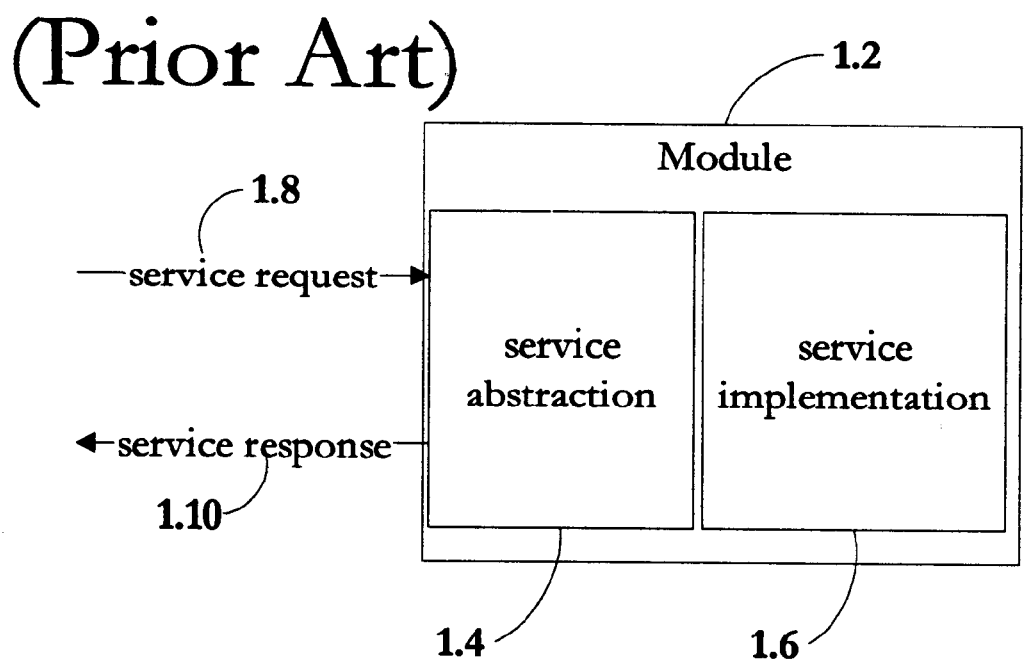
FIG. 1 depicts a decomposition of modules according to the prior art.

In response to the challenge posed by the increased complexity of enterprise software systems, the present invention provides new enhancements to software models and the design and run-time services necessary to use them. This new software model both provides improvements on existing software modeling techniques and introduces new software modeling techniques that better support dynamic and configurable software. We call this model the Dynamically Configurable Software Model (DCSM) and a software system based on this model a Dynamically Configurable Software System (DCSS). In terms of prior art object oriented modeling systems, the present invention allows one to define a plurality of objects that divide their semantics into a plurality of subsets of semantics, and then allows these subsets to be combined together in different combinations at run-time. This is in order to allow the defined objects to have different semantics over time to serve different purposes, the end result of which is that a software solution based on the defined objects allows dynamic configurability.

We will begin by presenting the core concepts of the DCSM and then present the preferred embodiment of those concepts in a software system.

1. Concepts of a DCSM 1.1 Basic Software Modeling Techniques

Useful software models leverage the following techniques: abstraction and modularity. The higher the level of modularity and abstraction, the greater the simplicity and reusability of the software they can be used to create. The DCSM of the present invention has significant improvements over other software models in terms of modularity and abstraction.

Abstraction is defined as the expression of a software solution in a form that is as close as possible to what is natural to the user of a module's services. This means a higher level of expression free from affectations of the service provider's internal implementation. This is analogous to the societal strategy of hiearchical-interactions. When a chief executive officer asks a trusted vice-president to open a sales office without being overly specific about the details, the chief executive officer can handle greater levels of complexity at his level of abstraction without getting bogged down in the details of implementation at lower abstraction levels. In the same way, software modules ideally interact with each other in manners that are as distilled and efficient as possible, each module only interacting in ways that are intuitive and natural.

Modularity is defined as the subdivision of a software solution into multiple interrelated smaller solutions called modules. Each of these modules provide some well-defined capability or service to other modules. This subdivision strategy allows software developers to attack multiple simpler problems instead of one large problem. This is analogous to the societal strategy of division-of-labor. The fact that a doctor provides different services than an engineer or accountant is critical to allowing society to solve large problems. Society would break down if everyone had to know how to do everything. In the same way, software modules are experts in providing the services they are designed to provide.

As shown in FIG. 1, a module 1.2, consists of a service-abstraction 1.4, which is the abstraction of the module's services, and a service-implementation 1.6, which is the hidden data structures and algorithms used by the module to implement those abstracted services. The implementation of external modules can make a service-request 1.8, to this module by appealing to its service-abstraction 1.4, which then in turn appeals to its own internal service-implementation 1.6, to fulfill this request. The response to this service-request 1.8, is returned from the service-implementation 1.6, via the service-abstraction 1.4, and back to external module as a service-response 1.10. It is assumed that this module's service-implementation 1.6, in order to achieve its ends, is in turn making one or more service requests to the service-abstraction of other modules.

Figure 2:
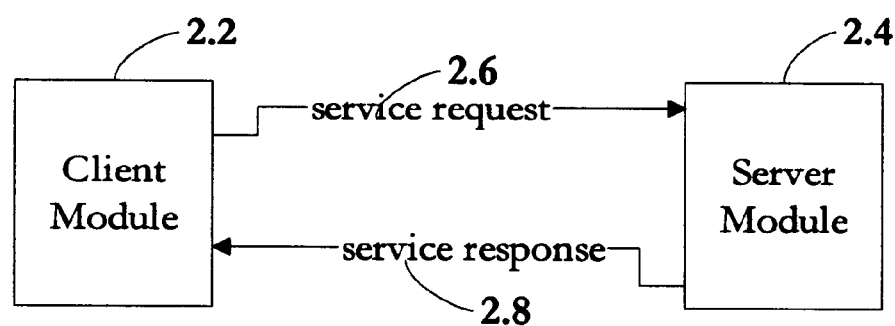
FIG. 2 depicts client and server module relationships according to the prior art.

As shown in FIG. 2, the module whose implementation is making the service-request 2.6, and receiving the service-response 2.8, is called the client-module 2.2, and the module providing the abstracted service is called the server-module 2.4.

Most modern prior-art software models use a form of module called an object. In C++ or Java, the interface or class definitions of the object becomes the service-abstraction and the method bodies become the service-implementation. The typical object has additional modeling features such as identity and polymorphism, but these are not central to the concepts of modularity and abstraction. In the following discussion, replacing the term module with the term object may be useful to some readers.

1.2 Dynamic configuration software modeling techniques

Further, for a software model to be useful in implementing a DCSS, it preferably includes the following advanced concepts; configurability and dynamism. The higher the level of configurability and dynamism, the greater the simplicity and re-usability of the software solution, especially when the software is expected to have the ability to meet both broad and specific enterprise requirements. The DCSM has unique capabilities in terms of configurability and dynamism.

Configurability is defined as the expression of a software solution in a form such that each module has multiple possible configurations that can be selected and combined to suit the needs of the module's internal state, the needs of the user of the module, and the needs of the module's environment. These combinations are preferably directly supported as separate constructs so that as a module subdivides the problem of the total software system, the configurations subdivide the problem of the module. This is analogous to an individual who can learn multiple dimensions of behavior that can be changed on request to meet changing needs of that individual, or individuals and groups interacting with that individual. For instance, an employee module has different problems to solve when it becomes a full-time as opposed to a contract worker, or when the employee is being promoted or assigned to a team, or lastly when the company redefines compensation policies during a merit review.

Dynamism is defined as the expression of a software solution in a form that can change at run-time. This means that the module should be able to express configurability while the software is being executed. This is analogous to an individual who can change behaviors instantly as necessary in response to dynamically changing demands of the individual, or individuals and groups interacting with that individual. This allows configuration, as described above, to be applied not only during design-time but also during runtime. For example, it is useful to be able to have new company policies be enforced without re-compiling the software, or to have an employee module reflect its change in status from "individual contributor" to "manager" as the promotion happens.

Figure 3:
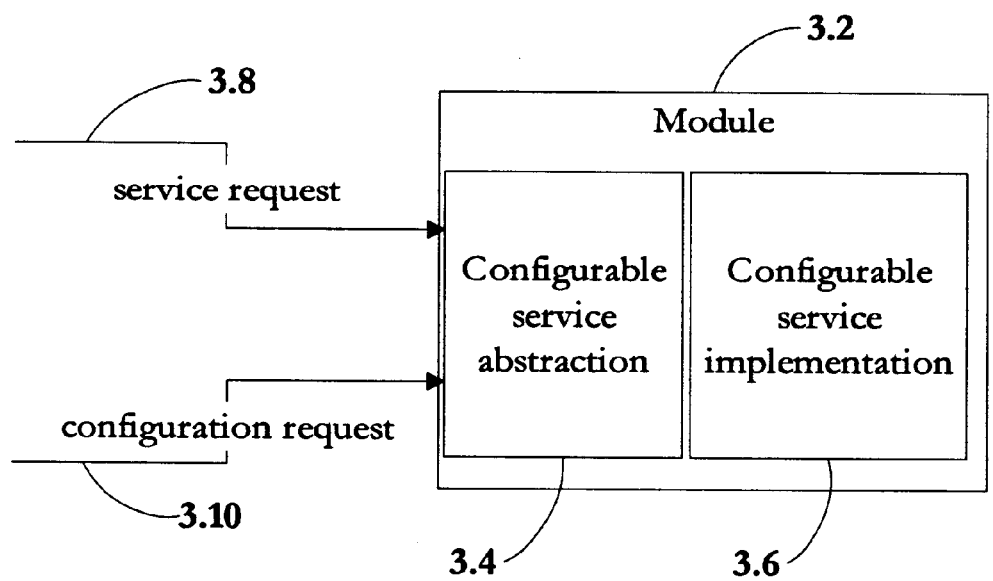
FIG. 3 depicts a dynamically configurable module according to a preferred embodiment of the present invention.

These concepts as they exist in the DCSM are shown in FIG. 3. A dynamically-configurable-module 3.2, includes a configurable-service-abstraction 3.4, which is the abstraction of the module's services, and a configurable-service-implementation 3.6, which includes the hidden data structures and algorithms used by the module to implement those abstracted services. The implementation of external modules can make a standard service-request 3.8, to this module by appealing to, in this case, a configurable-service-abstraction 3.4, which like before, appeals to what is now a configurable-service-implementation 3.6, to fulfill the request. Again it is assumed that this module's configurable-service-implementation 3.6, in order to achieve it's ends, is in turn making one or more service requests to the service-abstraction of other modules which may or may not be dynamically configurable modules.

The addition of a configuration-request 3. 10, allows external client module implementations and the internal server module's implementations to request the module to undergo configuration.

1.3 Configurable Abstractions Versus Configurable Implementations

When designing a software model to include dynamic configurability, one can provide configurable-abstractions, configurable-implementations or both.

The abstraction of a module is commonly considered its type and defines a public interface that is a definition of services that it can provide to other modules. A configurable module can keep this type invariant upon configuration or allow it to change. If it is allowed to change, then the dynamically configurable model supports dynamic-typing. This is considered a useful feature in some scenarios, but it can introduce problems for the users and implementers of dynamically configurable modules. Many systems, for reasons of design-time ease of use and run-time performance, have static type models for modules, and in the face of dynamic-typing, break down or become difficult to use. Although the preferred embodiment of the present invention does not include dynamic typing features, this could be added to the embodiment of the present invention as an option for software designers. This would likely take the form of a multiple-interfaces approach as is currently provided in Microsoft OLE object model, and the Javasoft Java language.

Figure 4:
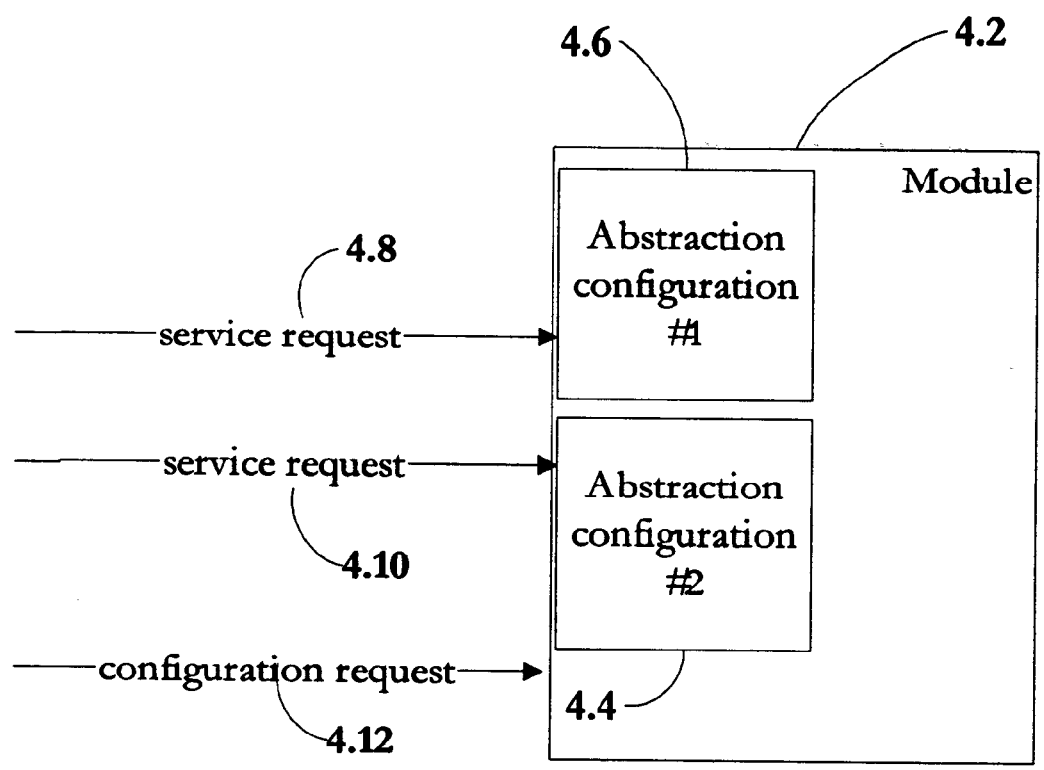
FIG. 4 depicts configurable abstraction according to a preferred embodiment of the present invention.

A dynamically configurable model configurable-abstraction is shown in FIG. 4. A dynamically-configurable-module 4.2, is shown which has multiple abstraction configurations 4.6, 4.4. The external client module can make its service request to either abstraction configuration. If it wants to access configuration 4.6, it would make a configuration-request 4.12, specifying configuration 4.6, and then a service-request 4.8. If it wants to access configuration 4.3, it would make a configuration-request 4.12, specifying configuration 4.4, and then a service-request 4. 10. For each abstraction configuration, 4.6, 4.4, the external client module would have to specify in its implementation an alternate type, potentially through a subclass down-casting mechanism as in Java or C++, or an interface request mechanism as in OLE or Java. The configuration-request 4.12, coming from the client could be combined with this type change mechanism.

The implementation of a module, since it is hidden by the abstraction and thus is not exposed to external modules, is more easily made to be configurable. What happens inside a module is by definition more flexible in most software models. This means that a given abstraction will have multiple possible implementations depending on the current configuration of the implementation.

Figure 5:
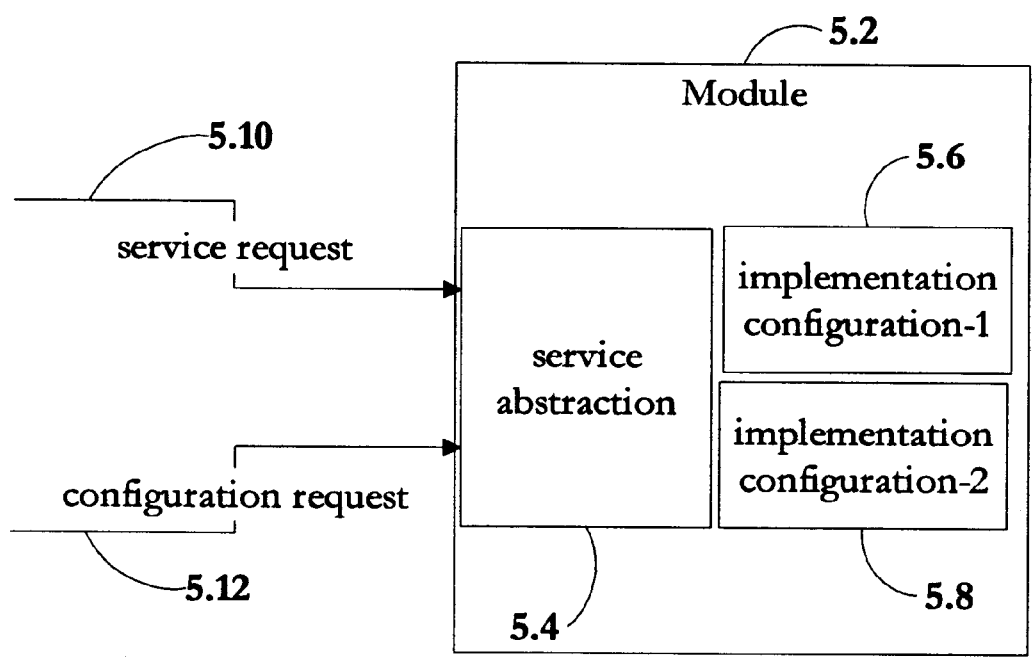
FIG. 5 depicts configurable implementation according to a preferred embodiment of the present invention.

The DCSM configurable-implementation is shown in FIG. 5. A dynamically-configurable-module 5.2, is shown which has multiple implementation configurations 5.6, 5.8. If the client module wants to access implementation-configuration 5.6, it would make a configuration-request 5.12, specifying implementation-configuration 5.6, and then a service-request 5.10. If it wants to access implementation-configuration 5.8, it would make a configuration-request 5.12, specifying implementation-configuration 5.8, and then the service-request 5.10.

1.4 Configurable Modules and Identity

In most modern software models, particularly object models, each module represents an entity that has an identity. A module can usually be tested, via its identity, to see if it represents the same entity as another module. Some software-models such as C++ and Java, have a restriction that there is only one module per identity. If some other sense of identity is desired, then it is up to the software designer to create their own representation of identity.

In the DCSM, since modules are configurable, this restriction would not make sense. It is desirable, in some scenarios, to have the same entity represented by more than one module, each module in a different configuration. So, in the preferred embodiment of the present invention, there can be multiple modules in different configurations that each represent the same entity.

1.5 The Three Forms of Dynamic Configuration

In a software model that includes dynamic configuration there are three usages identified: client, server, and global. Each is a subtly different way to make use of dynamic configuration capabilities.

Figure 6:
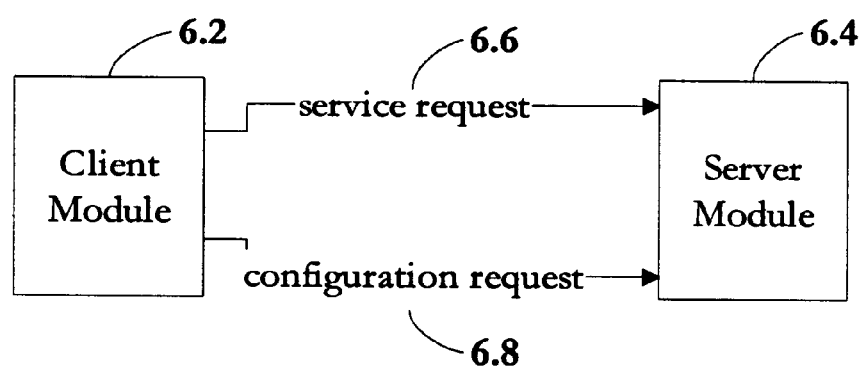
FIG. 6 depicts client driven configuration according to a preferred embodiment of the present invention.

FIG. 6 illustrates client-driven configuration. In this figure, a client-module 6.2, can make a configuration-request 6.8, to a server-module 6.4 before it makes a service-request, 6.6. This is done when the client wants to use the server for a specific purpose. This is an important distinction from other software models where a module is oblivious to what it is being used for. It is further explained below how this enhances modularity and abstraction.

Figure 7:
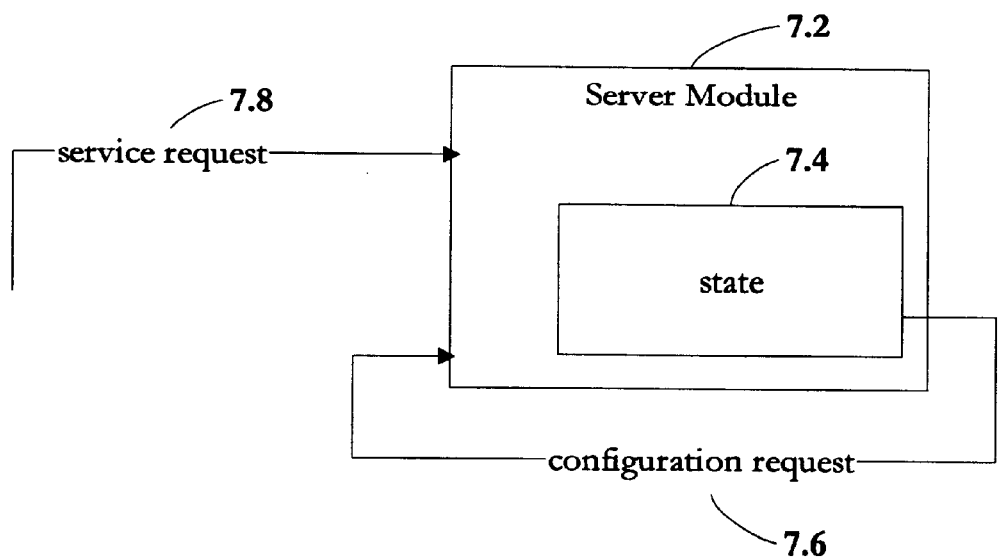
FIG. 7 depicts server driven configuration according to a preferred embodiment of the present invention.

FIG. 7 illustrates server-driven configuration. In this figure, a server-module 7.2, can make a configuration-request 7.6, to itself based on its own internal state 7.4 before a client makes a service-request 7.8. This allows a server to react to updates to its relationships and attributes by reconfiguring itself. Again it is further explained below how this provides a form of dynamic type migration.

Figure 8:
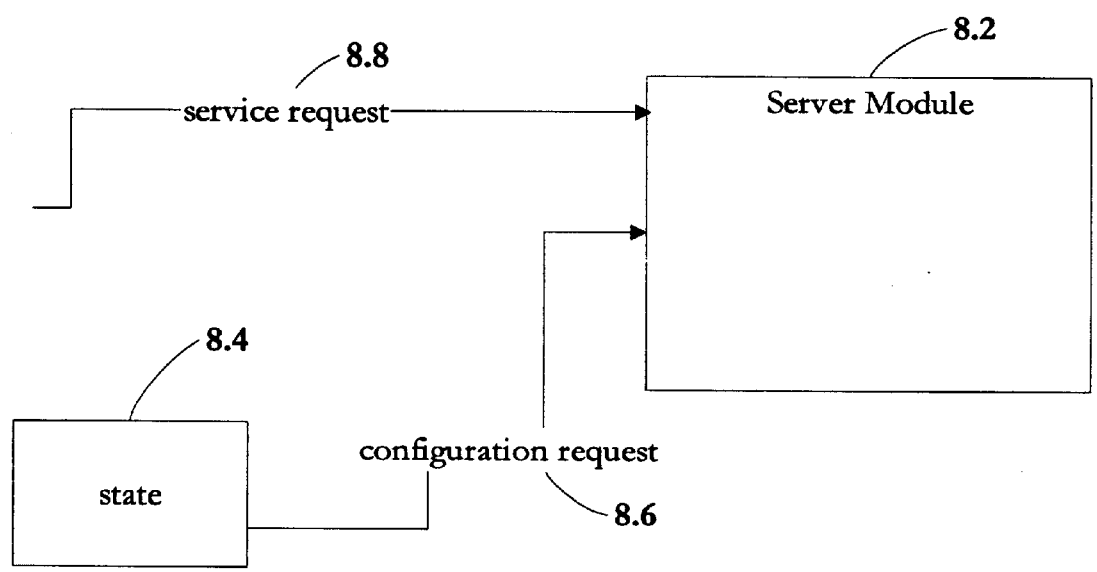
FIG. 8 depicts globally driven configuration according to a preferred embodiment of the present invention.

FIG. 8 illustrates globally-driven configuration. In this figure, before a service-request, 8.8 is made, a server-module 8.2, can have a configuration-request 8.6, made to it based on some external state 8.4. This allows a software system to have modules undergo configuration based on shared, global state. It is further explained below how this provides application configuration capability.

1.6 Context Dependent and Independent Semantics

A software model also has to address the fact that the semantics associated with a given module are divided into context-dependent and context-independent forms. The placement and division of instances of these forms of semantics between modules is critical to providing maximum modularity and abstraction in a software model. A software model with dynamic configurability, the DCSM, can handle these two forms with improved modularity and abstraction and unique capabilities.

Context-independent semantics are defined to be those semantics of a module that do not change no matter what module it has as a client, and no matter how that client module intends to use the services of that particular module. Context-independent semantics include State (relationships and attributes), Behavior (methods) and Persistence (database storage).

The above semantics could be treated as context-dependent but typically are not. It is not that important in practice to have these be variant under context change, and it creates some implementation problems that are better avoided. In a typical object-oriented model such as Java or C++, only the first two semantics; state and behavior are captured in its form of module, the object.

Context-dependent semantics are defined to be those semantics of a module that change depending on what module it acting as a client, and how that client module intends to use the services of that particular module. Context-dependent semantics include, but are not limited to, those associated with user interface, event, and transactions management.

Context-dependent semantics typically make up a substantial part of the semantics of a given module, sometimes being larger than the context-independent part. In a typical object-oriented model such as Java or C++, none of these context-dependent semantics are captured in its form of module, the object.

Figure 9:
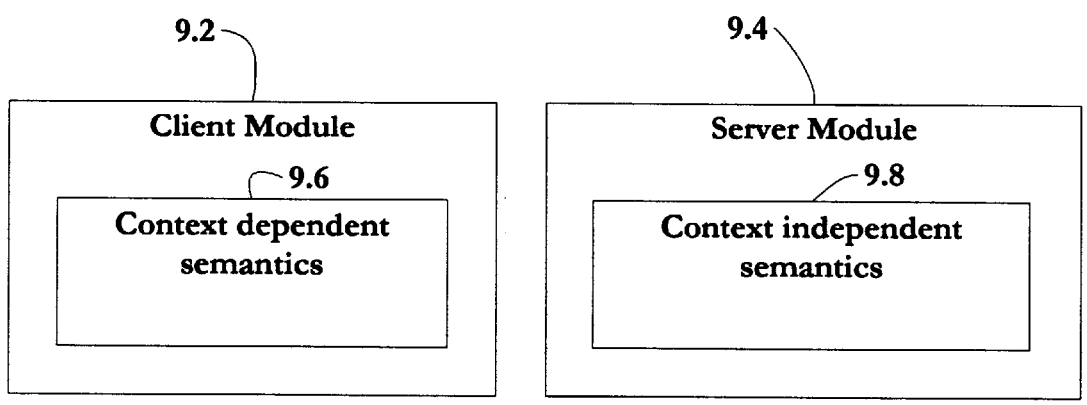
FIG. 9 depicts an existing model's configuration dependent and independent semantics according to the prior art.
Figure 10:
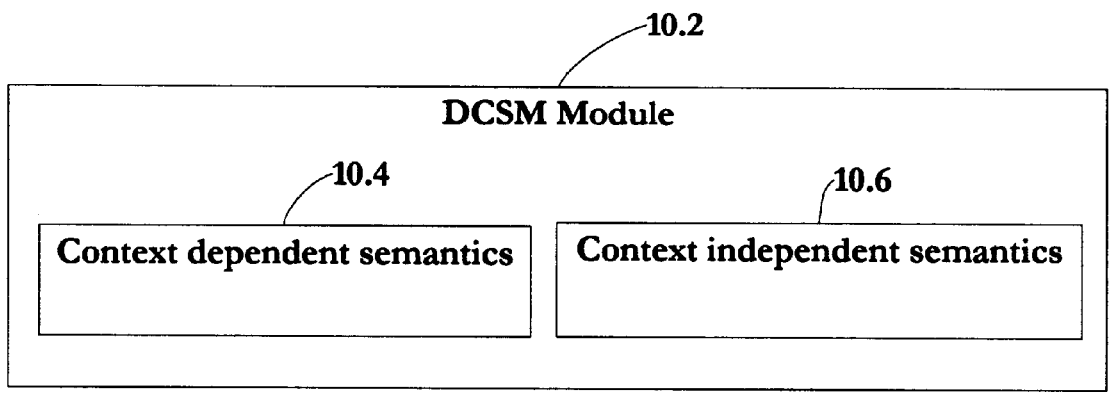
FIG. 10 depicts DCSM configuration dependent and independent semantics according to a preferred embodiment of the present invention.

In a prior-art software model, as shown in FIG. 9, the context-dependent semantics 9.6, are placed in the client-module 9.2, and the context-independent semantics 9.8, are placed in the server-module 9.4. This is contrasted with the DCSM where as shown in FIG. 10, both the context-dependent semantics 10.4, and the context-independent semantics 10.6, are placed directly in the DCSM-module 10.2. This unified placement of dependent and independent semantics is possible because the client module can use client-driven configuration to contextualize the server-module.

A well-defined module provides a high level of encapsulation. This means that as much as possible of the implementation associated with a particular module is contained completely within the implementation of that module. Ideally, the modularity of a module should be such that the user of services through its abstraction does not need to know how these services are being implemented. The DCSM, by placing both context-dependent and context-independent semantics directly into the module as opposed to dividing them between the module and its clients, provides enhanced modularity.

A well defined abstraction contains little of the non-essentials of a module's service definition. By placing context-dependent semantics into the server-module, the artifacts of these semantics do not show up in the abstraction. For example, if a module is not responsible for its own event management, then the abstraction of the module, would potentially have to include passing of an event management context from its client module. This would mean including non-essential implementation details in what should be as pure a form of abstraction as possible. These non-essentials can be left out of a DCSM module because the server-module encapsulates these context-dependent semantics. This allows a designer to provide enhanced abstraction in a module.

1.7 Module graphs

In a typical prior art software model, client-modules depend on services from particular server-modules. In those software models, these dependencies form a graph called a module-graph starting with a root module that is a pure client and does not act as server to another module. In an object oriented software model these module-graphs would be called object-graphs and the service-dependencies would be called relationships.

Figure 11:
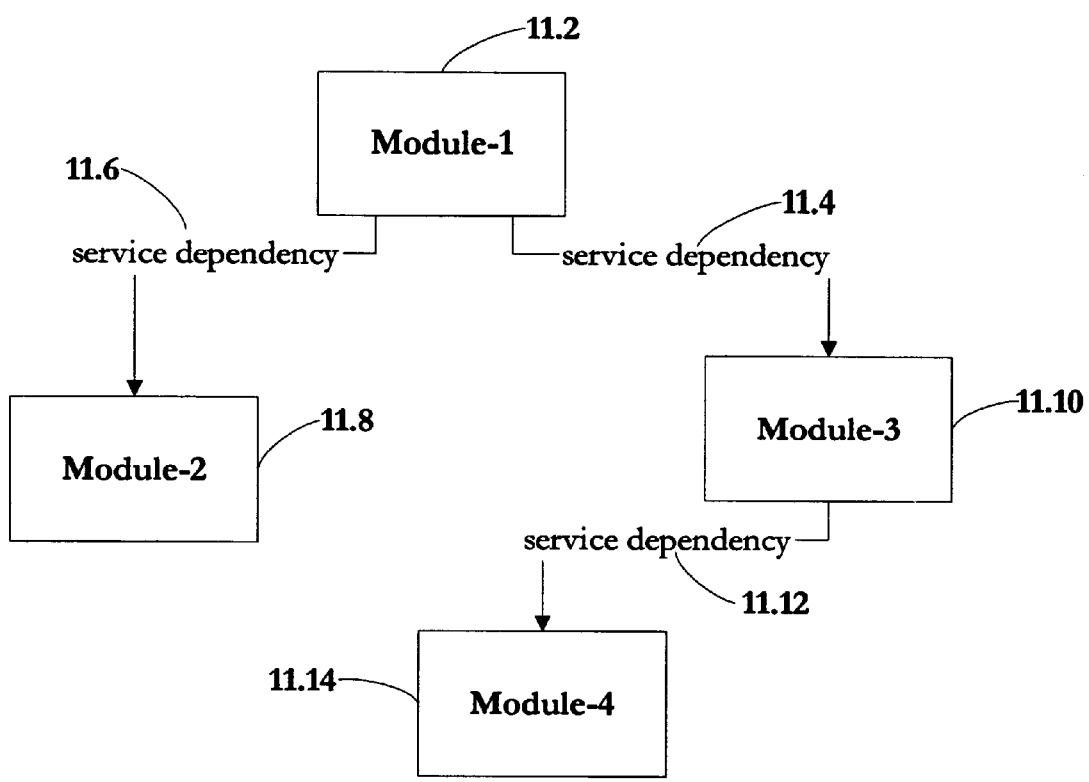
FIG. 11 depicts an example of module graphs according to a preferred embodiment of the present invention.

FIG. 11 shows an example of a module-graph with a root module-1 11.2, which has a service-dependency 11.6, on module-2, 11.8, and a second service-dependency 11.4, on module-3, 11.10. Continuing downward, it can be seen that module-3 11.10, has a service-dependency 11.12, on module-4 11.14. This module-graph shows that module-1, 11.2, is a client of module-2, 11.8, and module-3, 11.10. which become servers to module-1, 11.2. Module-3, 11.10, is in turn, a client of module-4, 11.14, which is a server to module-3, 11.10.

Figure 12:
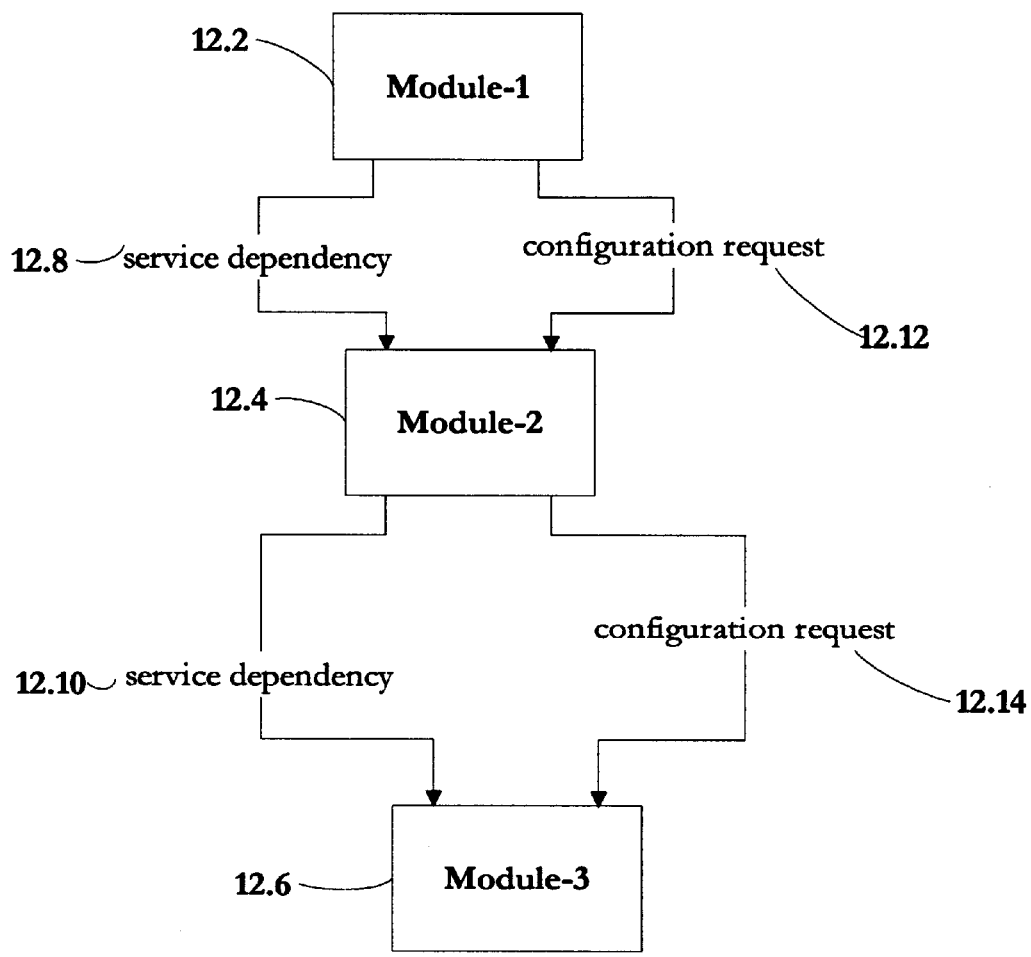
FIG. 12 depicts an example of recursive module-graph configuration according to a preferred embodiment of the present invention.

FIG. 12 shows how these modules form a graph in which client-configuration becomes a recursive process traversing downwards from the top of the graph to the bottom. The root-module would be the seed in a recursive tree descent algorithm where the configuration of a module leads to the possible re-configuration of its server modules. As shown in FIG. 12, the example shows a root module, module-1, 12.2, which performs a configuration-request, 12.12, on one of its server modules, module-2, 12.4, which in turn performs a configuration-request, 12.14, on one of its server modules, module-3, 12.6. Since configurability is dynamic, this can happen at run-time as many times as the module semantics cause re-configurations. In this depiction, service-dependency, 12.8, and 12.10 establish the client-server relationships and implement the structure of the module-graph.

One way of having the configuration-request passed from a client module to a server module is to have the client module's implementation call a configure method manually on the server module's abstraction. However, the preferred embodiment of the present invention is to have the context-dependent semantics of a module support the direct expression of desired configurations for the module associated with a given service dependency. This means that a client module would, as part of its configuration algorithm, send configuration-requests to each of its server modules. Also, if during the reconfiguration of the client module, new configurations of server modules are indicated, then new configuration-requests would be sent to the appropriate server modules. Again, this recursive, so each of these server modules would in turn send configuration-requests to the modules they have a service dependency on, if so indicated by the new configuration.

Figure 13:
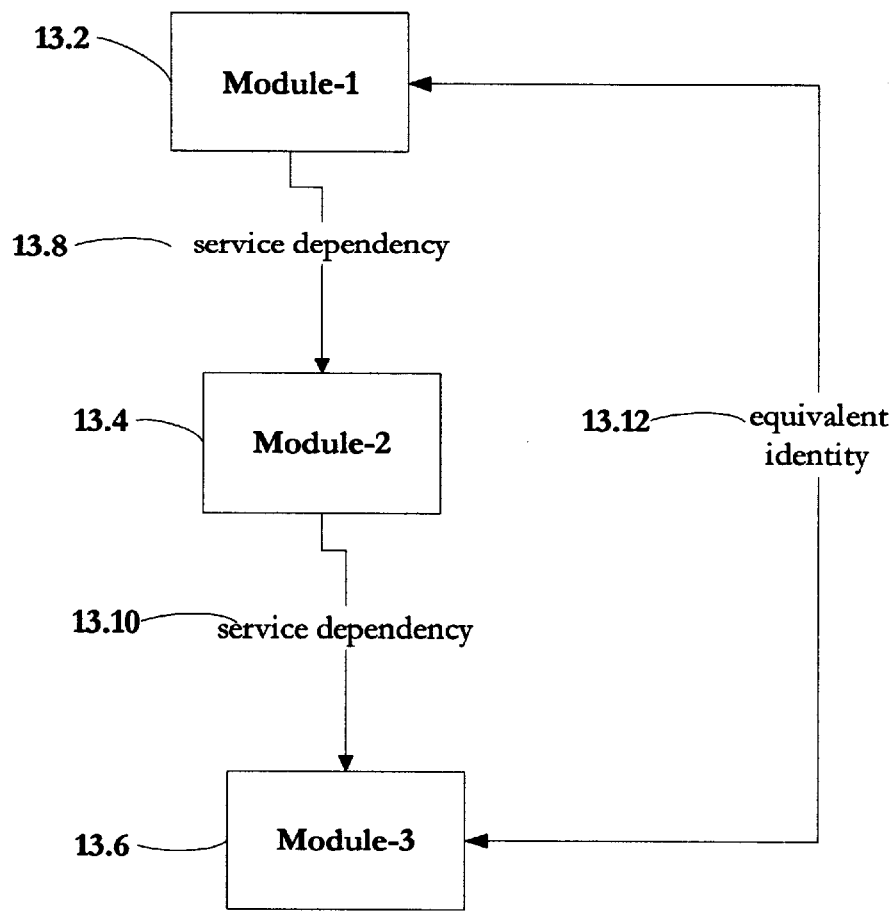
FIG. 13 depicts an example of loops in module-graphs according to a preferred embodiment of the present invention.

Because of the previously mentioned fact that one could have at run-time more than one module in different configurations, each of which represents the same entity, it follows that one can have a module graph, in which multiple modules, each representing the same entity, can co-exist simultaneously in the same graph. As shown in FIG. 13, module-1,13.2, has an equivalent-identity, 13.12, to module-3, 13.6. This is an interesting and important aspect of the DCSM, that two modules each representing the same entity, can exist at different points in a module-graph with different semantics associated with each of their respective configurations. Again we see that service-dependency, 13.8, and 13.10 establish the client-server relationships and implement the structure of the module-graph. In this example, module-2 13.4, shown an intermediary client-server relationship, however a server and its direct client may in fact have the same identity as well.

Because of these loops in modules-graphs, it is necessary to provide the capability to have multiple modules of the same identity to synchronize updates to their state with each other. This synchronization is performed by intercepting updates to relationships and broadcasting them to all other modules of the same identity in the module-graph.

1.8 Process Modeling

In any software modeling system, there is something called process-modeling, where particular scenarios of usage, processes, or use-cases for a set of modules are captured. This can be at any level from high to low. One extreme being a complete high-level coarse-grained process representing a user-visible set of GUI screens, event management, and business logic, involving complex interactions with lots of modules. The other extreme being a low-level fine-grained process representing a simple protocol among one or two modules. A good software model supports process-modeling explicitly, maximizing simplicity and re-usability. The two salient characteristics of process modeling are: that it almost always involves interactions between multiple modules, and that the interactions are context-dependent. In fact, one can say that process-modeling is about defining contexts for interacting with module-graphs. As shown above, the DCSM supports both characteristics with enhanced modularity and abstraction, thus providing greater simplicity and re-use.

Figure 14:
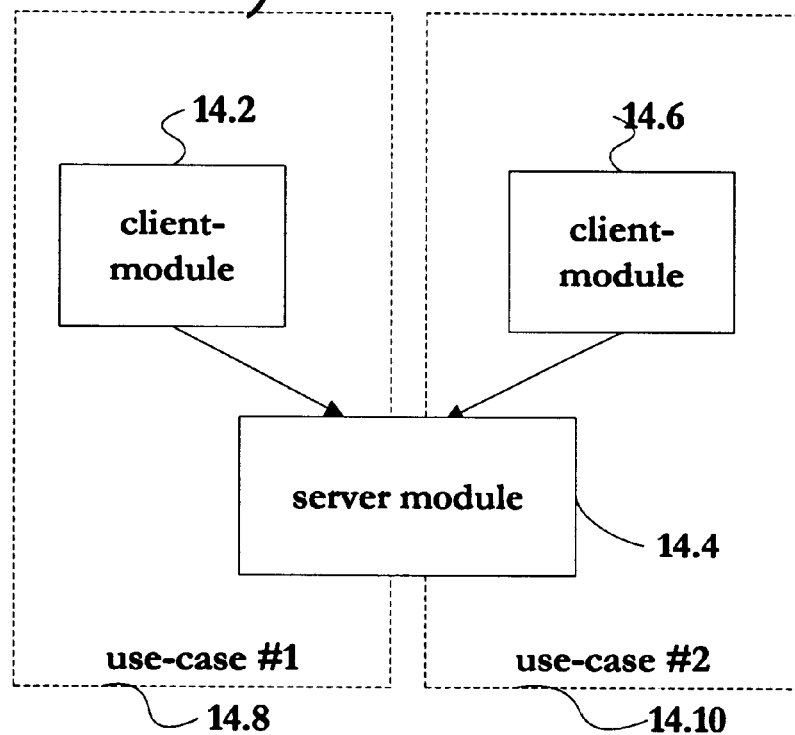
FIG. 14 depicts an example of process modeling according to the prior art.

Since a prior art software model has a static non-configurable module-graph that must have a given module's context-dependent semantics placed in an external client module, it is necessary to introduce additional client modules for each aspect of a process. Since the use-case for a given module has to be modeled as a client to that module, there is a situation as shown in FIG. 14, where for two use-cases, one has to introduce two, or more, client modules 14.2, 14.6, to model two use-cases 14.8, 14.10, for a given server-module 14.4. One can readily extrapolate this problem to the module-graph level, where the use-cases at small to large levels of granularity cause an explosion of external modules to handle various use-case scenarios, and their associated context-dependent semantics. This leads to constructs with low modularity and abstraction. Simplicity and re-use are severely impacted.

Figure 15:
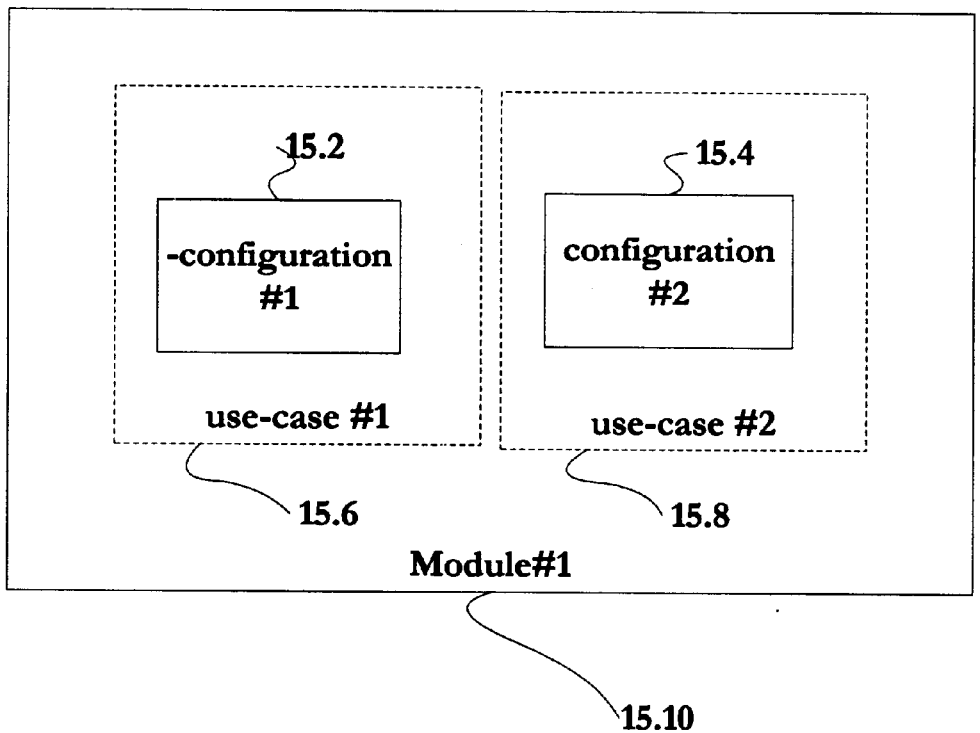
FIG. 15 depicts an example of process modeling according to a preferred embodiment of the present invention.

In the DCSM, process-modeling is based on its inherent ability to dynamically configure modules. Process-modeling becomes the design of configurations of modules and by simple extension, module-graphs. Referring to FIG. 15, the two use-cases 15.6, 15.8, are handled by configurations 15.2, 15.4, encapsulated inside module 15.10. Extending this to the module-graph level, one can see that fine and coarse grained process-modeling is performed with higher modularity and abstraction, leading to higher simplicity and reuse. In order to solidify this applicability of configurable module-graphs to process-modeling, the DCSM introduces two new concepts, the dynamically configurable process (DCP) and the dynamically configurable subprocess (DCS). A DCP is defined as a context for a client, either a human or an external system, to interact with the semantics of the system to perform a particular task. A DCS is a single element in a decomposition of the DCP into a sequence of interactions with individual dynamically configurable module-graphs.

In the DCSM, the DCS is a special kind module that represents a root and context for a module-graph. The DCS also provides a transactional and event management context for the module-graph, allowing data updates and events to be focused on a particular set of modules, with particular identities, in isolation from other modules in other subprocesses with the same identity.

A DCS, like a standard function, has a signature, with associated input parameters or domain, and output parameters or range. The subprocess is intended to act as a function, mapping domain inputs to range outputs. Because of this, a subprocess can perform a function call to another subprocess.

Figure 16:
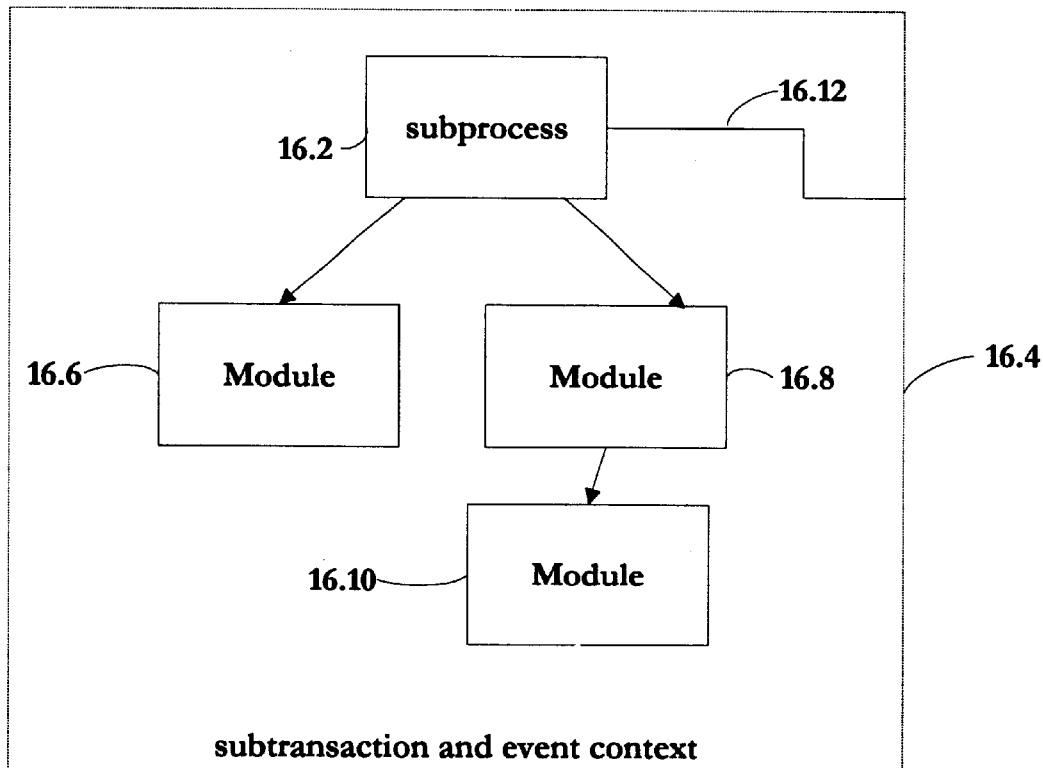
FIG. 16 depicts an example of subprocesses according to a preferred embodiment of the present invention.

As shown in FIG. 16, a DCS 16.2, is the root of a module-graph consisting of modules 16.6, 16.8, 16.10. The DCS configures the module-graph to perform the use-cases it is interested in to serve its process-modeling goals. The subprocess creates and attaches 16.12, to itself a transactional and event management context 16.4, for its module-graph.

A DCP is also a kind of module that represents a transactional and event management context for one or more subprocesses. A process starts with a root-subprocess that calls other subprocesses until either the root or some subprocess in the calling chain terminates the process. A process, like a subprocess, also has a signature, with associated input parameters, or domain, and output parameters, or range. A DCP is intended to act as a function, mapping domain inputs to range outputs. Because of this, a process can perform a function call to another process.

Figure 17:
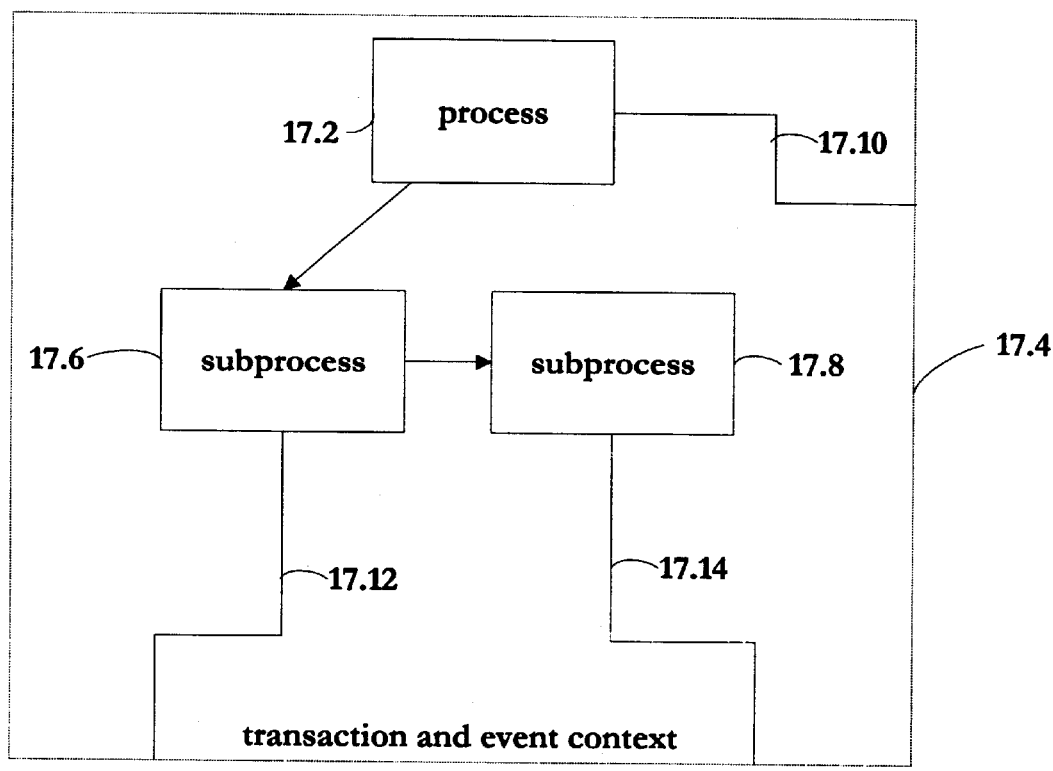
FIG. 17 depicts an example of processes according to a preferred embodiment of the present invention.

As shown in FIG. 17, a DCP 17.2, has a root-subprocess 17.6, which in this case calls exactly one other subprocess 17.8. The process configures the root-subprocess to perform the use-cases it is interested in to serve its process-modeling goals. The process creates and attaches 17.10, to itself a transactional and event management context 17.4, for its subprocesses. The transactional contexts of the subprocesses are attached 17.12, 17.14 to the transactional context 17.4, of the process 17.2. These then become sub-transactions within it.

In the preferred embodiment of the present invention, subprocesses can call other subprocesses in one of two ways. The first is a 'stepped' subprocess where the first sub-process calls the second subprocess with the assumption that the second subprocess will not return. This type of call is used to create a sequence of subprocesses. The second way that a subprocess can call another subprocess is a 'nested' subprocess where the first sub-process calls the second subprocess with the expectation that it will return with its range potentially containing the results of the execution of the nested subprocess. This type of call is used to create a call and return loop in the flow of the process.

A DCP can be considered to be the top-level transaction with all updates from a DCP becoming visible to DCSs of other processes as soon as it commits. The DCS can be considered to be a sub-transaction within a DCP, with its updates becoming externally visible to other DCS instances only when it terminates. In the case of the stepped subprocess, these updates become visible to subsequent called DCSs. In the case of the nested subprocess, these updates become visible to the calling DCS.

1.9 Event Management

Subprocesses, as stated earlier, form a context for management of events. These events can either be generated internally from a module within the associated module-graph, or come from external sources such as the client of the process this subprocess is in, or external subprocesses in a separate process. In order to illustrate this event-management structure, FIG. 18 shows a subprocess module 18.2 with an associated module-graph consisting of modules 18.10, 18.14, 18.22 coupled through their service dependencies 18.22, 18.6, 18.16.

Figure 18:
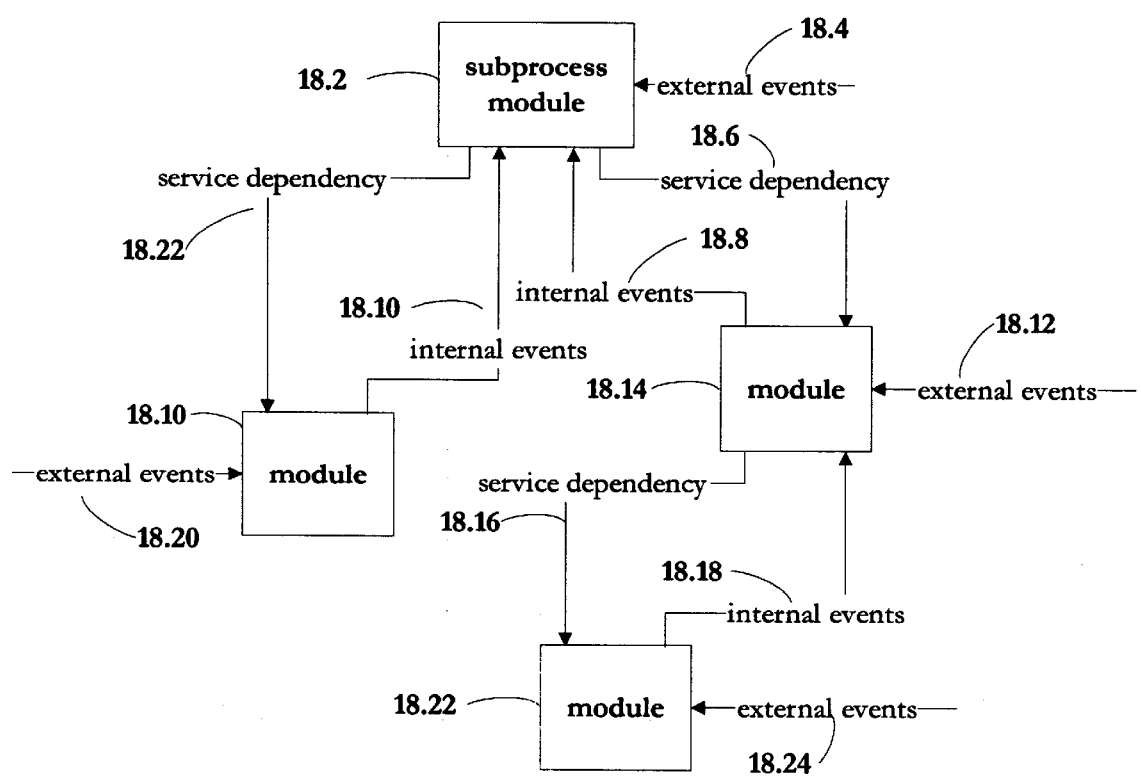
FIG. 18 depicts an example of event management according to a preferred embodiment of the present invention.

In FIG. 18, each of the modules 18.10, 18.14, 18.22 can generate internal events that are propagated to the client modules above them. The kinds of internal events that can be generated include mutation events. Mutation events occur when a relationship of a module is mutated or modified. Client modules which may have rules or methods that have bound to these relationships need to know when these mutations occur. For this reason a solid module-graph runtime system must support mutation event propagation.

Again in FIG. 18 it is shown that each of the standard modules 18.10, 18.14, 18.22 and the subprocess module 18.2 can receive external-events 18.20, 18.12, 18.24, 18.4 respectively. These may come either from the client, in the form of a GUI interaction events, or from the logic of an external system, or they are from other subprocesses in other processes. In both cases, the modules 18.10, 18.14, 18.22 include semantics that map these external events to specific internal events as desired by the module's semantics. These mappings are dynamically configurable. In the case of events coming from external subprocesses in other processes, the preferred embodiment has a publish subscribe mechanism that can direct events from a given publishing module to one or more subscribing modules that have indicated an interest in these events based on a well-known identity assumed by the publishing module.

When a module receives internal events either directly, or mapped from external events, the module must be able to have some behavior that catches these events and performs an action in response. In the case of the DCSM, this involves a construct we call a rule-property, described below, that can perform the requisite event listening, filtering and triggering of an appropriate method as a behavioral response.

1.10 Dynamically Configurable Software Systems

There are two ways that the DCSM provides significant advantages to a designer of a DCSS. First, higher modularity and abstraction and dynamic configurability provides support for the complex multi-dimensional modeling problem that a modern complex software system poses. Second, globally-driven configurability provides an interface for allowing captured software system configuration, or global system policies, to configure individual processes.

Figure 19:
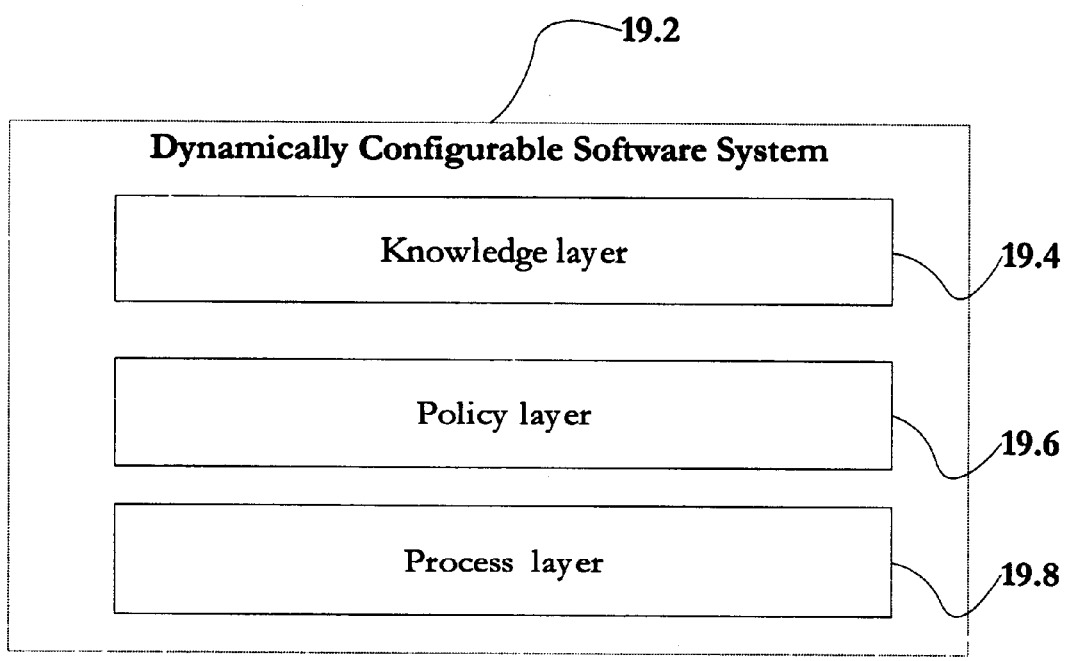
FIG. 19 depicts a block diagram of an architecture of a DCSS according to a preferred embodiment of the present invention.

FIG. 19, shows a high level architecture for a DCSS 19.2, which is comprised of three layers, the knowledge layer 19.4, the policy layer 19.6, and the process layer, 19.8. Each of these layers plays an important role in a DCSS.

Figure 20:
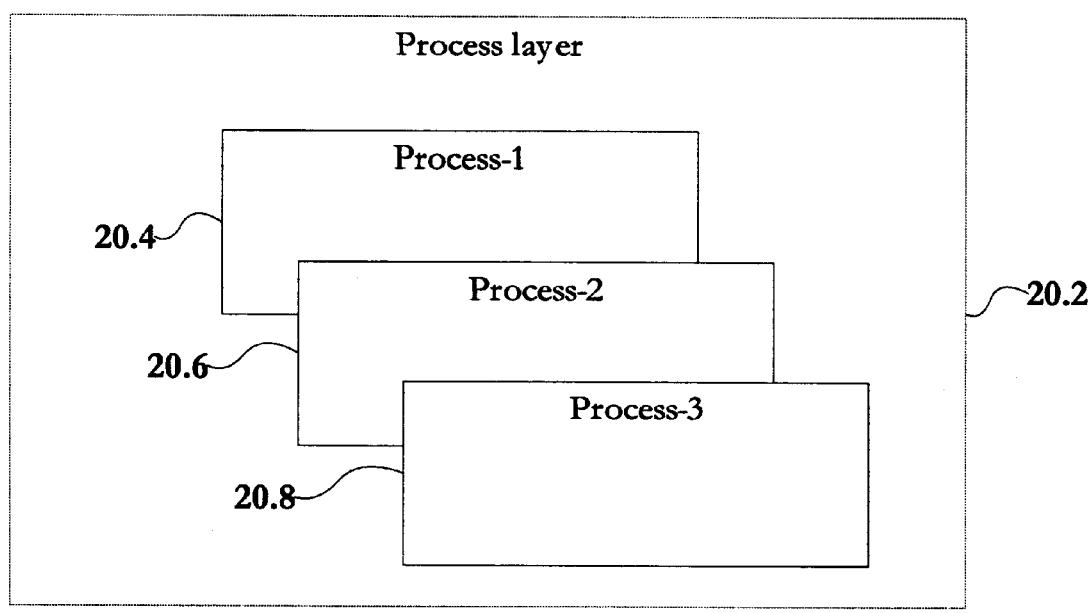
FIG. 20 depicts an example of a process layer according to a preferred embodiment of the present invention.

FIG. 20, shows that the process layer consists of a collection of processes, examples here shown as a plurality of processes 20.4, 20.6, 20.3. Each of these processes is using client-driven and server-driven configuration to provide dynamically configurable software solutions to software problems.

Figure 21:
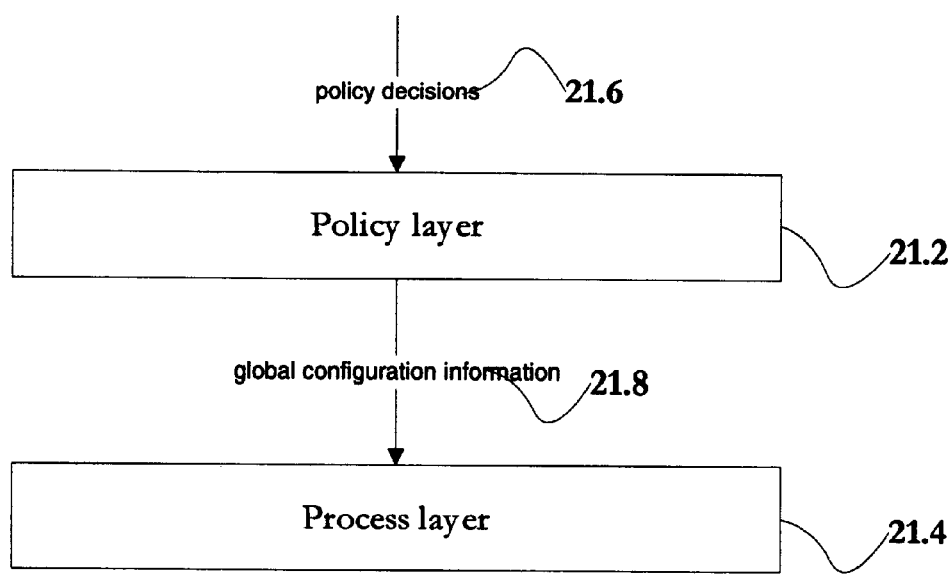
FIG. 21 depicts policy driven configuration according to a preferred embodiment of the present invention.

FIG. 21, shows that the policy layer 21.2, captures global system policies that are used to provide global-configuration information 21.8, to the process layer 21.4, so that they can undergo globally driven configuration. The policy layer contains information that is the result of policy-decisions 21.6, from the knowledge layer 19.4, of FIG. 19.

Figure 22:
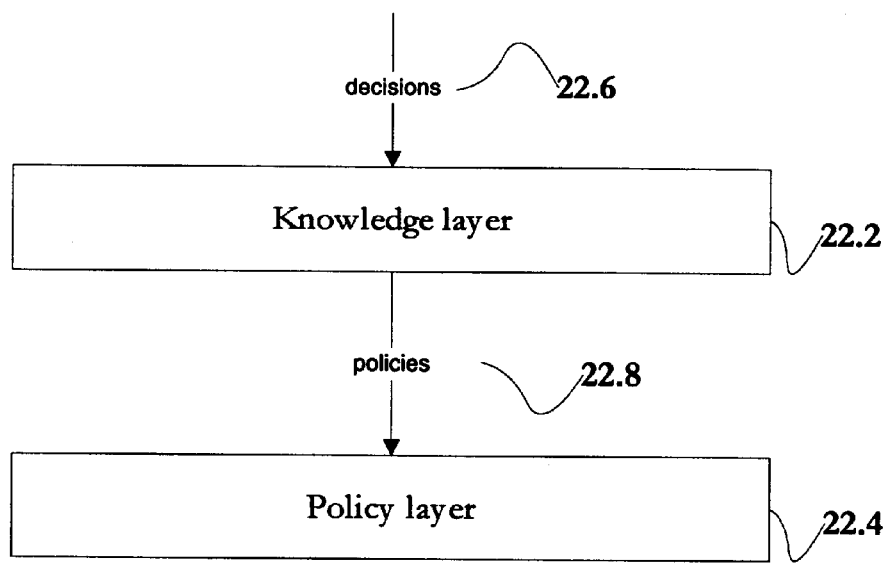
FIG. 22 depicts knowledge driven policies according to a preferred embodiment of the present invention.

FIG. 22 shows how the knowledge-layer 22.2 processes decisions 22.6 that are the result of an interview that the knowledge layer conducts with users that want to configure the DCSS to meet their specific requirements and presents them as policies 22.8 to the policy-layer 22.4. This layer consists of automated and manual algorithms and heuristics that capture the knowledge necessary to translate business requirements, input in the form of these questions 22.6, into policy decisions 22.8. It is noted that one appropriate implementation of this layer would use a propositional logic system, for example an artificial intelligence shell, to capture the knowledge-base represented in this layer for both setting policies and determining appropriate actions to take to accommodate changed policies.

1.11 Multi-dimensional Modeling

The DCSM with its dynamic configurability for modules, does not create, but acknowledges and addresses, a multi-dimensional modeling challenge. This multi-dimensional problem already exists, but prior art models provide no support for separating those dimensions. Since many instances of all three forms of dynamic configuration can be applied concurrently in a given module-graph, and the DCSM user can create many different design dimensions of configurability, the DCSM represents a rare ability in a software model to capture these dimensions directly in design-time constructs.

Each form of configuration, along with each configuration design pattern that a DCSM user chooses to use to model an aspect of a configurable solution, can be considered a dimension in this multi-dimensional space. For instance, the designer may want to use configuration for a compensation calculation along the dimension of a continuum of skill level for an employee module, and also along the dimension of seniority. Each of these is dependent on the client module's context, and the current state of the server module, and the choices made at the policy layer. Each of these dimensions can be concurrent and simultaneous. Again this is not a design challenge that the DCSM introduces, it is just a design pattern that is brought out and supported explicitly.

This multi-dimensional model implies a large number of permutations of these simultaneous and concurrent configurations. Each of these permutations involves a merging of each of one or more of these dimensions of configuration. This implies a merging of all of these dimensions to create the configured form of a given module at any given point in the life-cycle of a module-graph. This merge further implies that the module semantics as expressed in a configuration, needs to be as declarative as possible. Imperative semantics are, by their very nature, difficult to merge with other imperative semantics. An example is that the declarative requests to "ship the package cost-effectively" and "ship the package fast," can be taken as simultaneous requests because how the requests are to be satisfied was not specified. In contrast, the imperative requests, "ship a package via us mail" and "ship a package via federal-express," are difficult to reconcile when merged. For this reason, the semantics of a module are designed to be as high level and as declarative as possible.

1.12 Configuration-merge algorithm

Central to the concept of dynamic configuration are the algorithms that implement a module's response to a configuration request. These algorithms support two types of semantic modification. The first is to add new semantic properties to a module with a specific set of characteristics or features. The second is to be able to modify existing features or characteristics of a semantic property already within the module. This run-time configuration of a module's semantic properties, using the add or modify merging of semantic properties and features, is based on a set of algorithms that in cooperation implement what is called the configuration-merge algorithm. This merge needs to be declarative to support the multi-dimensional modeling described above.

1.13 Design-time Evolution

The DCSM effectively handles run-time evolution, where the semantics of the system are changing at run-time to meet requirements in all three forms of configuration. However, a strong software model accommodates design-time evolution as well. Design-time evolution is the process of modifying a software system to meet additional or modified previously unanticipated or unaddressed requirements. The DCSM with its highly modular and abstracted multi-dimensional configuration techniques, allows the software designer to cast new or improved features and requirements into new configuration use-cases or modifications to old use-cases. Since even the process modeling is encapsulated within the module, these new features are instantly propagated to all client-models using these new or improved features. Historically modularity and abstraction were targeted at this software upgrade problem, so it is logical that the DCSM also provides benefits in this area.

1.14 Graphic User Interface

Since the DCSM supports encapsulated context-dependent semantics, it includes a declarative method of defining the graphical user-interface (GUI) semantics, both in terms of visualization and event-handling. This is done in such a way that it can allow configuration to drive the automatic generation of a GUI at run-time. So in the DCSM, declarative definitions of the GUI are included. This automatic GUI generation is a valuable feature to support dynamic multi-dimensional modeling, where the numerous run-time permutations of configuration would be difficult to support using individual imperative and static GUI definitions.

1.15 Rules

In the same vein, since the DCSM supports encapsulated context-dependent semantics, it includes a declarative method of defining the manner in which events received by a module are dispatched to appropriate methods. The ability to encapsulate event management inside a module is a key benefit of dynamic configuration. This encapsulated event management is also a valuable feature to support dynamic multi-dimensional modeling, where again, the numerous run-time permutations of configuration would be difficult to support using individual imperative and static event management definitions.

2. Preferred Embodiments of a DCSM 2.1 Introduction

Figure 23:
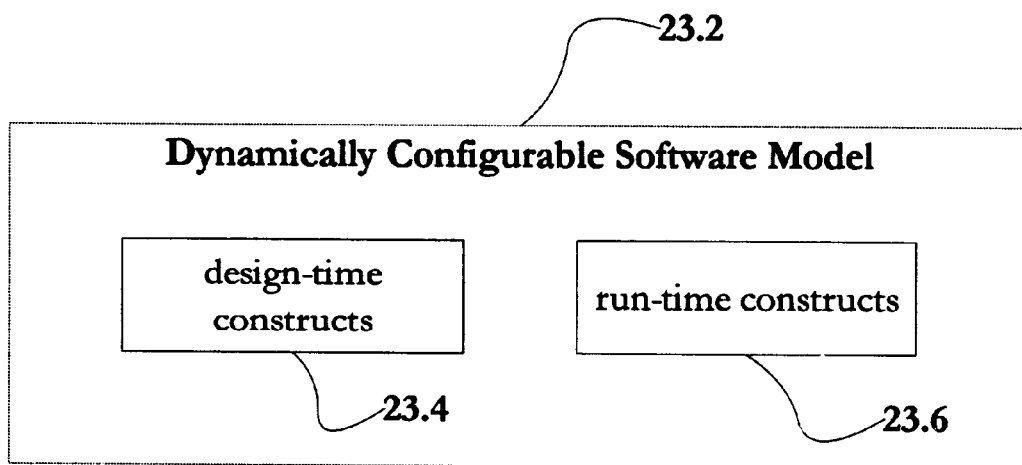
FIG. 23 depicts a decomposition of the dynamically configurable software model according to a preferred embodiment of the present invention.

As shown in FIG. 23, the DCSM 23.2, includes both design-time software constructs 23.4, and run-time software constructs 23.6, where each software construct includes one or more data-structures and one or more algorithms. The design-time software constructs are used by the DCSS software designer to craft the form of an appropriate solution to a given problem, while the run-time software constructs support the execution of the resultant computer code that solves the problem.

Figure 24:
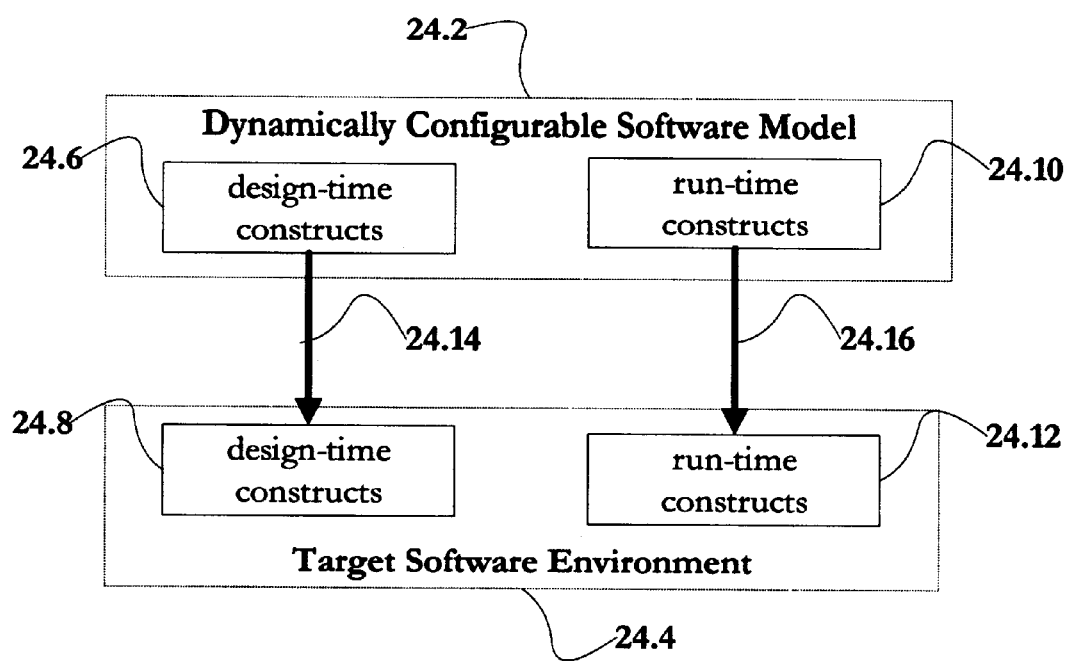
FIG. 24 depicts mapping of target software environments according to a preferred embodiment of the present invention.

As shown in FIG. 24, the design-time software constructs 24.6, and run-time software constructs 24.10, of a DCSM 24.2, are implemented 24.14, 24.16 to design-time software constructs 24.8, and run-time software constructs 24.12, in one or more instances of a Target Software Environment (TSE) 24.4. Potential TSEs include both object and non-object TSEs, however object TSEs are preferred because much of the technology required by a DCSS is more easily implemented and utilized in modern object TSEs. Most of the discussions that follow assume an object TSE such as Small-talk, C++ or Java, but only for clarity and concreteness. The only requirements are that there be some way to specify, instantiate, and execute data structures and algorithms.

Figure 25:
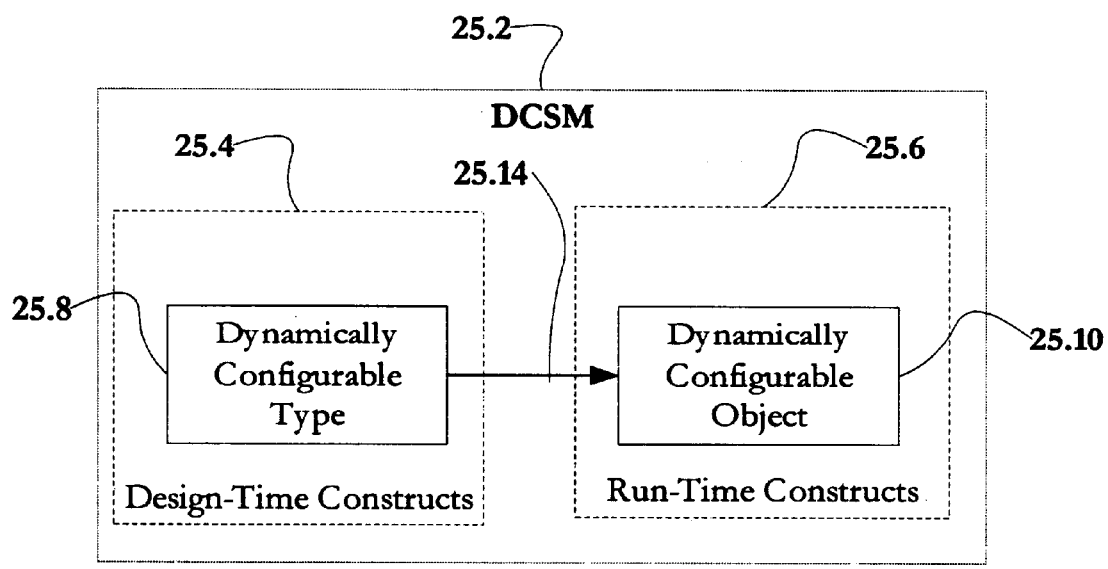
FIG. 25 depicts mapping of dynamic configurable types according to a preferred embodiment of the present invention.

As shown in FIG. 25, a DCSM 25.2, includes one or more instances of software design-time constructs 25.4, called a Dynamic Configurable Type (DCT) 25.8. DCTs 25.8, are used by a DCSM user to model abstract or concrete entities for their DCSS. The DCT 25.8, is a specification that is instantiated 25.14, to one or more instances of run-time constructs 25.6 called a Dynamic Configurable Object (DCO) 25.10. The DCT 25.8, represents the design-time meta-data for the DCSM 25.2, version of a dynamically configurable module with configurable implementation. The DCO 25.10, is the run-time embodiment of a dynamically configurable module with configurable implementation.

Figure 26:
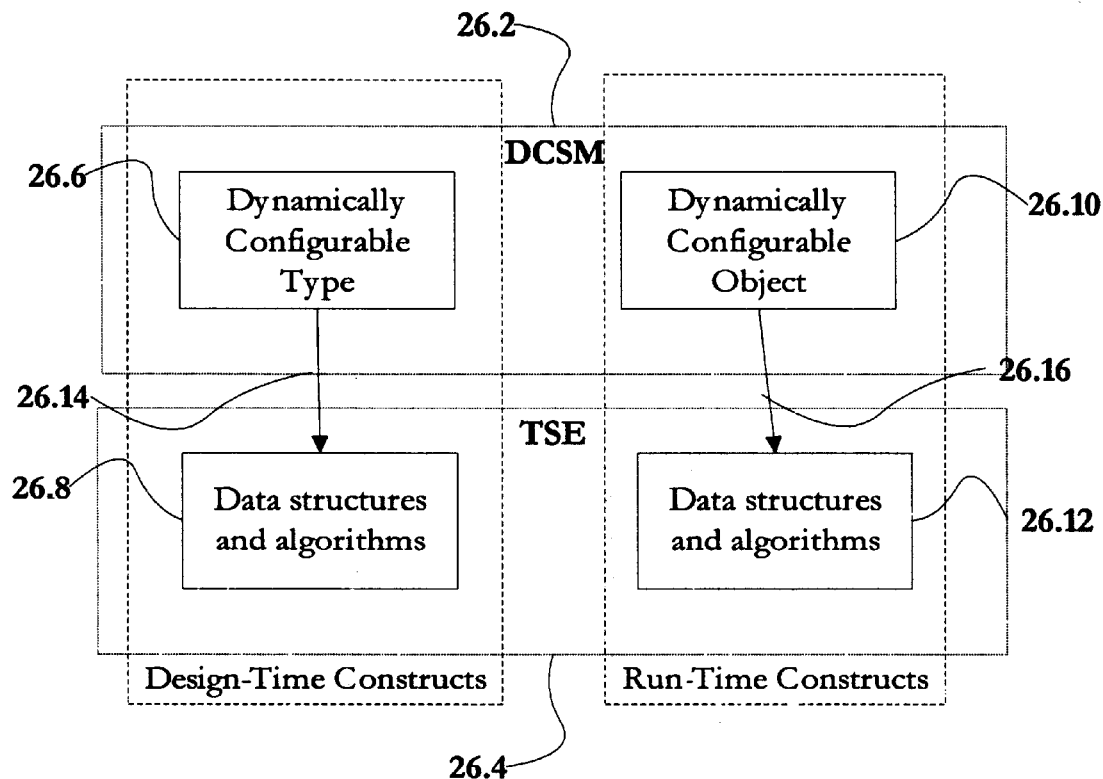
FIG. 26 depicts implementing DCTs and DCOs in a TSE according to a preferred embodiment of the present invention.

As shown in FIG. 26, the DCT 26.6, is implemented 26.14 in a TSE 26.4 using data structures and algorithms 26.8, Similarly the DCO 26.10, is implemented 26.16 in a TSE 26.4 using data structures and algorithms 26.12. It is a simplification but is not necessary that a single type or instance of a TSE 26.4 is used for all of the DCTs 26.6 or DCOs 26.10 as long as an appropriate communication is supported between the TSEs 26.4. Additionally, the design-time and run-time constructs may be implemented in a fashion such that both exist simultaneously in the same instance of executable computer code. It is also acknowledged that the data structures and algorithms may be tightly coupled or even shared between DCTs 26.6 and DCOs 26.10.

The DCT 26.6 is preferably directly implemented using standard class or type definitions within a TSE 26.4 but may be abstracted above these constructs. For instance in Smalltalk, C++ or Java TSEs 26.4 these could be directly based on standard class or type constructs as provided in the associated TSE 26.4 language, or there could be a separate language or model that is translated into appropriate TSE 26.4 constructs. Either of these approaches is suitable, with the direct approach considered easier to implement, and the translation approach considered to provide a potentially higher level of abstraction and TSE 26.4 independence.

Typically, a DCO 26.10 is directly implemented by a standard low level object such as is provided in the Smalltalk, C++, or Java TSEs 26.4, but multiple DCOs 26.10 could be implemented using a single TSE 26.4 object or each DCO 26.10 could take multiple TSE 26.4 objects to implement. The preferred form is that the DCO 26.10 is implemented in at least one TSE 26.4 object but as few as possible for optimum simplicity and time and space performance. The Java Bean in the Java TSE 26.4 makes an excellent basis for implementing DCOs 26.10 as it provides many well defined service definition standards that are useful for the purposes of DCO 26.10 run-time support.

Figure 27:
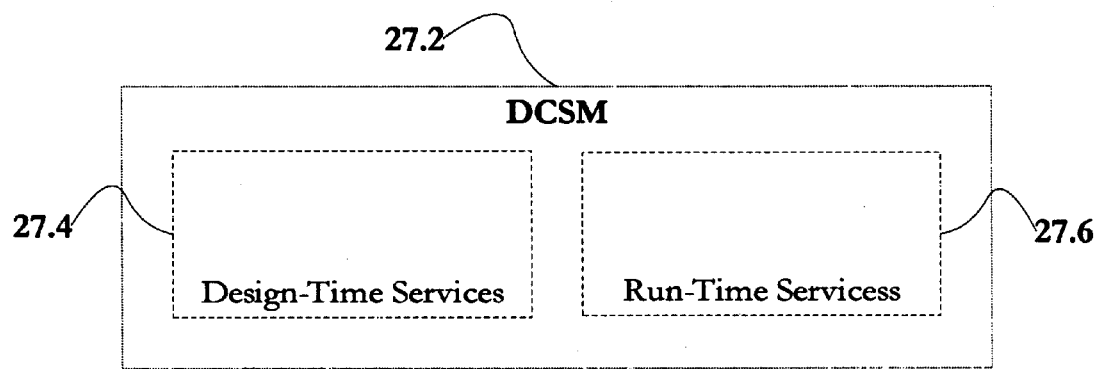
FIG. 27 depicts design-time and run-time services according to a preferred embodiment of the present invention.

As shown in FIG. 27, the embodiment of the DCSM 27.2, also includes a set of design-time services 27.4, and run-time services 27.6. The design-time services are used to support the design and management of DCTs. The run-time services are used to support the execution of DCOs in the DCSS. It is a simplification but is not necessary that a single type or instance of a TSE is used for all of the design-time services or run-time services as long as an appropriate communication is supported between the TSEs.

2.2 Design Time Constructs

This section describes the structure and semantics of the following DCSS design-time constructs DCT, Property, Feature, and Configuration.

Used throughout this document is the type name. This represents a construct for establishing a well-known public or private identity that may be implemented differently for different TSEs. In Java or C++, a name is most likely an ascii string with specific syntactic restrictions.

Figure 28:
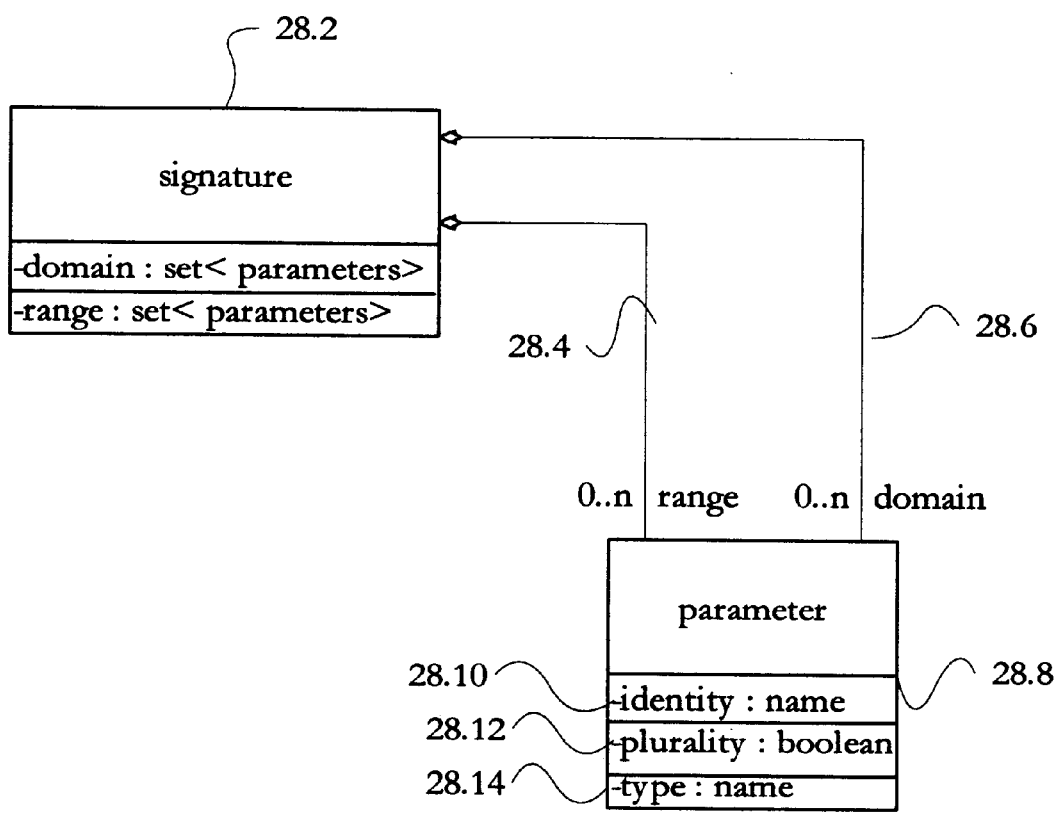
FIG. 28 is a Unified Modeling Language (UML) depiction of the signature according to a preferred embodiment of the present invention.

Also used throughout this document is a type called signature. The signature represents the interface to an construct that maps an input or domain to an output or range. As shown in FIG. 28, we see that the type signature 28.2, includes a zero-to-many relationship called domain 28.6, to the type parameter 28.8. This represents the set of input parameters for, or domain of, the function being represented by the signature. Also included is a zero-to-many relationship called range 28.4 to the type parameter 28.8. This represents the set of output parameters for, or range of, the function being represented by the signature 28.2. The type parameter 28.8, has an attribute called identity 28.10, which is the identity of the signature 28.2. The type parameter 28.8, also has an attribute called type 28.14, of type name, which is the type of this parameter 28.8. The type parameter 28.8, also has an attribute called plurality 28.12, of type boolean that is true if the parameter 28.8 represents a plurality of instances of the type of the parameter 28.8.

2.3 DCT

Figure 29:
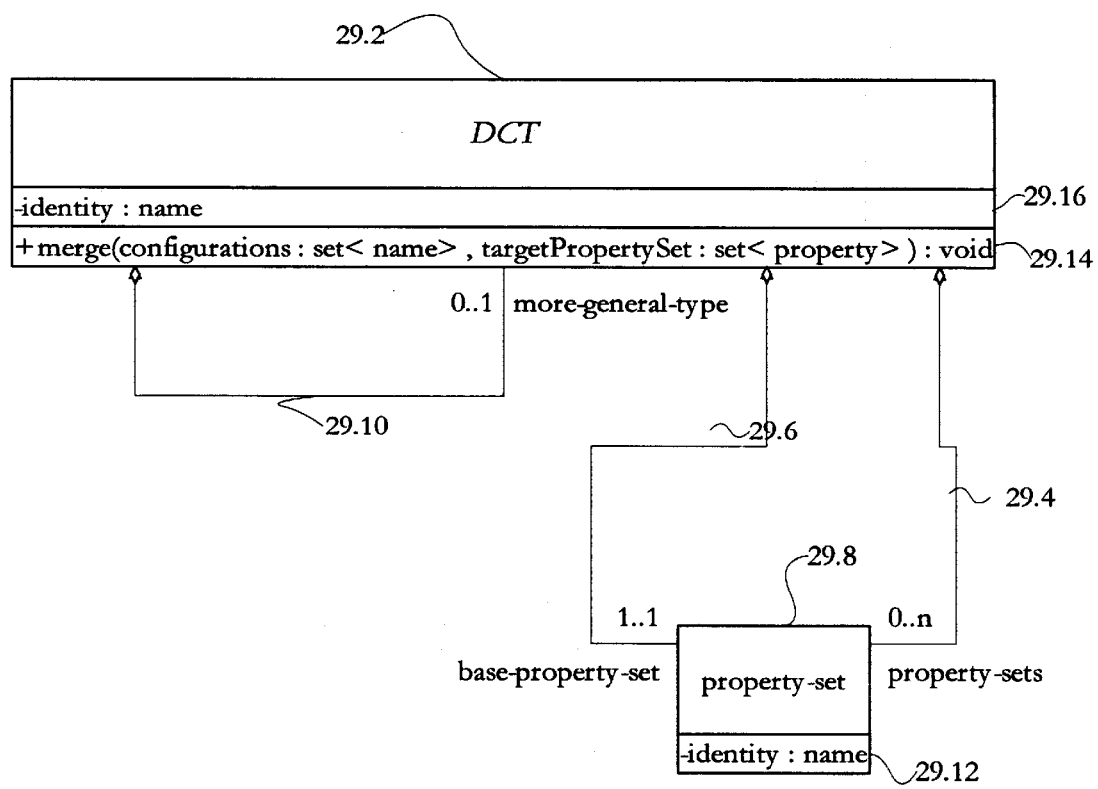
FIG. 29 is a UML depiction of the DCTs according to a preferred embodiment of the present invention.

As shown in FIG. 29, the type DCT 29.2, includes a zero-to-many relationship property-sets 29.4, to the type property-set 29.8, each of which represents a collection of semantics that can be merged with others to create a final configured semantic definition of a DCO. The DCT 29.2, also includes a one-to-one relationship called base-property-set 29.6, also to the type called property-set 29.8. This represents a property-set 29.8 that is always merged into the configured semantic definition of a DCO.

The DCT type 29.2, includes an attribute called identity 29.16, of type name, which uniquely identifies each instance of a DCT 29.2, from other DCT instances within a set of DCTs that in to specify the design of a particular DCSS.

Each property-set type includes an attribute identity 29.12, of type name, which uniquely identifies each instance of the type property-set 29.8, from other instances of the type property-set 29.8, within the relationship property-sets 29.4.

DCTs 29.2 have the ability to model a single inheritance hierarchy of generalization. Any specific-type represented by a particular DCT 29.2 can be thought of as an abstraction or implementation specialization of its parent or more-general-type. This relationship is represented in a particular instance of a DCT 29.2, by including a 0.1 relationship called more-general-type 29.10, to a second instance of the type DCT 29.2 which is the parent or more-general-type of the specific-type represented by the first DCT 29.2. This is a single inheritance model such as is used in the Java software model. It is noted that DCTs could use other inheritance models, such as multiple inheritance as is used in the C++ software model. This inheritance is either directly linked to the TSE construct's inheritance or could be kept as a separate hierarchy. It is acknowledged that it is preferred that the DCSM and the TSE inheritance hierarchy are equivalent for simplicity reasons, but this is not a necessity.

A DCT has a method called merge 29.14, which represents the part of the configuration-merge algorithm for which the DCT is responsible. This algorithm is an example of a preferred embodiment but is only one in a multitude of possible approaches to this part of the configuration-merge algorithm. It is acknowledged that there are others that may have different or better semantics and/or time or space performance.

An example of pseudo-code that implements this method is shown below:

```
//
// DCT::merge()
//      take a set of names that represent property-sets
//      and merge into a target property-set
//
DCT::merge(
    set<name> configurations, set<property> targetPropertySet
){
    set<property> result, temp;   // temporary property-sets
    result.clear();                // start with a empty set
    temp.clear();                  // start with a empty set
    // first go through a horizontal merge at our type level
    // merge in our base property set
    self.base-property-set.merge(result, MERGE_HORIZONTAL);
    // go through each property-set name in configurations
    // and merge
    for each name in configurations {
        // attempt to find a property-set in us associated
        // with this name
        temp = self.findPropertySetByName(name);
        // check to see if it exists, and if so do a horizontal
        // merge into result property-set . . .
        if (temp is not equal to NULL) {
            temp.merge(result, MERGE_HORIZONTAL);
        }
    }
    // Second do a vertical merge of the result with
    // target property-set
    result.merge(targetPropertySet, MERGE_VERTICAL);
}
```

Figure 30:
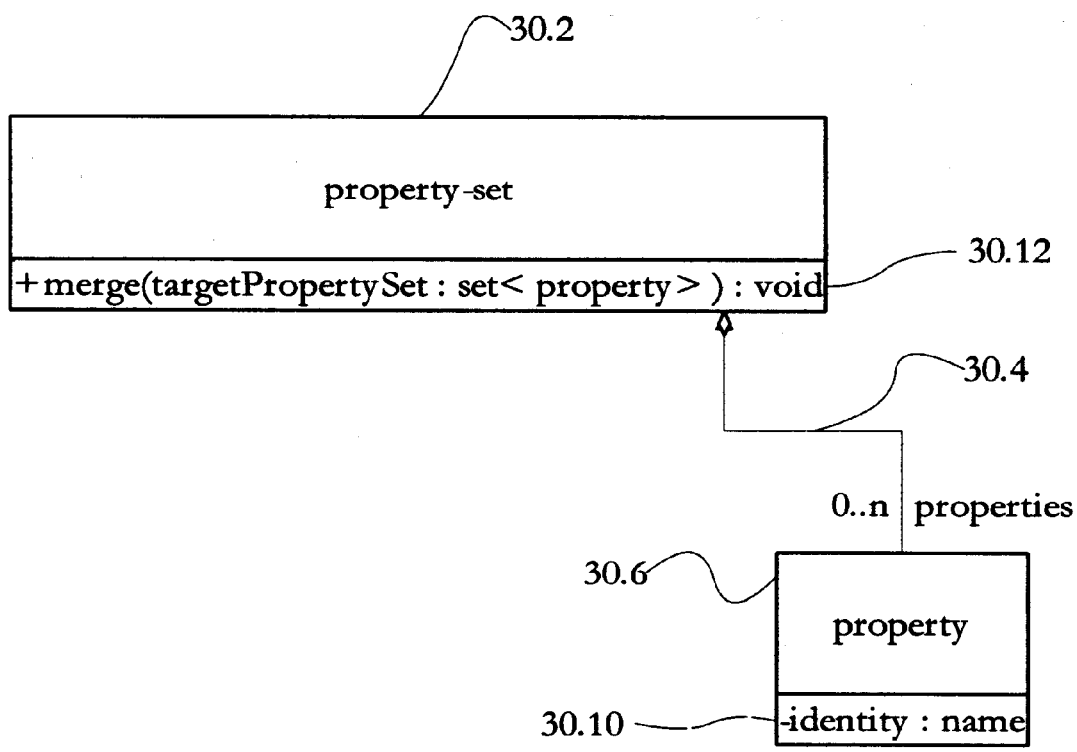
FIG. 30 is a UML depiction of the property Sets according to a preferred embodiment of the present invention.
Figure 31:
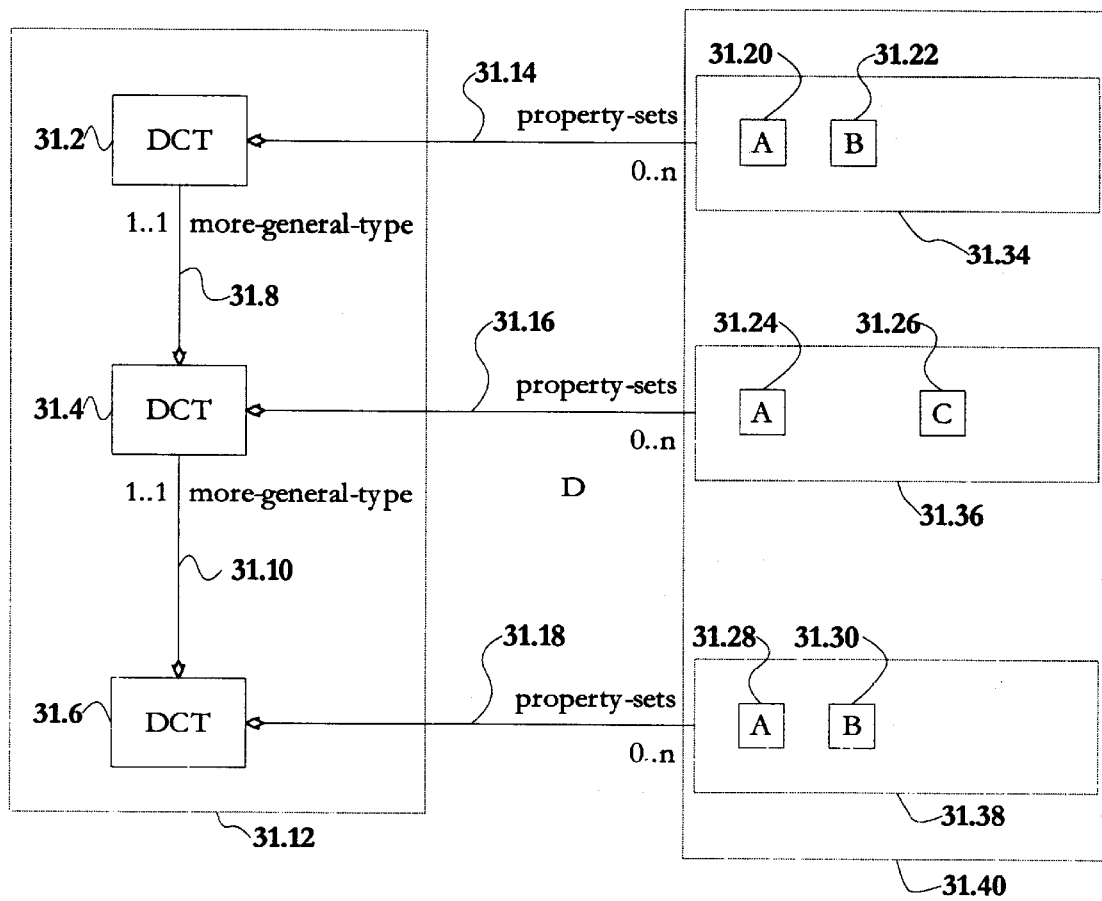
FIG. 31 depicts an example of property-set inheritance according to a preferred embodiment of the present invention.

As shown in FIG. 30, the type property-set 30.2, includes a zero-to-many relationship called properties 30.4, to the type property 30.6. Each of these property-sets 30.2, defines a partial semantic definition of the DCT which when combined with other property-sets 30.2, defines a particular configuration for DCOs instantiated from the DCT in which the property set is contained.

A property-set has a method called merge 30.12, which participates in the configuration-merge algorithm at the property-set 30.2 level. This merge takes the properties 30.2 in the base-property-set relationship, and either adds in properties 30.2 that do not already exist, based on their identity 30.10 or merges the properties 30.2 by appealing to their feature sets to modify an already existing property 30.2. This algorithm is an example of a preferred embodiment but is only one in a multitude of possible approaches to this part of the configuration-merge algorithm. It is acknowledged that there are others that may have different or better semantics and/or time or space performance. An example of pseudo-code that implements this method is shown below:

```
//
// property-set::merge()
//      merge our properties one by one into a target
//      property-set
//
property-set::merge(set<property> targetPropertySet,
enumerated direction)
{
propertytheProperty; // temp variable
    // for each of the properties in our property-set
    for each property in self.properties {
        // see if there is a same name property in
        // target property-set
        if(theProperty=targetPropertySet.findProperty(
               property.identity) {
            // merge our property with the target property
            property.merge(theProperty, direction);
        } else {
            // add a copy of our property to target property list
            targetPropertySet.add(property);
        }
    }
}
```

The identity of a given property-set is determined in the context of a shared name-space defined as the union of property-set name-spaces associated with all of the DCTs that have a more-general-type relationship to the DCT that contains this given property-set. This means that if the identity of a property-set in a specific DCT is the same as the identity of a property-set in a more general DCT then this property-set is considered to have a shared identity, in that the property-set of that identity in the more general DCT is a semantic generalization of the property-set of that identity in the more specific DCT. This is illustrated in FIG. 30, by an example which shows a given property-set 31.30, contained in a DCT 31.6, which has a shared identity with a property-set 31.22 in a more-general DCT 31.2 based on a shared name-space 31.40, which is the union of the names-spaces 31.38, 31.36, 31.34. In this example, the DCT 31.6 introduces into the shared name-space, via the relationship 31.18, the name-space 31.38, the DCT 31.4, introduces into the shared name-space, via the relationship 31.16, the name-space 31.36, and the DCT 31.2, introduces into the shared name-space, via the relationship 31.14, the name-space 31.34. This shared name-space is defined by navigating the more-general-type relationships 31.10, between DCTs 31.6, 31.4, and the more-general-type relationship 31.8 between DCTs 31.4, 31.2. Similarly the A property-sets 31.28, 31.24, 31.20 in the example have a shared identity. But using the same definition, the B property-set 31.26 in the example is unique and is does not have a property-set that is a semantic generalization.

The DCSM model supports the expression of polymorphism, for both DCTs and their property-sets. An instance of a DCT can be referred to by the implementation of a client module using the abstraction of its specific-type, or the abstraction of a more-general-type DCT. The implementation used is the one associated with the specific-type DCT, but is accessed through the common abstraction shared between the specific-type and the more-general-type DCT.

2.4 Property

Turning back to FIG. 30, the property type 30.6, includes an attribute called identity 30.10, of type name, which uniquely identifies each instance of the type property 30.6, from other instances of the type property 30.6, within the relationship properties 30.4. Each property defines a particular semantic element of a DCT.

Figure 32:
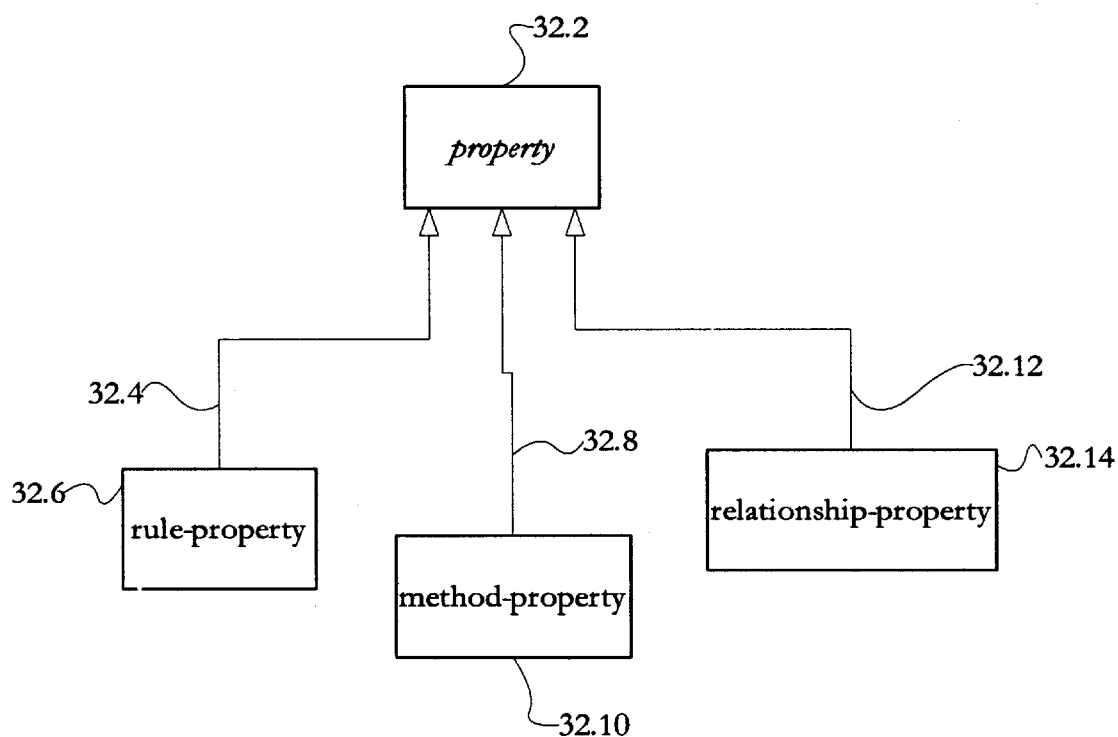
FIG. 32 is a UML depiction of the types of properties according to a preferred embodiment of the present invention.

Moving to FIG. 32, the types rule-property 32.6, method-property 32.10, and relationship-property 32.14, have the generalization relationships 32.4, 32.8, 32.12 respectively, to the type property 32.2. These specializations of the type property 32.2, represent some of the types of properties 32.2 that it is possible to model in a DCT. It is noted that there are many other types of properties that could be represented in a DCT that are not described here. Each of these types of design-time properties map to run-time DCO semantic characteristics and are implemented using appropriate TSE constructs.

The type relationship-property 32.14, represents a standard form of inter-module coupling. Relationship properties are representative of run-time relationships between one DCO and another.

Figure 33:
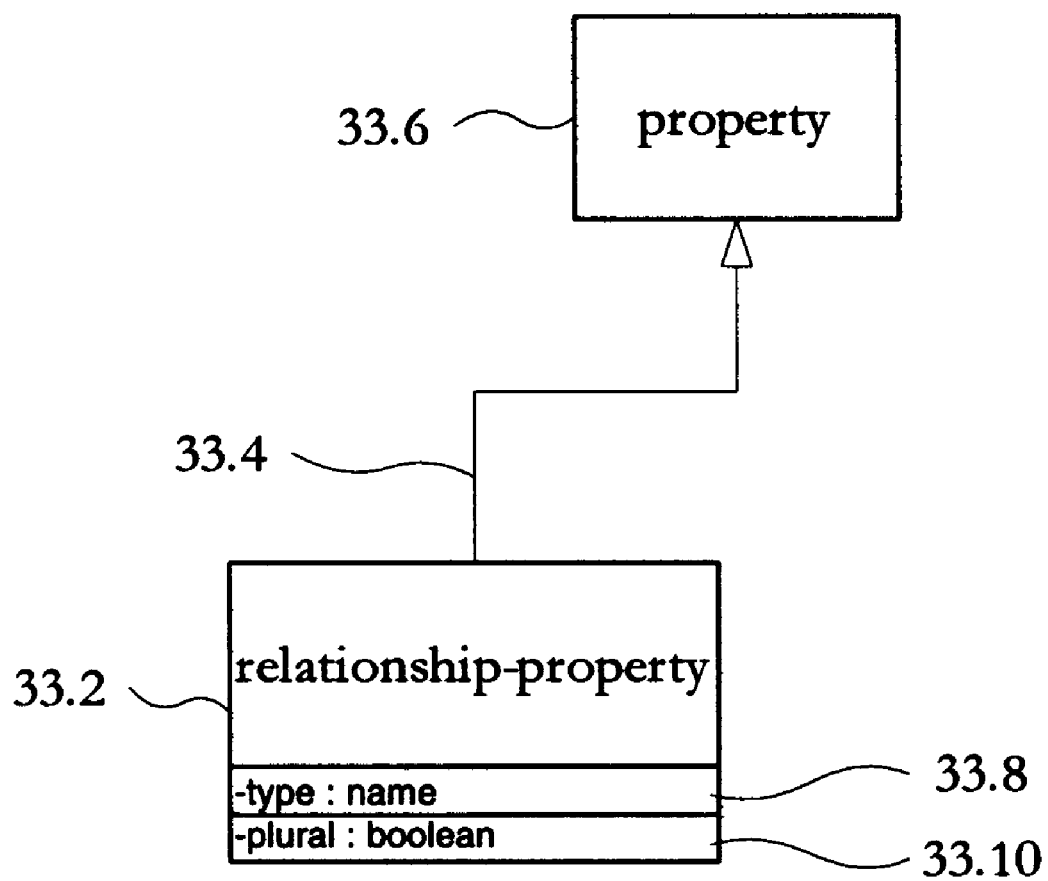
FIG. 33 is a UML depiction of the relationship-property according to a preferred embodiment of the present invention.

As shown in FIG. 33, the relationship-property 33.2, is a generalization 33.4, of property 33.6, and has an attribute called type 33.8, of type name, that represents the name of the type of this relationship. This can be either the name of a DCT or of a native TSE data-type. There is also an attribute called plural 33.10, of type boolean, that if true represents that the associated relationship is plural, or one-to-many.

In the base-property-sets of all DCTs and optionally in all other property-sets, there is a special relationship-property called the self-property, that refers not to an instance of another DCT, but to the current DCT instance. In other words, from the perspective of an instance of a given DCT, this represents a relationship to itself. This is used to allow dynamic configuration not only of the DCOs to which the current instance has a relationship, but of the current DCO itself.

Going back to FIG. 32, the type method-property 32.10 represents a standard form of module behavior called a method. These would be mapped to methods in a Java TSE or member-functions in a C++ TSE.

Figure 34:
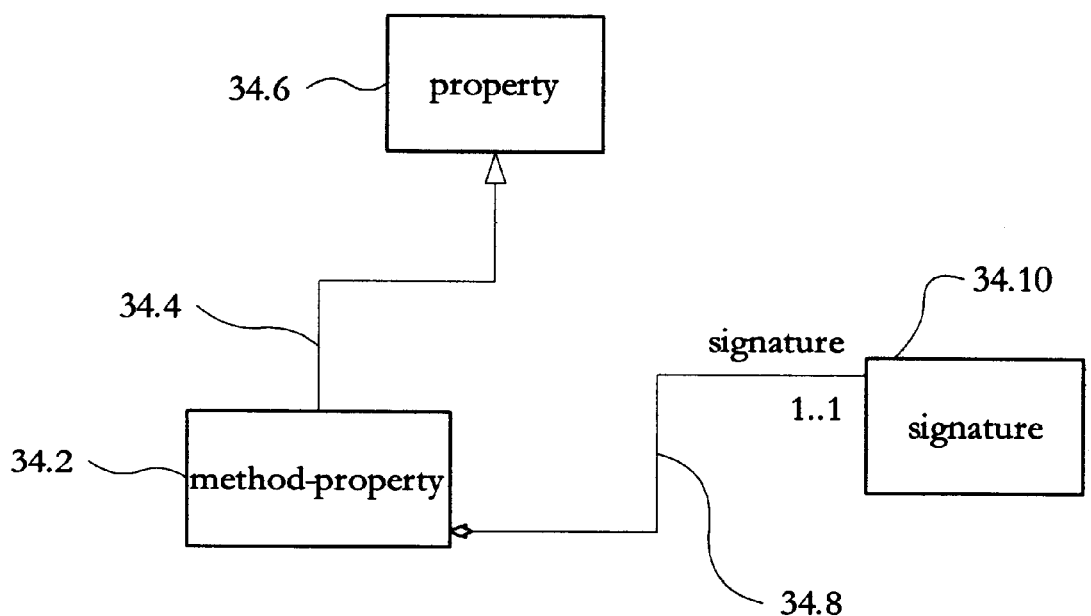
FIG. 34 is a UML depiction of the method-property according to a preferred embodiment of the present invention.

Going forward to FIG. 34, the method-property 34.2 which has a generalization relationship 34.4 to property 34.6 has a one-to-one relationship called signature 34.8 to an instance of type signature 34.10, that represents the signature of the function associated with this method.

Again back to FIG. 32, the type rule-property 32.6, represents an event management specification used to control an event driven behavior. These are interpreted at run-time by a special run-time service called the rules-service, which schedules and executes methods when the event conditions specified in a predicate occur at run-time.

Figure 35:
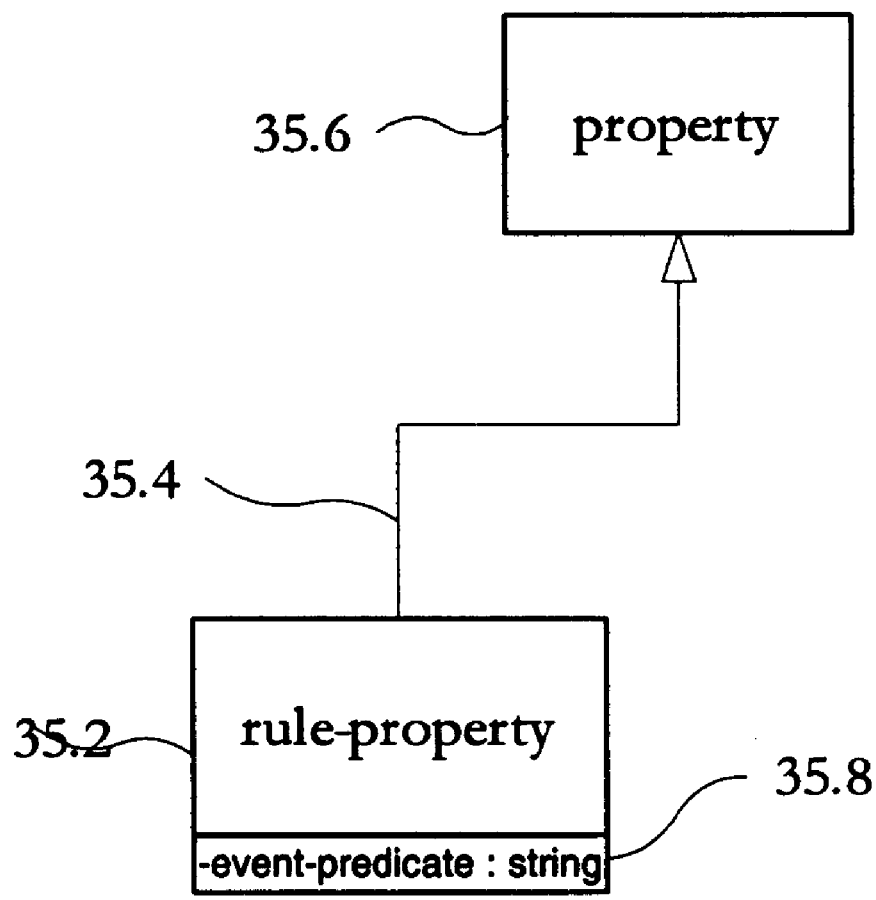
FIG. 35 is a UML depiction of the rule-property according to a preferred embodiment of the present invention.

As shown in FIG. 35, the rule-property 35.2, which is a generalization 35.4 of property 35.6, has an attribute called event-predicate 35.8, of type string, that represents a predicate in TSE source language that is a specification of how and when incoming events trigger the execution of this rule.

Figure 36:
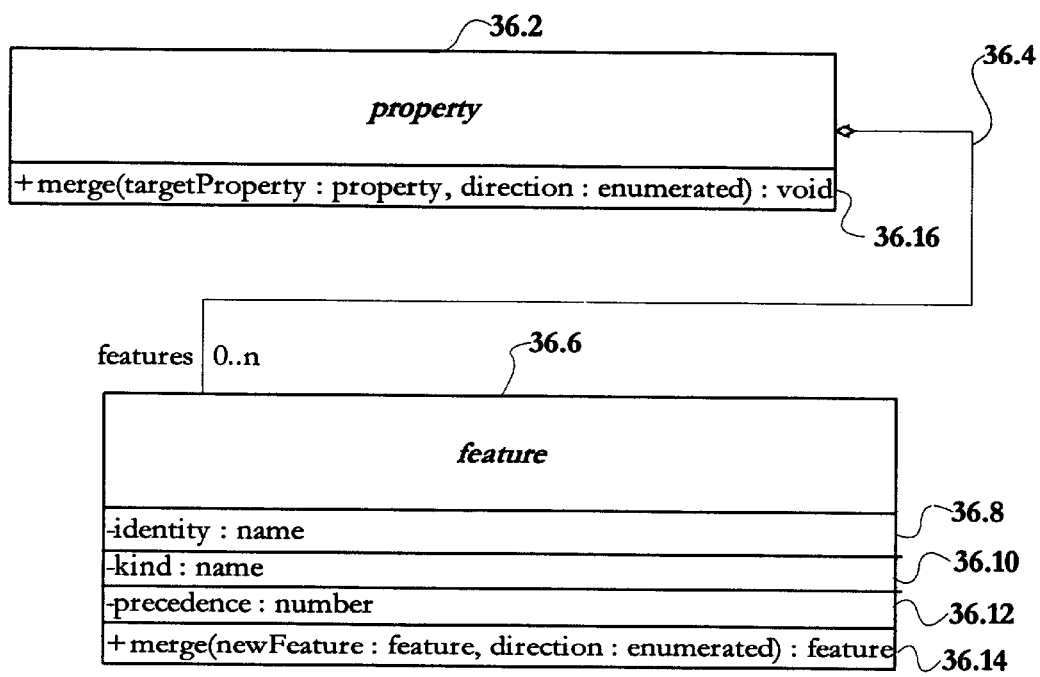
FIG. 36 is a UML depiction of the property according to a preferred embodiment of the present invention.

As shown in FIG. 36, a property has a method called merge 36.16, that participates in the configuration-merge algorithm at the property 36.2 level. This method 36.16 calculates the appropriate set of features in a given property 36.2 to express an intended configuration. This algorithm is an example of a preferred embodiment but is only one in a multitude of possible approaches to this part of the configuration-merge algorithm. It is acknowledged that there are others that may have different or better semantics and/or time or space performance.

An example of pseudo-code that implements this method is shown below:

```
//
// property::merge()
//      merge ourselves into a target property
//      -it is assumed that all aspects of
//          property other than feature set match
//      -it is assumed that there is never more than one
//          feature with same kind where
//          name = kind
//
property::merge(targetProperty, enumerated direction)
{
set<feature> theFeatureSet;
    // go through all features of property
    for each feature in self.features {
        // try to find a feature of same kind in targetProperty
        if( theFeature =
                targetProperty.findFeatureByKind(
                    feature.kind, feature.identity) ) {
            // kind and identity matched so resolve them
            targetProperty.replace(
                theFeature,
                feature.resolve(theFeature, direction)
            );
        // did not find a feature of the same kind and identity
        } else {
            targetProperty.addFeature(theFeature); // add it
        }
    }
}
//
// property::findFeature()
//      find feature of same kind and identity or return NULL
//
feature
property::findFeature(name kind, name identity)
{
    // by definition, features that have no
    // identity never match, even
    // if the kind is the same
    if (identity is equal to NULL) {
        return NULL;
    }
    for each feature in self.features {
        // must have same kind and identity
        if (feature.kind is equal to kind
                and feature.identity is equal to identity) {
            return feature;
        }
    }
    // nothing found, return NULL
    return NULL;
}
```

3. Feature

A feature represents a way that an individual property can be configured. The semantics of features are considered during the configuration algorithm, and represent mutable semantics of a property, while other semantics associated with a property are invariant upon configuration.

As shown in FIG. 36, the abstract type property 36.2, includes a zero-to-many relationship called features 36.4, to the abstract type feature 36.6. There is also an attribute called identity 36.8, of type name, and an attribute called kind 36.10, of type name. The kind attribute is used to categorize features into different types of semantics, and the identity is to resolve features of different identity within the semantic category defined by kind. Also as shown in FIG.

36, each feature type 36.6, includes a number attribute called precedence 36.12. The precedence of a feature determines whether the associated features take precedence over features of the same name and kind in other properties when the DCO based on this DCT is being configured.

A feature has a method called merge 36.14, which participates in the configuration-merge algorithm at the feature 36.6 level. This method takes two identical features from two properties to be merged, and returns a single feature that represents the appropriate semantic characteristic for the merger of those two properties. This method is used iteratively for each kind of feature, as two identical properties in two different property sets are merged. This algorithm is an example of a preferred embodiment but is only one in a multitude of possible approaches to this part of the configuration-merge algorithm. It is acknowledged that there are others that may have different or better semantics and/or time or space performance. An example of pseudocode that implements this method is shown below:

```
//
// feature::merge()
//      Merge two features based on direction. return winner
feature
feature::merge(newFeature, direction)
{
    // in vertical direction, we just override the
    // more general type
    if ( direction is equal to MERGE_VERTICAL ) {
        return newFeature;
    // in horizontal direction, we merge based on precedence
    } else if ( direction is equal to MERGE_HORIZONTAL ) {
        if( self.precedence is greater than
                    targetProperty.precedence ) {
            return self; // we win
        } else if (self.precedence is
                    less than targetProperty.precedence ) {
            return newFeature; // they win
        // should not have a case where precedence matches
        } else {
            throw run-time error
                "could not resolve feature: precedence matches";
        }
    }
}
```

Different services within the DCSM use specialized type features that contain specific characteristics that can be utilized to serve the purposes of the service. Examples of a few of these subtypes are discussed below. This is only a small list of possible feature subtypes and should not be construed to limit the set of possible features. Still referring to FIG. 36, any context-dependent semantics can be encoded as modifications to a property using features. Each of these subtypes assigns a unique value to the kind attribute 36.10 of the feature 36.6 in order to distinguish it as appropriate for the given subtype. The feature's name attribute 36.8 can be set to a particular value to enforce a restriction for a particular feature 36.6 subtype that there be only single instance of a feature 36.6 of a particular kind 36.10, with the same particular value for the name attribute 36.8 that is expressed after an instance of an execution of the configuration-merge algorithm. Alternatively, the feature subtype can allow the name attribute 36.8 to be set to null, and thus allow a feature subtype to permit multiple instances of a feature 36.6 of a given kind to be expressed in a given property after an instance of an execution of the configuration-merge algorithm.

Figure 37:
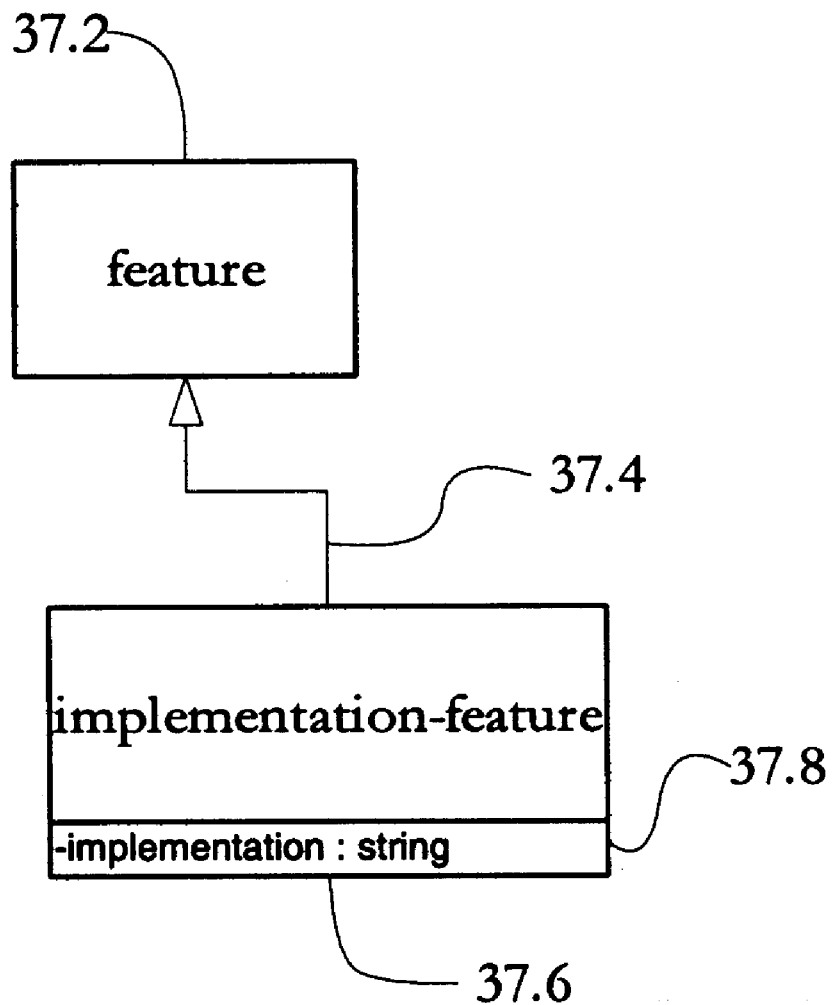
FIG. 37 is a UML depiction of the implementation feature according to a preferred embodiment of the present invention.

As shown in FIG. 37, the implementation-feature 37.6 has a generalization relationship 37.4 to the type feature 37.2. It includes an attribute implementation 37.8, of type string, that represents the body of the TSE method implementation that is an implementation of the associated property. The implementation feature is valid for method and rule properties and is used to allow dynamic configuration of the implementation of the method or rule.

Figure 38:
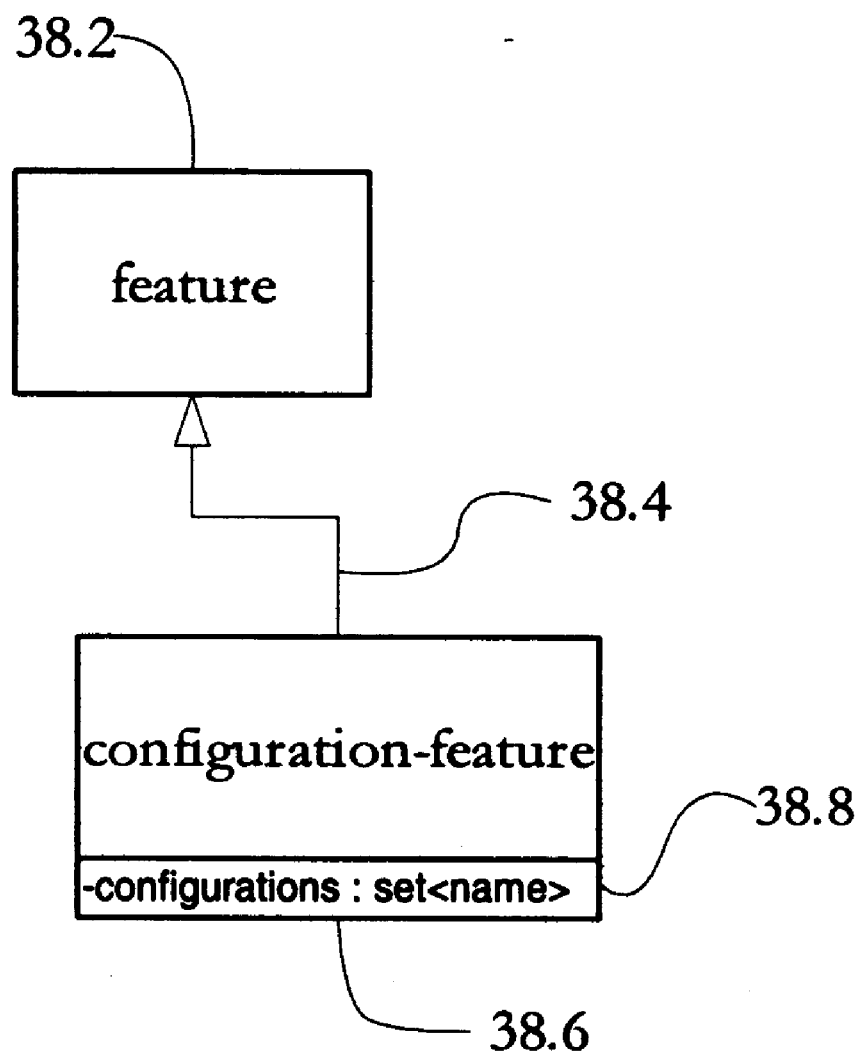
FIG. 38 is a UML depiction of the configuration feature according to a preferred embodiment of the present invention.

As shown in FIG. 38, the configuration-feature 38.6 has a generalization relationship 38.4 to the type feature 38.2. It includes an attribute configurations 38.8, of type set<name> that represents a set of configurations, that should be applied to the relationship-property associated with the configuration-feature.

Figure 39:
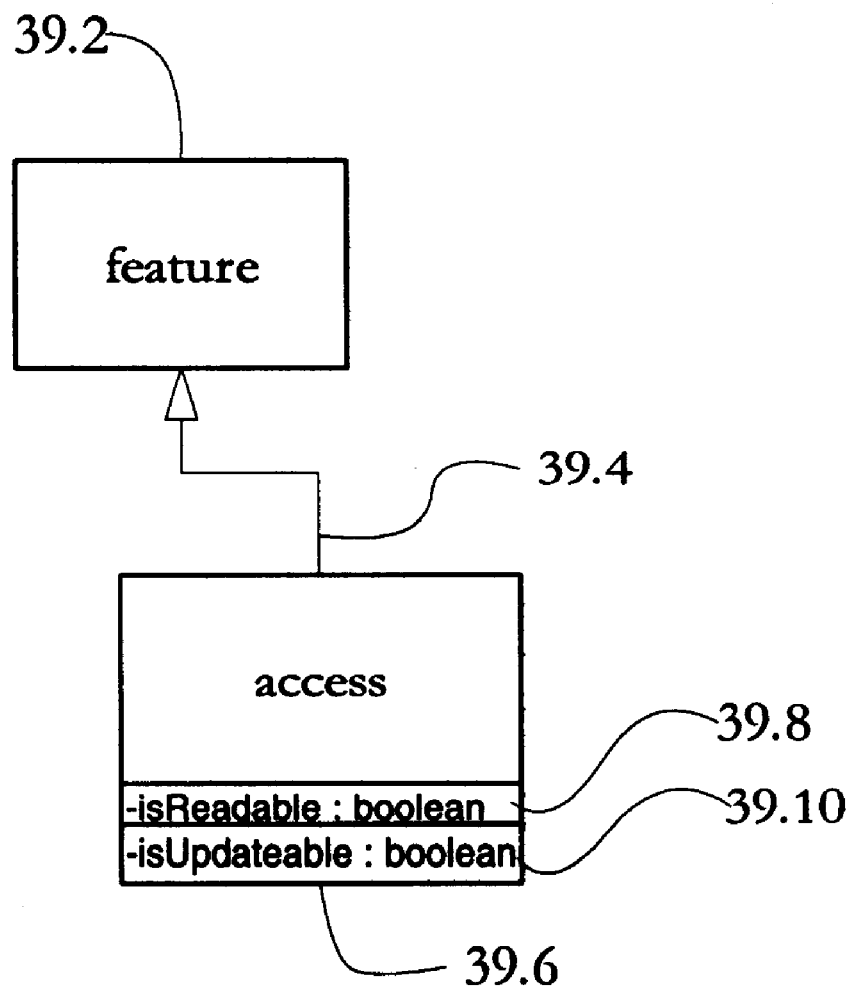
FIG. 39 is a UML depiction of the access feature according to a preferred embodiment of the present invention.

As shown in FIG. 39, the access-feature 39.6 has a generalization relationship 39.4 to the type feature 39.2 and includes an attribute isReadable 39.8 of type boolean. This attribute, if true, means that the associated property, can be read in the context of the current configuration of the associated module. There is a second attribute, isUpdateable 39.10 of type boolean, which if true means that the associated property can be updated in the context of the current configuration of the associated module.

Figure 40:
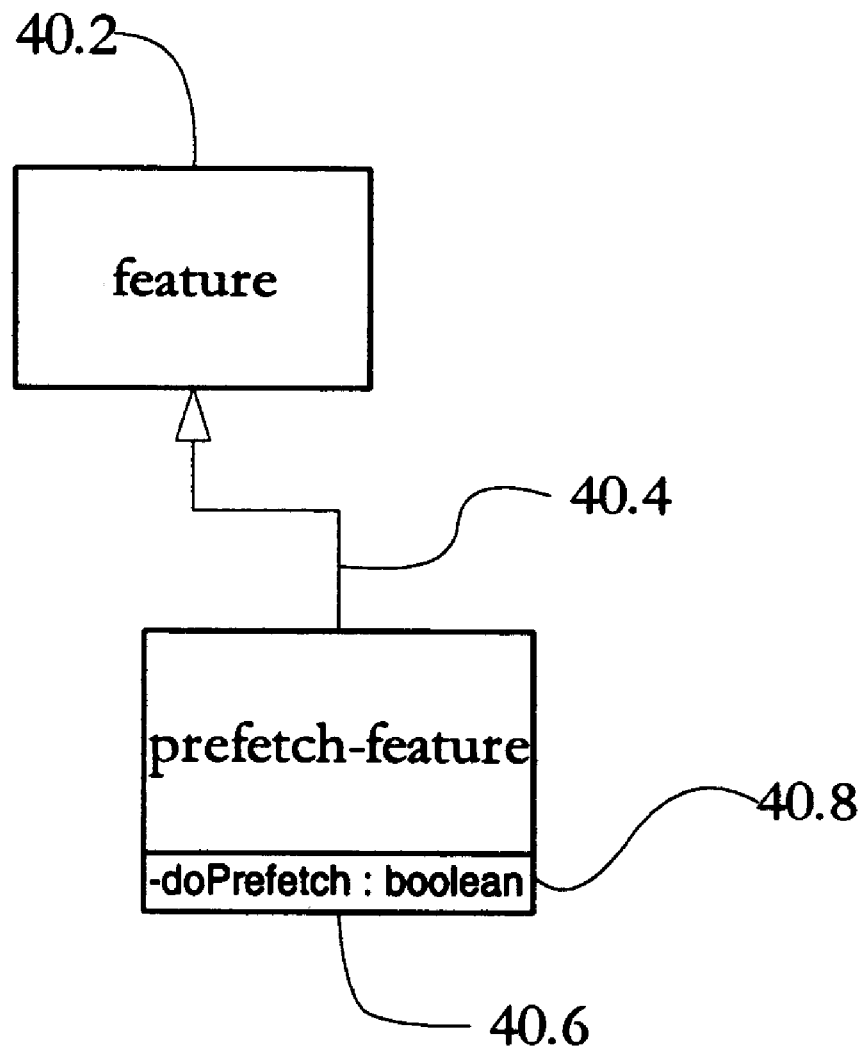
FIG. 40 is a UML depiction of the eager feature according to a preferred embodiment of the present invention.

As shown in FIG. 40, the prefetch-feature 40.6 has a generalization relationship 40.4 to the type feature 40.2 and includes an attribute doPrefetch 40.8 of type boolean. This attribute, if true, means that a declarative indication is made that the associated property, should have an eager strategy applied for system functions such as anticipatory object fetching. If this attribute is false, then a declarative indication is applied that a lazy strategy should be applied for the same system functions.

Figure 41:
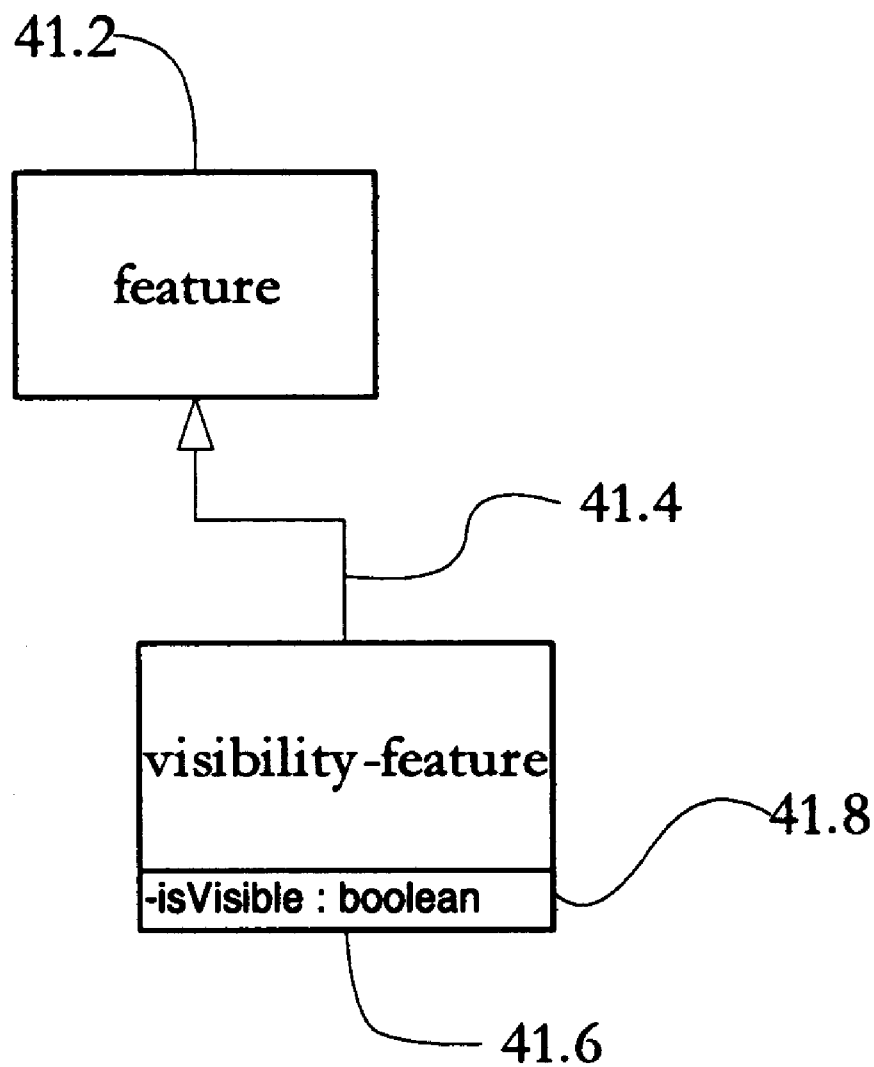
FIG. 41 is a UML depiction of the visibility feature according to a preferred embodiment of the present invention.

As shown in FIG. 41, the visibility-feature 41.6 has a generalization relationship 41.4 to the type feature 41.2 and includes an attribute isVisible 41.8 of type boolean. This attribute, if true, means that the associated property, is visible and the GUI generation system will display it as a visible part of the module-graph.

Figure 42:
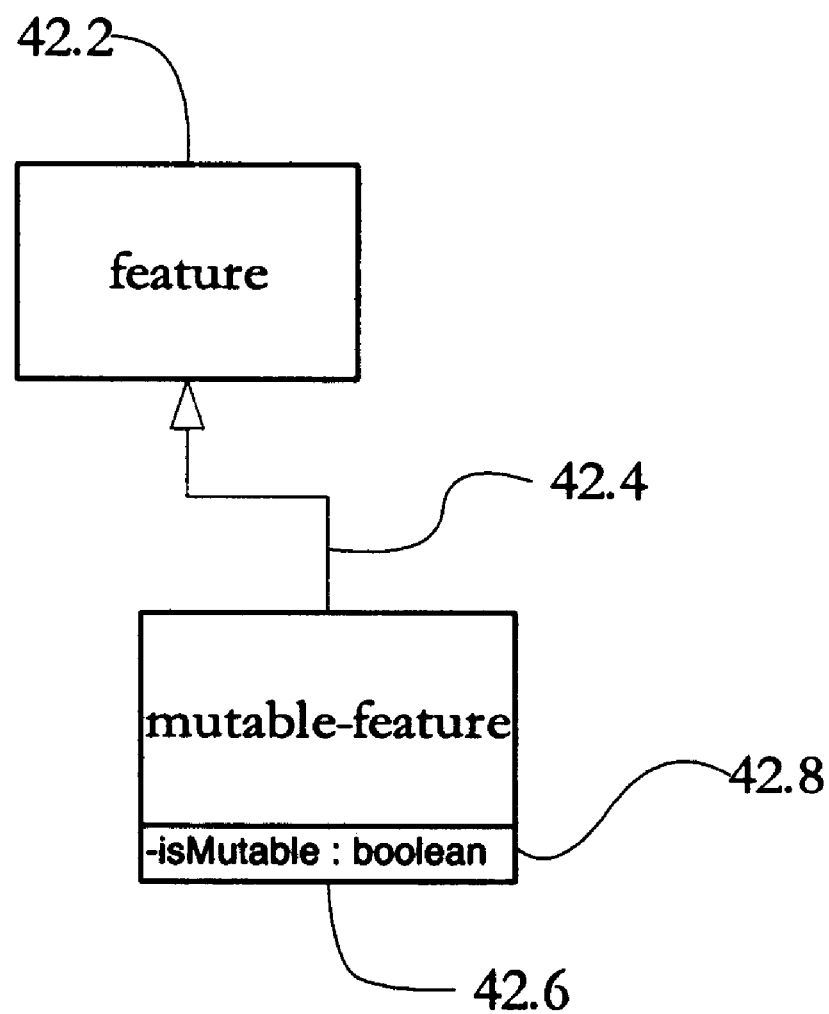
FIG. 42 is a UML depiction of the mutable feature according to a preferred embodiment of the present invention.

As shown in FIG. 42, the mutable-feature 42.6 has a generalization relationship 42.4 to the type feature 42.2 and includes an attribute isMutable 42.8 of type boolean. This attribute, if true, means that the associated property, should be editable by the user and the GUI generation system will handle it as a modifiable part of the module-graph.

Figure 43:
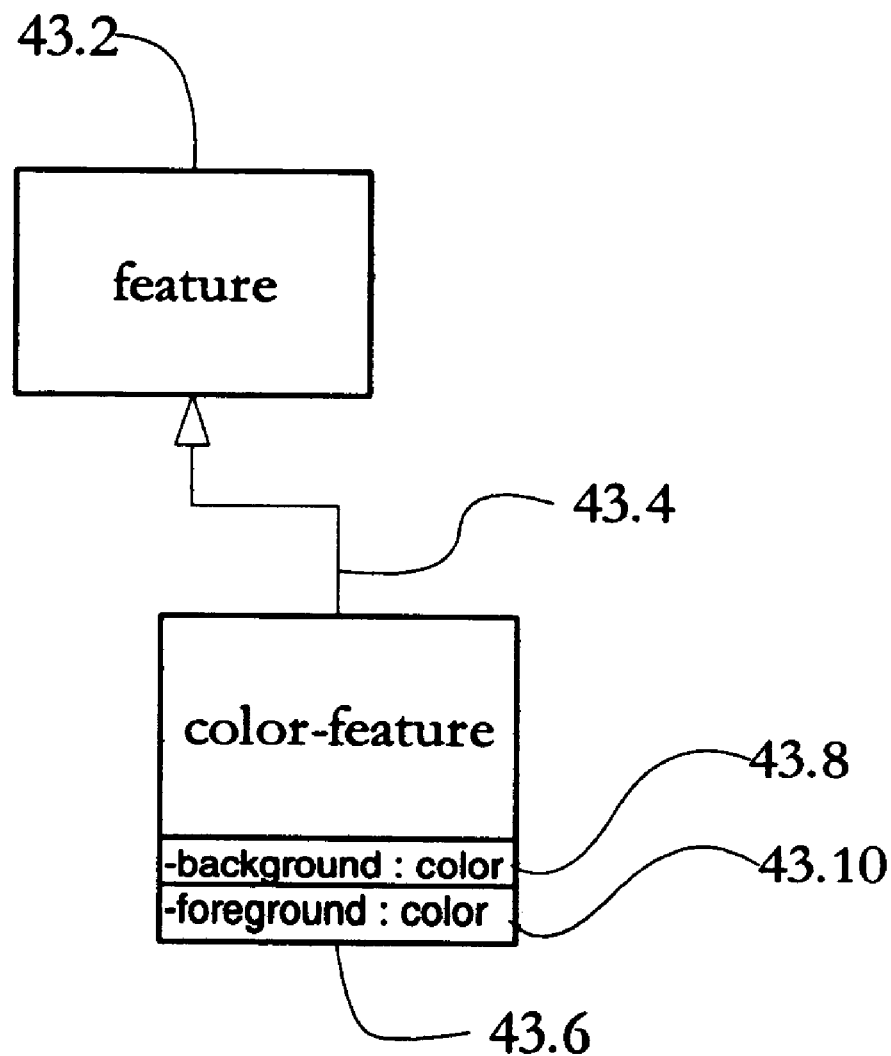
FIG. 43 is a UML depiction of the color feature according to a preferred embodiment of the present invention.

As shown in FIG. 43, the color-feature 43.6 has a generalization relationship 43.4 to the type feature 43.2 and includes an attribute background 43.8 of type color, that is a declarative indication for a specific color to be used in the generated GUI representation of the background visualization of the associated property. There is also an attribute foreground 43.10 of type color that serves the same purpose for the foreground color of the GUI visualization.

Figure 44:
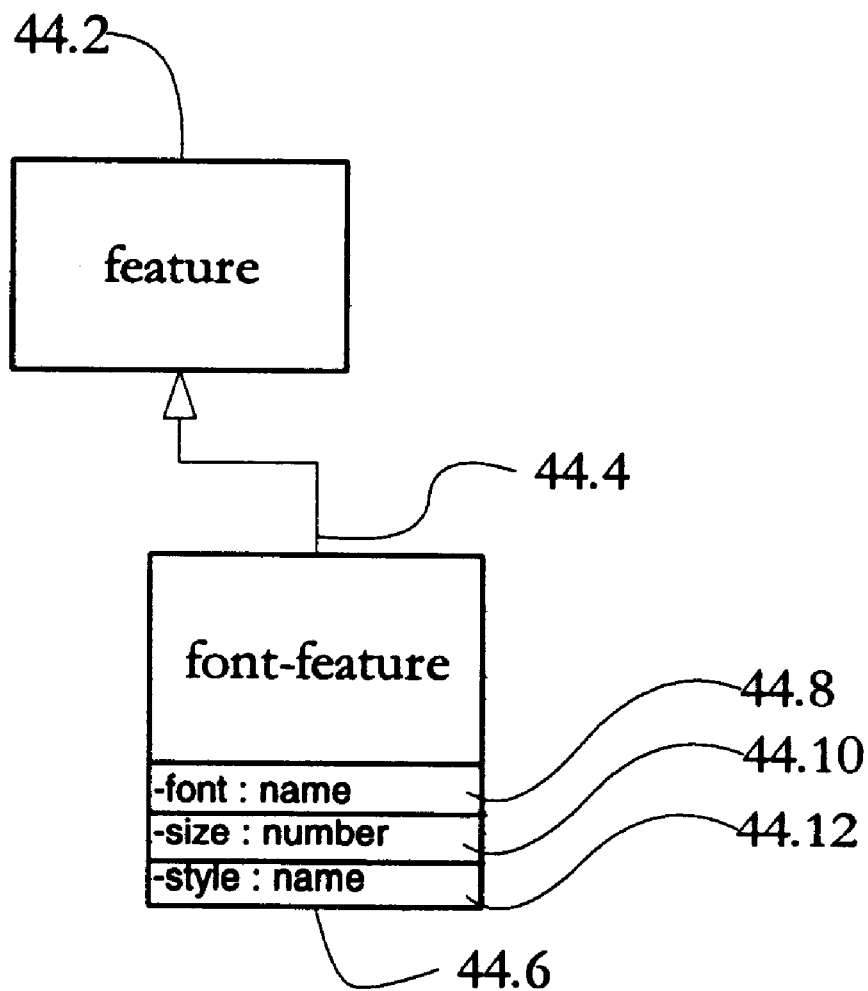
FIG. 44 is a UML depiction of the font feature according to a preferred embodiment of the present invention.

As shown in FIG. 44, the font-feature 44.6 has a generalization relationship 44.4 to the type feature 44.2 and includes the attributes font 44.8 of type name, size 44.10 of type number, and style 44.12 of type name which represent the font type, point size and style to use in the generated GUI visualization associated with this property.

Figure 45:
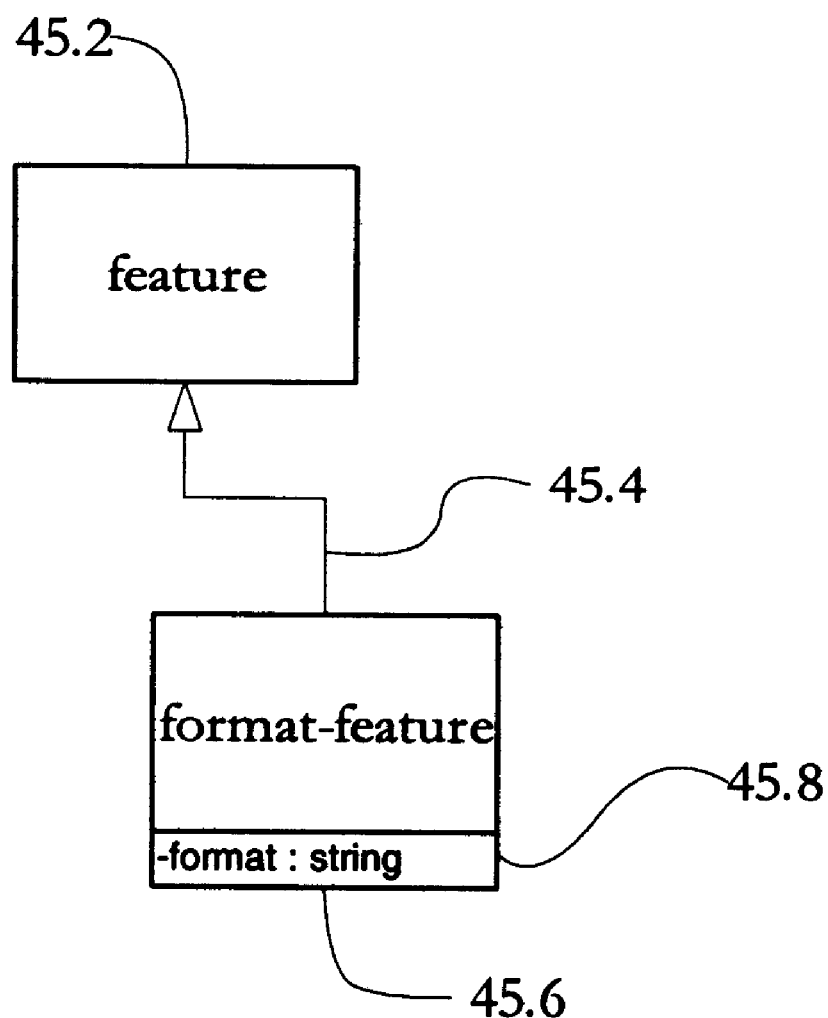
FIG. 45 is a UML depiction of the format feature according to a preferred embodiment of the present invention.

As shown in FIG. 45, the format-feature 45.6 has a generalization relationship 45.4 to the type feature 45.2 and includes an attribute format 45.8 of type string, that contains a specification in string form of how the associated property's visualization should be formatted for presentation to the user by the GUI generation system.

Figure 46:
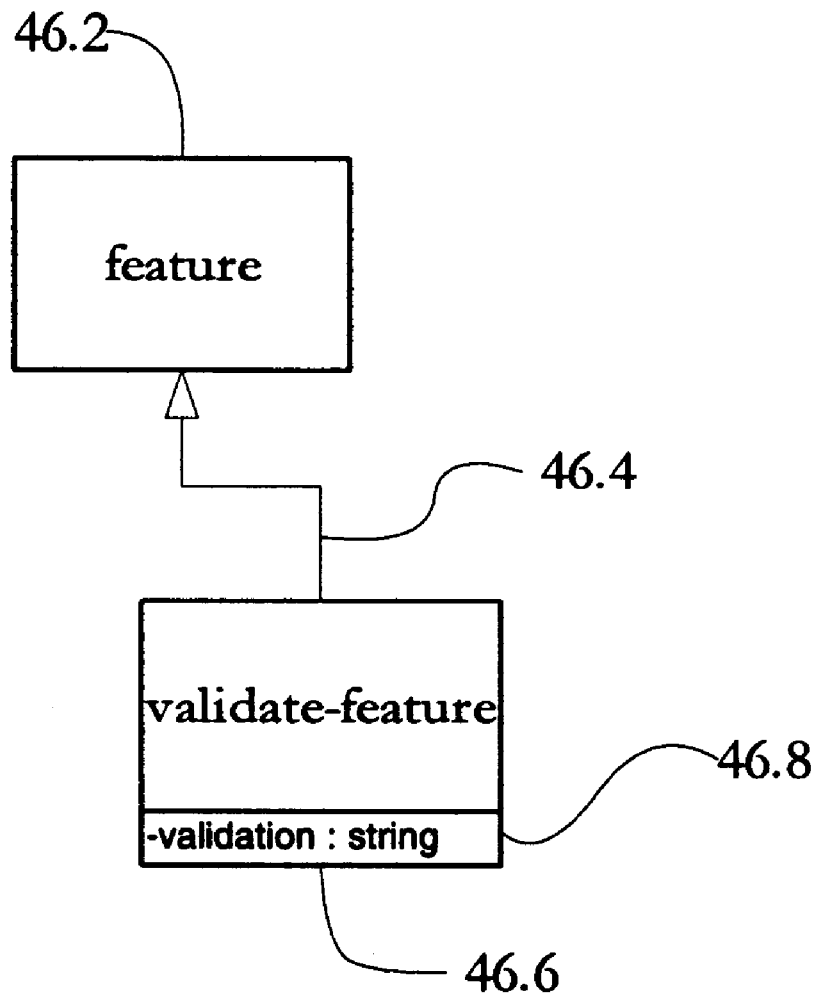
FIG. 46 is a UML depiction of the validation feature according to a preferred embodiment of the present invention.

As shown in FIG. 46, the validate-feature 46.6 has a generalization relationship 46.4 to the type feature 46.2 and includes an attribute validation 46.8 of type string contains a specification in string form of how the associated property's visualization should be validated or constrained on the client as the user edits it.

Figure 47:
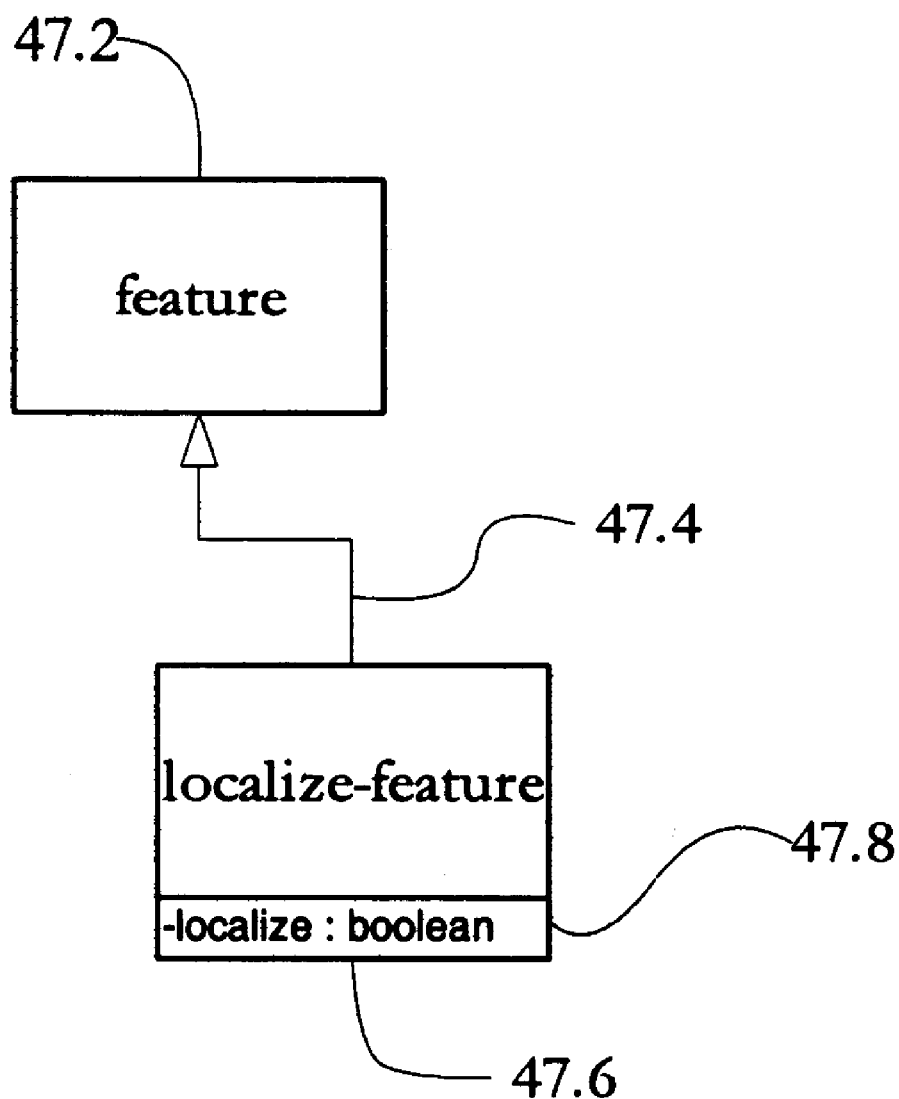
FIG. 47 is a UML depiction of the localize feature according to a preferred embodiment of the present invention.

As shown in FIG. 47, the localize-feature 47.6 has a generalization relationship 47.4 to the type feature 47.2 and includes an attribute localize 47.8 of type boolean, that if true, directs the GUI generation system to localize the visualization as appropriate for the current client. Localization is the change in the representation of a property so as to match the language or culture of the location within which the client is located.

Figure 48:
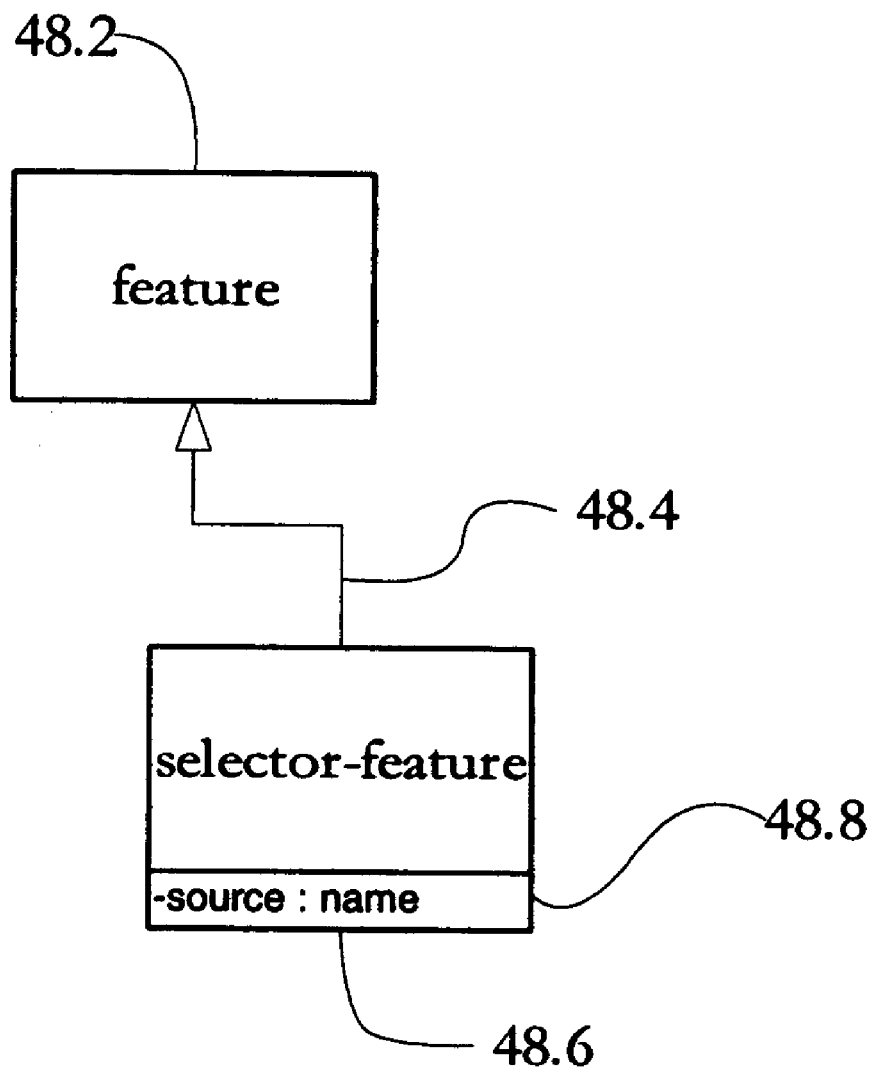
FIG. 48 is a UML depiction of the selector feature according to a preferred embodiment of the present invention.

As shown in FIG. 48, the selector-feature 48.6 has a generalization relationship 48.4 to the type feature 48.2 and includes an attribute source 48.8 of type name, that refers to a relationship-property navigated to from the current module that contains one or more values that should be displayed in a selector metaphor in the visualization of the associated property in the generated GUI. This selector metaphor may, for example, take the form of a drop-list that the user can select from when editing a relationship in its visualized form.

Figure 49:
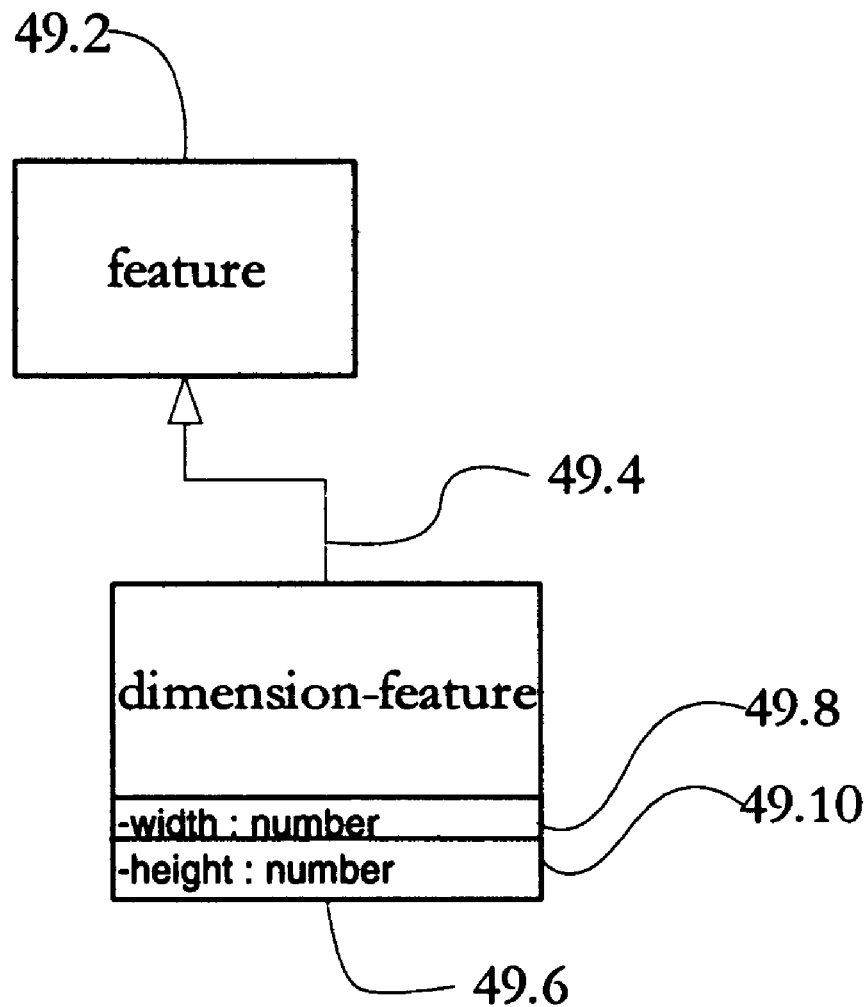
FIG. 49 is a UML depiction of the dimension feature according to a preferred embodiment of the present invention.

As shown in FIG. 49, the dimension-feature 49.6 has a generalization relationship 49.4 to the type feature 49.2 and includes the attributes width 49.8 and height 49.10 both of type number. These attributes are declarative indications to the GUI generator about the width and height of the visualization of the associated property that should be generated.

Figure 50:
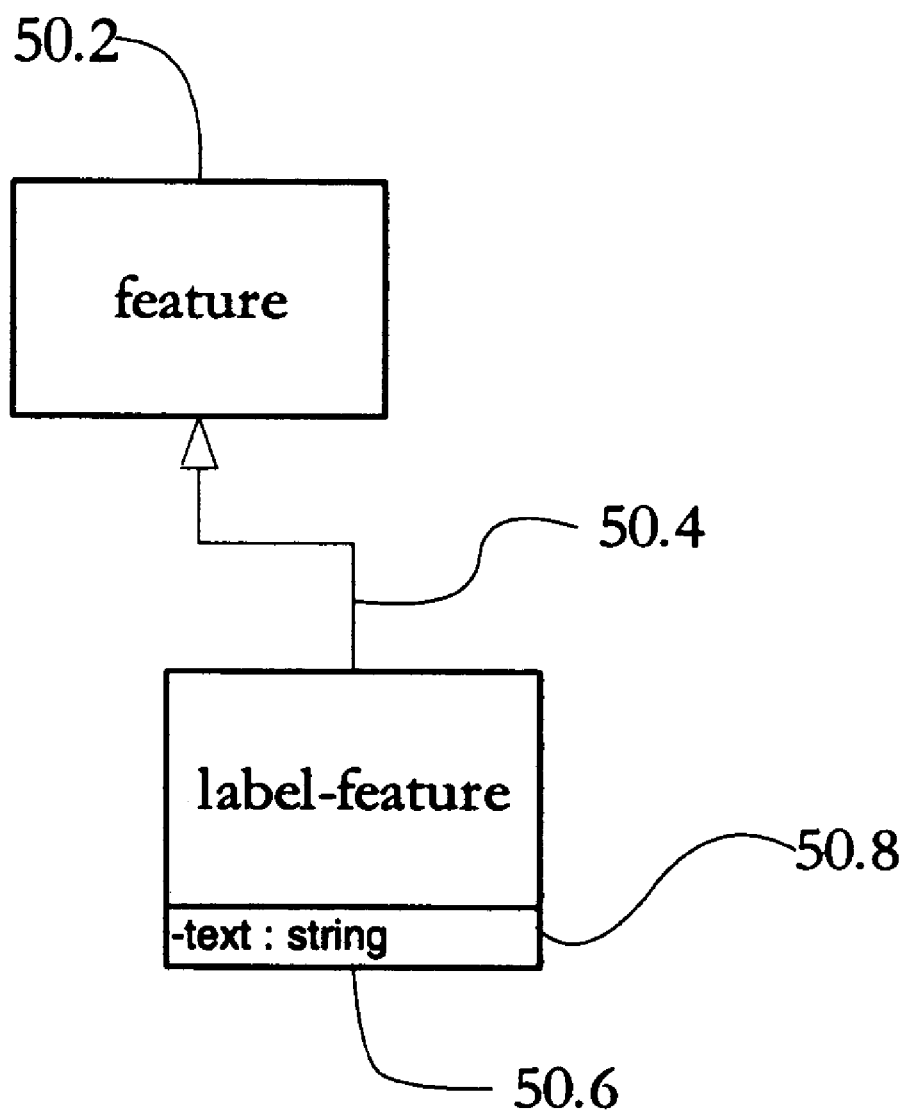
FIG. 50 is a UML depiction of the label feature according to a preferred embodiment of the present invention.

As shown in FIG. 50, the label-feature 50.6 has a generalization relationship 50.4 to the type feature 50.2 and includes an attribute text 50.8 of type string. This attribute is the text that should be applied as a label for the associated property. The GUI generation system uses this information to generate a label as a part of the visualization of the associated property.

Figure 51:
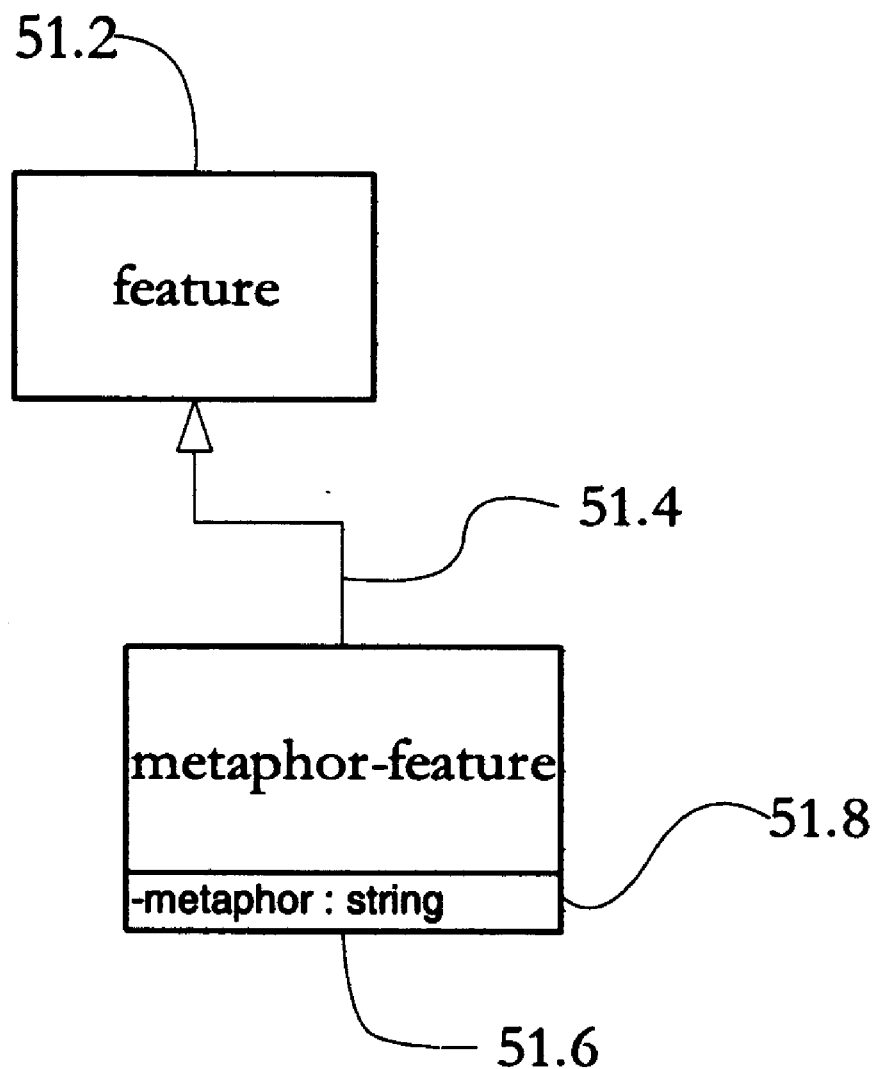
FIG. 51 is a UML depiction of the metaphor feature according to a preferred embodiment of the present invention.

As shown in FIG. 51, the metaphor-feature 51.6 has a generalization relationship 51.4 to the type feature 51.2 and includes an attribute metaphor 51.8 of type string. This attribute is the specification of what metaphor or visualization technique is recommended to be used when the associated property has its GUI representation generated. For example, the metaphor for a number property could generate a visualization of a simple field, a GUI spin control, or a control knob.

Figure 52:
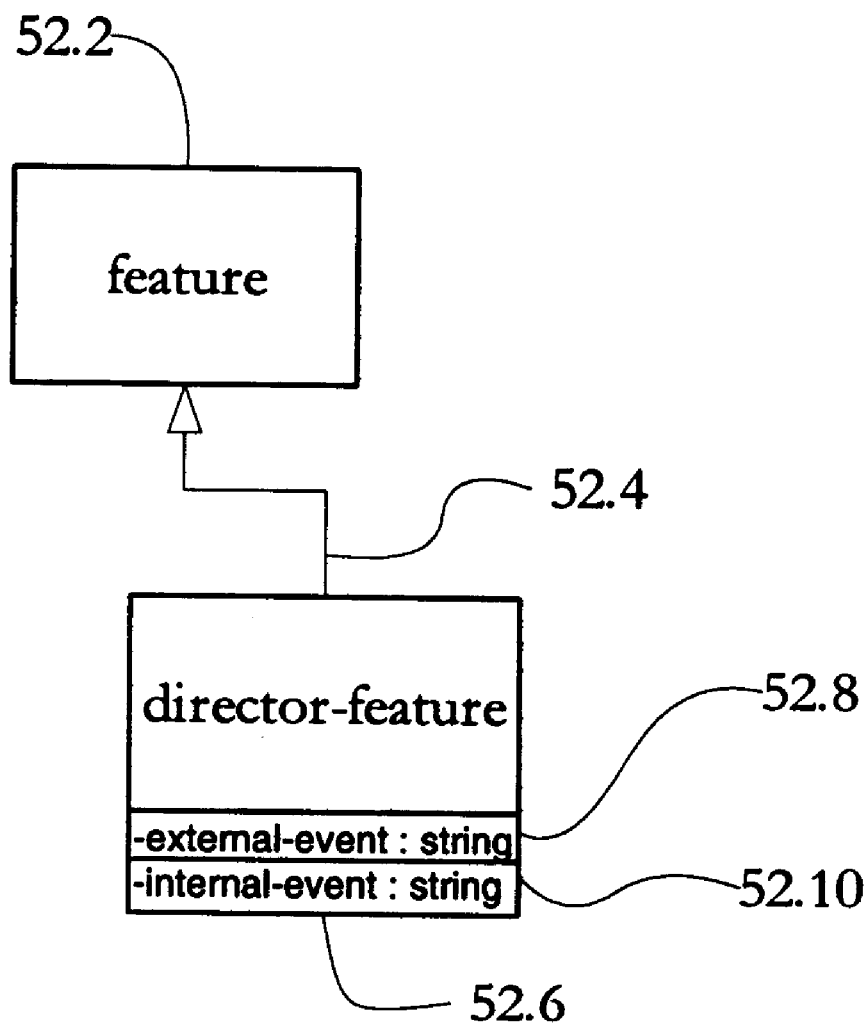
FIG. 52 is a UML depiction of the director feature according to a preferred embodiment of the present invention.

As shown in FIG. 52, the director-feature 52.6 has a generalization relationship 52.4 to the type feature 52.2 and includes an attribute external-event 52.8 of type string that specifies the name of an external event as known to, and coming from, the client, that should be directed to internal event named by the attribute internal-event 52.10 also of type string, that is known by and can be interpreted by a rule-property event predicate.

Figure 53:
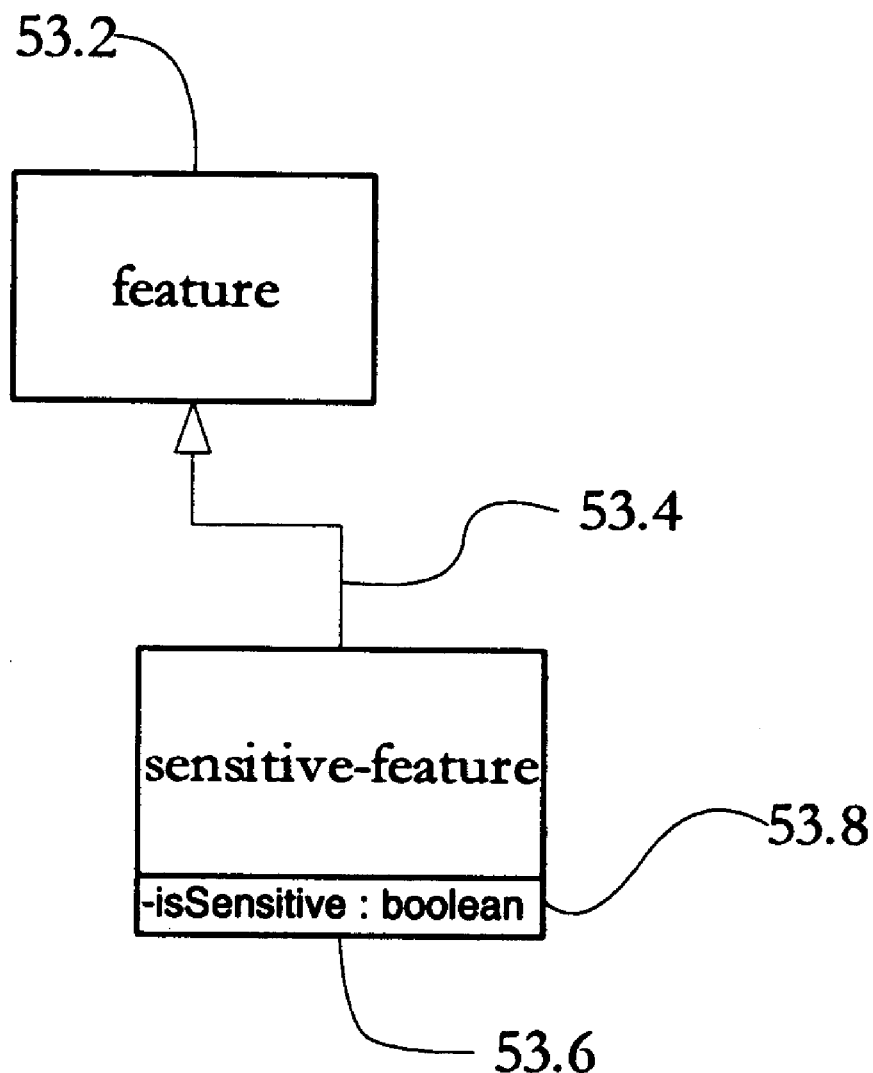
FIG. 53 is a UML depiction of the sensitive feature according to a preferred embodiment of the present invention.

As shown in FIG. 53, the sensitive-feature 53.6 has a generalization relationship 53.4 to the type feature 53.2 and includes an attribute isSensitive 53.8 of type boolean that if true, is a demand of the concurrency control system to control concurrency on the associated property. If this is false, then the concurrency control system is directed not to control currency on the associated property.

Figure 54:
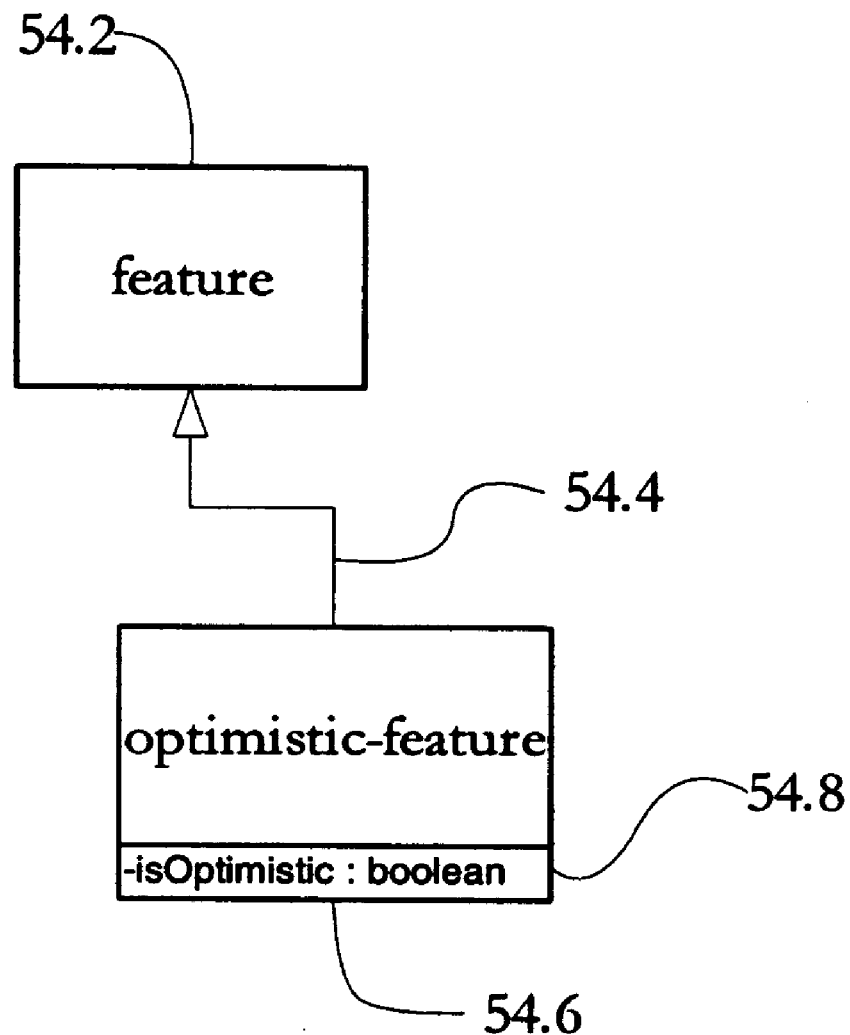
FIG. 54 is a UML depiction of the optimistic feature according to a preferred embodiment of the present invention.

As shown in FIG. 54, the optimistic-feature 54.6 has a generalization relationship 54.4 to the type feature 54.2 and includes an attribute isOptimistic 54.8 of type boolean that is a declarative indication to the transaction system to treat operations on the associated property using optimistic techniques.

Figure 55:
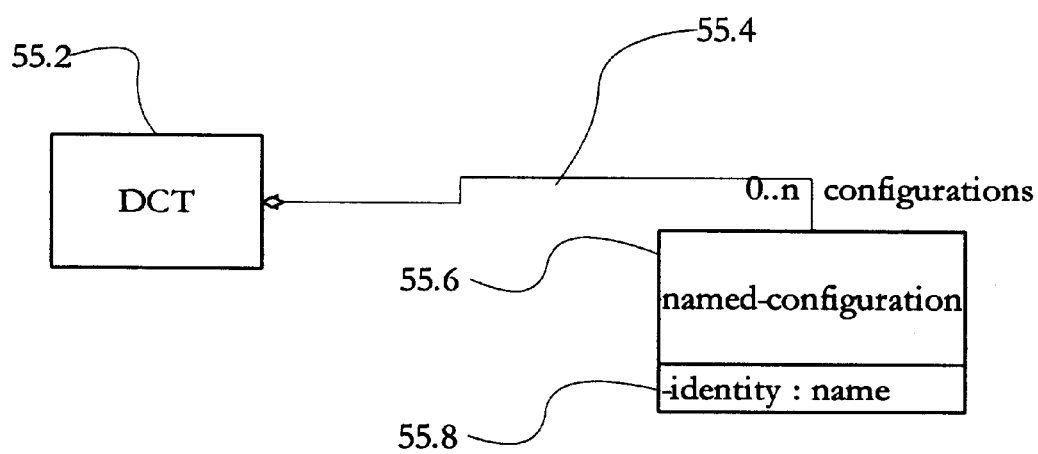
FIG. 55 is a UML depiction of named configurations according to a preferred embodiment of the present invention.

As shown in FIG. 55, the type DCT 55.2, includes a zero-to-many relationship called configurations 55.4, to the type named-configuration, 55.6. Each named-configuration 55.6, includes an attribute called identity 55.8, of type name, which uniquely identifies each instance of the type named-configuration 55.6, from other instances within the relationship configurations 55.4. This construct represents a configuration that can be requested of the instances of the associated DCT via a configuration-request.

Figure 56:
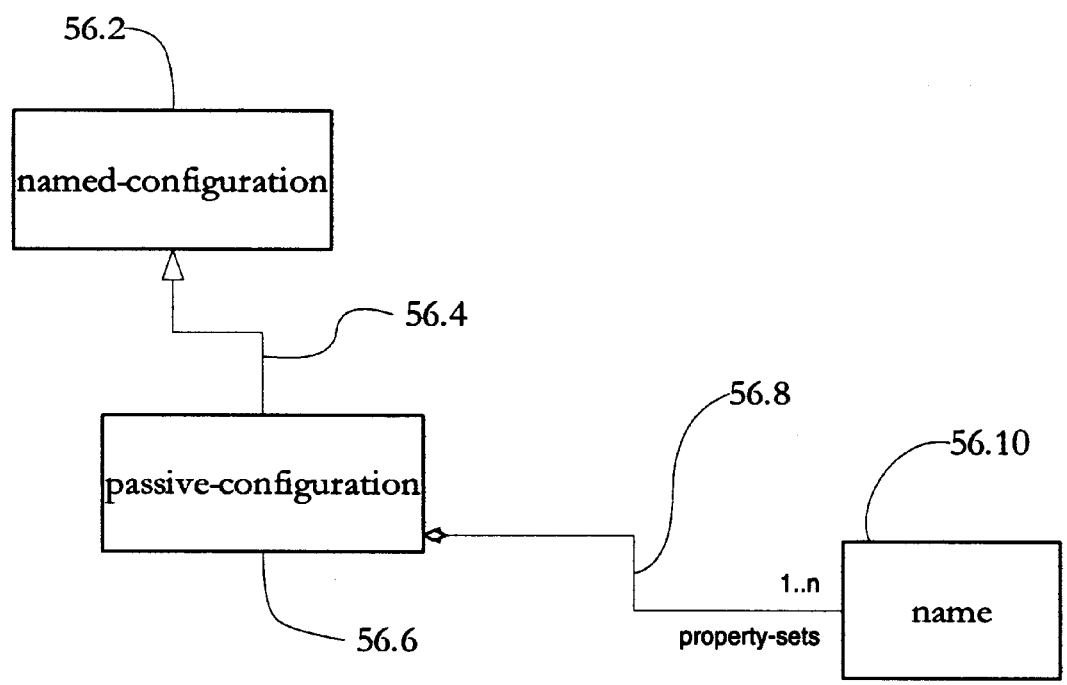
FIG. 56 is a UML depiction of passive configurations according to a preferred embodiment of the present invention.

As shown in FIG. 56, the type named-configuration 56.2 is generalized 56.4 by the type passive-configuration 56.6. Each passive-configuration type 56.6 includes a one-to-many relationship called property-sets 56.8 to the type name 56.10. Each instance of name in property-sets 56.8 refers to the name of a property-set (not shown) within the DCT or a DCT of a more-general-type that is to be applied to express this configuration.

Figure 57:
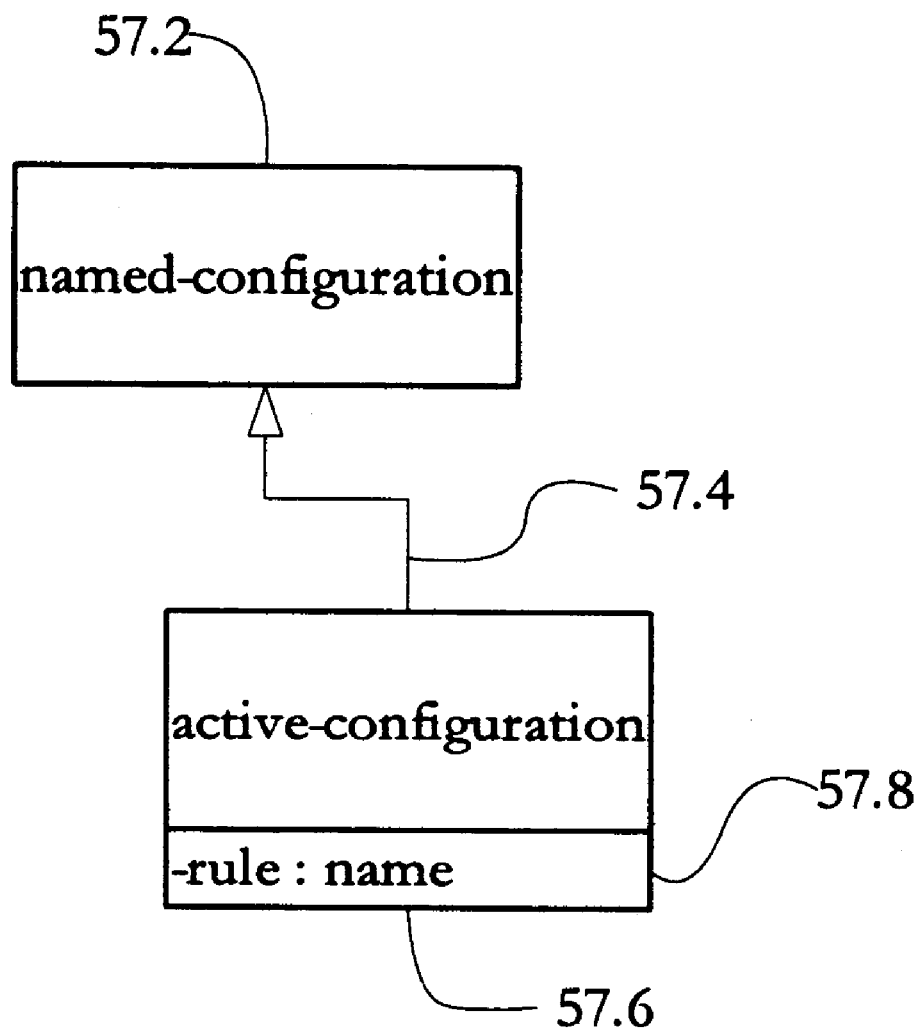
FIG. 57 is a UML depiction of the active configuration according to a preferred embodiment of the present invention.

As shown in FIG. 57, the type named-configuration 57.2 is generalized 57.4 by the type active-configuration 57.6. Each active-configuration 57.6 includes an attribute called rule 57.8, of type name. This is the name of a rule-property that is presumed to return a set of names of property-sets (not shown) within the DCT or a DCT of a more-general-type to be applied to express this configuration.

Figure 58:
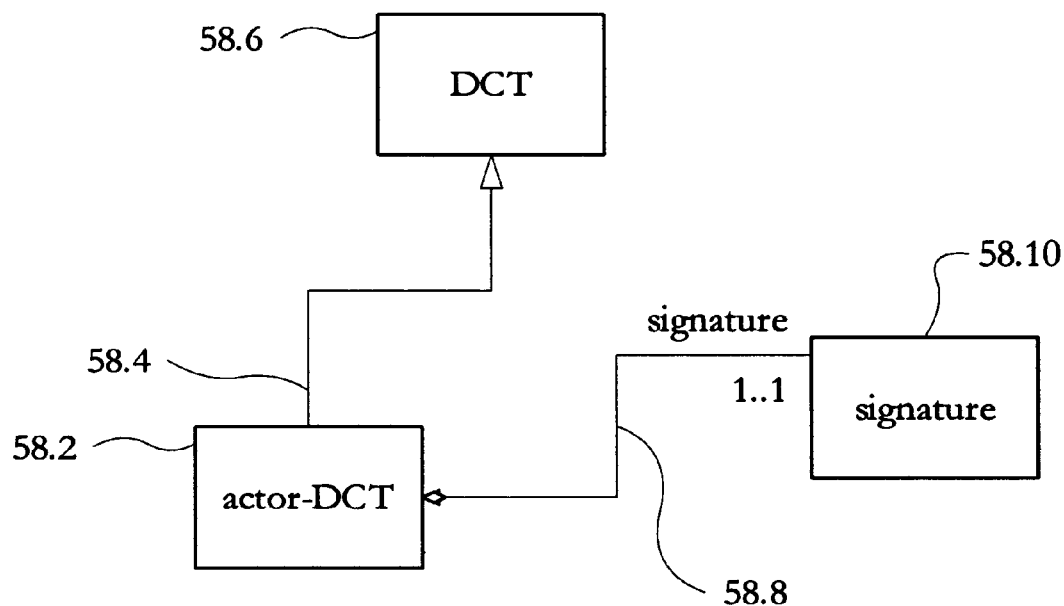
FIG. 58 is a UML depiction of the actor-DCT according to a preferred embodiment of the present invention.

As shown in FIG. 58, a construct called an actor-DCT 58.2 is a generalization 58.4, of the type DCT 58.6. The type actor-DCT 58.2 includes a one-to-one relationship called signature 58.8, to the type signature 58.10. This is an abstract type used to model a callable module that is inherited by both process-DCTs and subprocess-DCTs.

Figure 59:
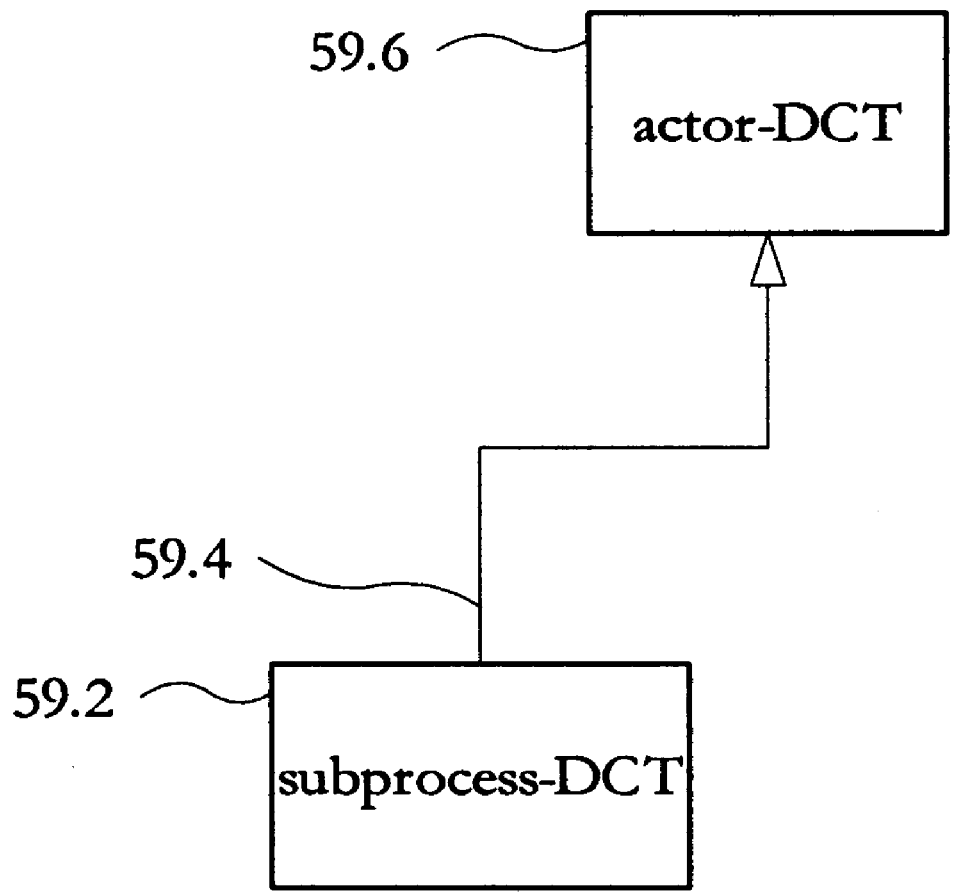
FIG. 59 is a UML depiction of the subprocess-DCT according to a preferred embodiment of the present invention.

As shown in FIG. 59, a construct called an subprocess-DCT 59.2, is a generalization 59.4, of the type actor-DCT 59.6. This represents the root module in a subprocess.

Figure 60:
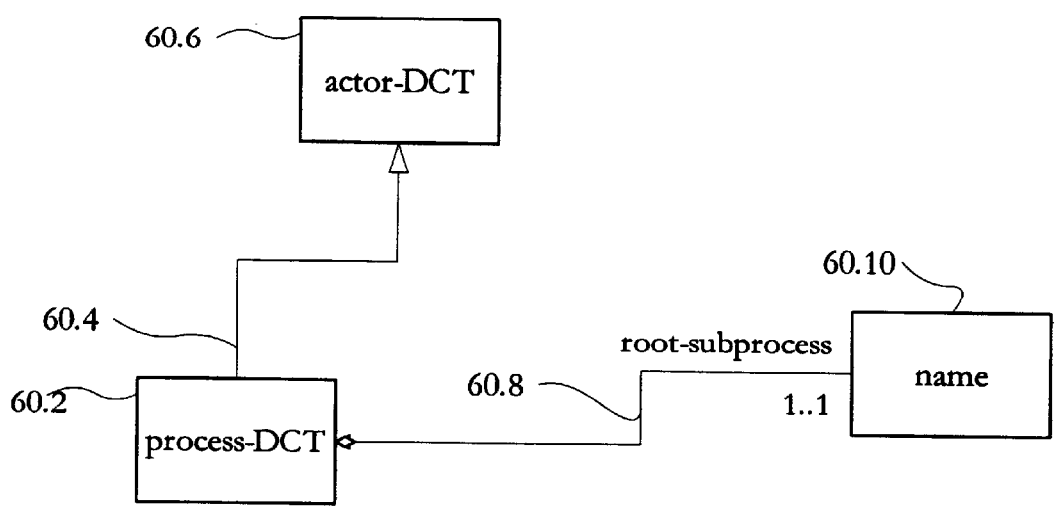
FIG. 60 is a UML depiction of the process-DCT according to a preferred embodiment of the present invention.

As shown in FIG. 60, a construct called an process-DCT 60.2, is a generalization 60.4, of the type actor-DCT 60.6. The type process-DCT 60.2, includes a one-to-one relationship called root-subprocess 60.8, to the type name 60.10. This name identifies the subprocess-DCT that is instantiated to become the root subprocess in the process that is an instantiation of this process-DCT 60.2.

3.1 Run-time Constructs

The following section describes the basic DCSM run-time constructs: DCO, relationship accessors, collection-DCO and actor-DCO.

The DCO is the run-time instantiation of a DCT. This is analogous to an object being the instantiation of a class in C++ or Java. It represents at run-time a particular run-time entity in a particular run-time context that has been modeled in the form specified by the DCO's associated DCT. There are potentially many DCOs created for each DCT just as there may be multiple employees modeled by a single employee type. Also there can be multiple DCO objects created in a given run-time context, one for each desired configuration of a particular entity. For example, there may be in a given subprocess, two DCOs that are both instances of the employee type, each representing the same employee. The first DCO might be in a relationship where the client in the subprocess module graph wants a configuration expressing a available employee skill profile semantic. The second possibly in a relationship where the client in the subprocess module graph wants a different configuration expressed, for example a employee-compensation plan semantic. Each instance represents the same entity, a particular employee, but is responding to potentially different configuration requests, skill-profile versus compensation plan, in different parts of the module-graph.

Figure 61:
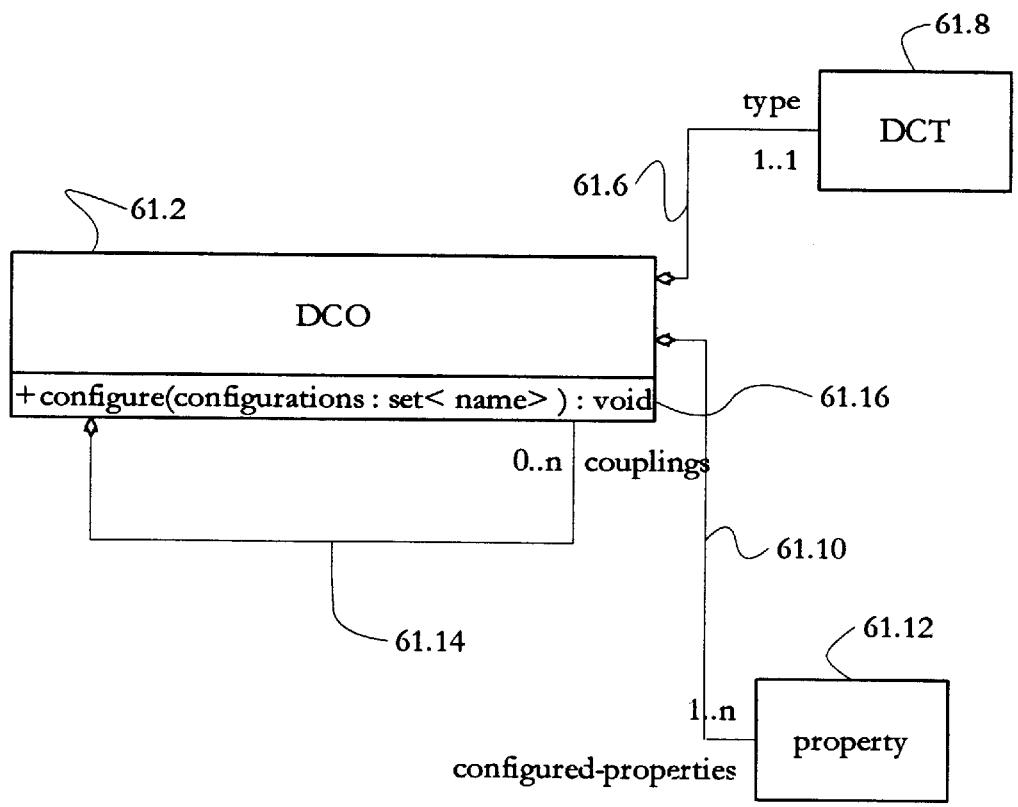
FIG. 61 is a UML depiction of the DCO according to a preferred embodiment of the present invention.

As shown in FIG. 61, the type DCO 61.2 includes a one-to-one relationship called type 61.6 to the previously defined type DCT 61.8. This is the shared design-time information that at run-time represents the type from which this DCO was instantiated. It should be noted that this method of directly using the design-time data-structures as represented by the DCT at run-time is only one particular embodiment of the present invention. Another option is to convert the design-time information into another form more optimal for a particular run-time environment. The advantage of using the design-time information directly is in its simplicity and re-use. The advantage of using a modified run-time form is that it can be made more appropriate for run-time purposes including, for example, time and space optimizations that are not appropriate for design-time information.

The type DCO 61.2 includes a one-to-many relationship called configured-properties 61.10 to the type property 61.12. These are the per-instance properties of the DCO that resulted from specific configuration requests made to the DCO, and that were calculated using the configuration-merge algorithm. Again this re-use of the design-time construct type property, 61.12 is only one particular embodiment of the present invention. Translation to a run-time version of a property may be appropriate for performance or other reasons.

The type DCO 61.2 includes a zero-to-many relationship called couplings 61.14 to the type DCO 61.2. This represents the run-time couplings to other DCOs (not shown) that the associated DCT has specified using relationship-properties. Using these couplings, DCOs are linked together into a module-graph at run-time.

The type DCO 61.2 includes an operation or method called configure 61.16. This is the top level entry point of the configuration-merge algorithm. This method on the DCO takes a set of name instances that each represent a desired named-configuration specified within the associated DCT. The configure operation performs a merge of the multiple property-sets identified in the DCT by the named-configurations. It is the method called when a client DCO wants to issue a configuration request to a given server DCO. This method is used iteratively for each kind of feature, as two identical properties in two different property sets are merged.

This algorithm is an example of a preferred embodiment but is only one in a multitude of possible approaches to this part of the configuration-merge algorithm. It is acknowledged that there are others that may have different or better semantics and/or time or space performance.

An example of pseudo-code that implements this method is shown below:

```
//
// DCO::configure()
//      takes a set of names that represent
//          overlays and configures the DCO
//
DCO::configure(set<name> configurations)
    // initialize theDCT to the most specific type
    DCT theDCT = self.type;
    // initialize theStack for traversal memory
    Stack theStack;
    // clear current configured-property-set
    self.configured-property-set.clear();
    // traverse more-general-type until
    // at most-general-type in DCT type hiearchy
    while ( theDCT.more-general-type is not equal to NULL ) {
        // store for later traversal downwards
        theStack.push(theDCT);
        theDCT = theDCT.more-general-type;
    }
    // traverse from most-general-type
    // to most-specific-type merging at each level
    // the top of stack should contain the most-general-type
    do {
        // get a level of type heiarchy to merge
        theDCT = theStack.pop();
        // merge configurations at this
        // level into target property set
        theDCT.merge(configurations,
                self.configured-property-set);
        // update the dispatch table
        // account for the current level
        // of type, for super implementation
        // dispatch in methods
        self.dispatchTable.update(theDCT);
    } while (theDCT is not equal to self.type)
}
```

Figure 62:
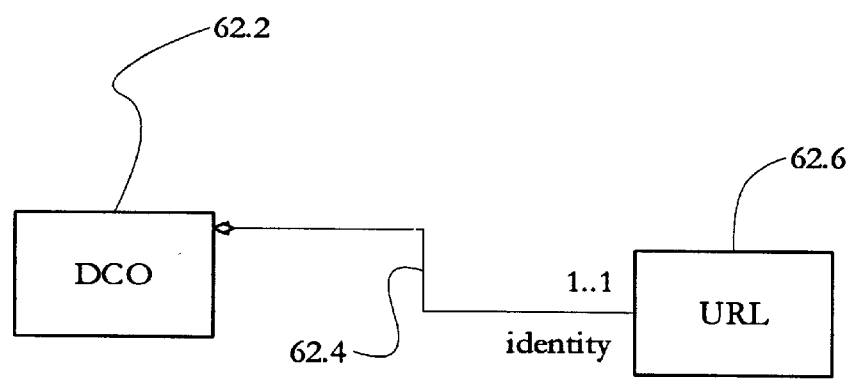
FIG. 62 is a UML depiction of the DCO Identity according to a preferred embodiment of the present invention.

As shown in FIG. 62, the type DCO 62.2 includes a one-to-one relationship called identity 62.4 to the type URL 62.6. This represents a Uniform Resource Locator (URL) and is of a form as defined in the Network Working Group's RFC-1738. This is an identity for the entity that the DCO represents. This is not the run-time identity as provided by the underlying TSE structure.

The design-time services that create the TSE DCT representation, generate an appropriate method dispatch routine table as part of this representation. At run-time, during configuration, a construct called a dispatch-table is updated to reflect the currently appropriate method-implementation for a given method. This is necessary because a given method call from a client-module implementation has to be dispatched to the appropriate method implementation in the server-module based on the current configuration.

Figure 63:
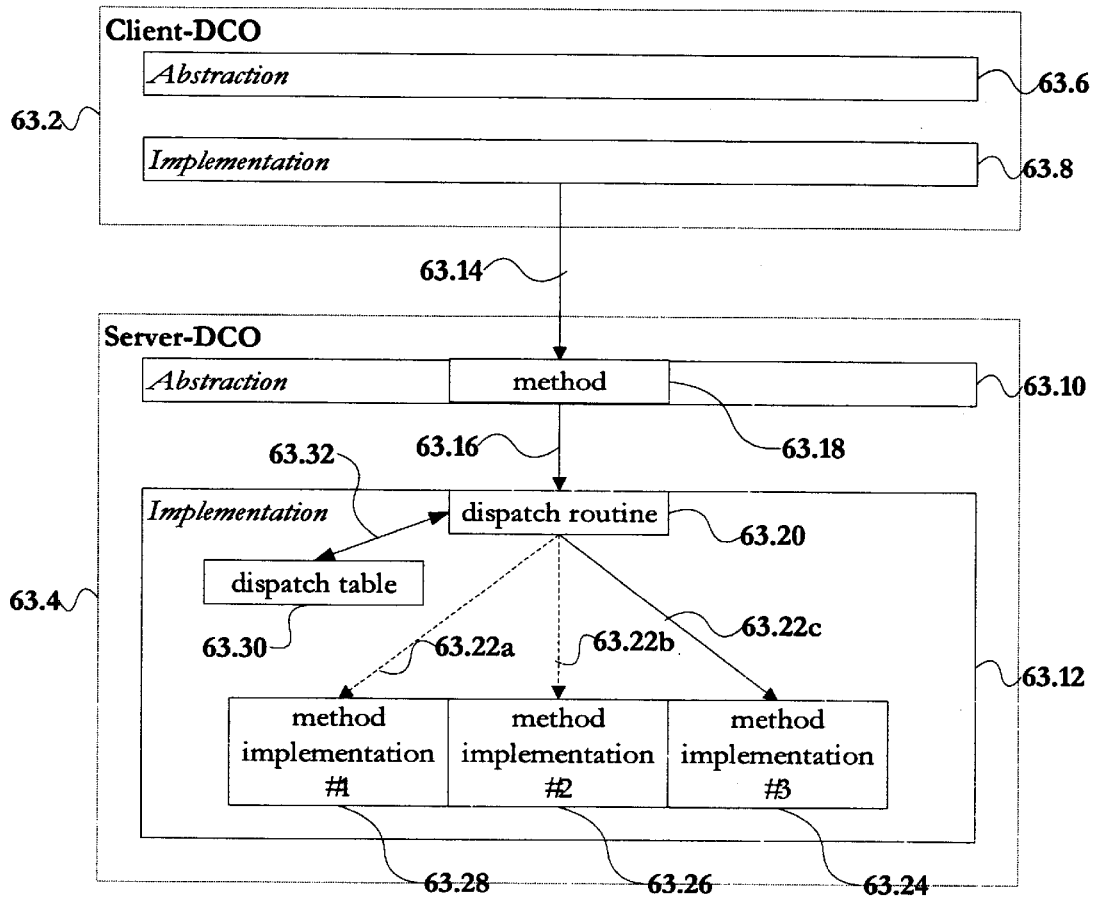
FIG. 63 depicts an example of method dispatch according to a preferred embodiment of the present invention.

As shown in FIG. 63, this process starts with a method-call 63.14 going to an abstraction 63.10 in the server-DCO 63.4 originating from an implementation 63.8 in a client-DCO 63.2. This method-call is routed to a dispatch-routine 63.20 in the implementation 63.12 of the server-DCO 63.4. This dispatch-routine 63.20 using a dispatch-table 63.30, via communication-path 63.32, chooses a method-implementation from, in this example, one of method-implementation #1, 63.28, method-implementation #2, 63.26, or method-implementation #3, 63.24, and dispatches the method call via one of the possible dispatch routings 63.22a, 63.22b, 63.22c. In this example, the method call is dispatched via routing 63.22c to method-implementation #3, 63.24.

It should be noted that the preferred embodiment of the present invention supports what is called a super-dispatch. This means that a method can call the implementation associated with the same named method in the DCT that is its more-general-type. This is facilitated by a dispatch table that keeps track of which level of the type hiearchy it is executing in at all times.

An algorithm for dispatch routine is shown below. This routine is generated differently for each DCT because the methods and their implementations will be different. This algorithm is an example of a preferred embodiment but is only one in a multitude of possible approaches. It is acknowledged that there are others that may have different or better semantics and/or time or space performance.

An example of pseudo-code that implements this method is shown below:

```
//
// exampleDCT::method1(parameterlist)
//      this is the generated implementation dispatch routine
```

-continued

```
for
//      the method called method1 in a DCT called exampleDCT
//
exampleDCT::method1(parameterlist)
{
    // dispatch table is updated by merge algorithm
    // second parameter in dispatchtable
    // is the type level to support
    // super dispatch.
    switch(
            self.dispatchtable.route(
                method1_identifier, self.currentType) ) {
        // dispatch table points to implementation1
        case implementation1:
            return method1_implementation1(parameterlist);
        // dispatch table points to implementation1
        case implementation2:
            return method1_implementation2(parameterlist);
        // dispatch table points to implementation1
        case implementation3:
            return method1_implementation3(parameterlist);
    }
}
```

Relationship access in a DCO is preferably done through a special technique that involves the generation of read and update accessor methods that become the only way that relationships in the DCO can be read or updated. This is because to allow for DCO graph management, it is desirable that DCSM code is inserted before and after any relationship read or update. For example, code that is inserted into a set accessor would call the configure method on the new DCO that is being assigned into the relationship associated with this set accessor, in order to configure it as appropriate based on the current configuration features for the relationship. This starts a recursive re-configuration of the rest of the DCOs in the subprocess below this new DCO. Additionally, set accessors are responsible for synchronizing updates to any DCOs in the same subprocess that share the same identity.

Figure 64:
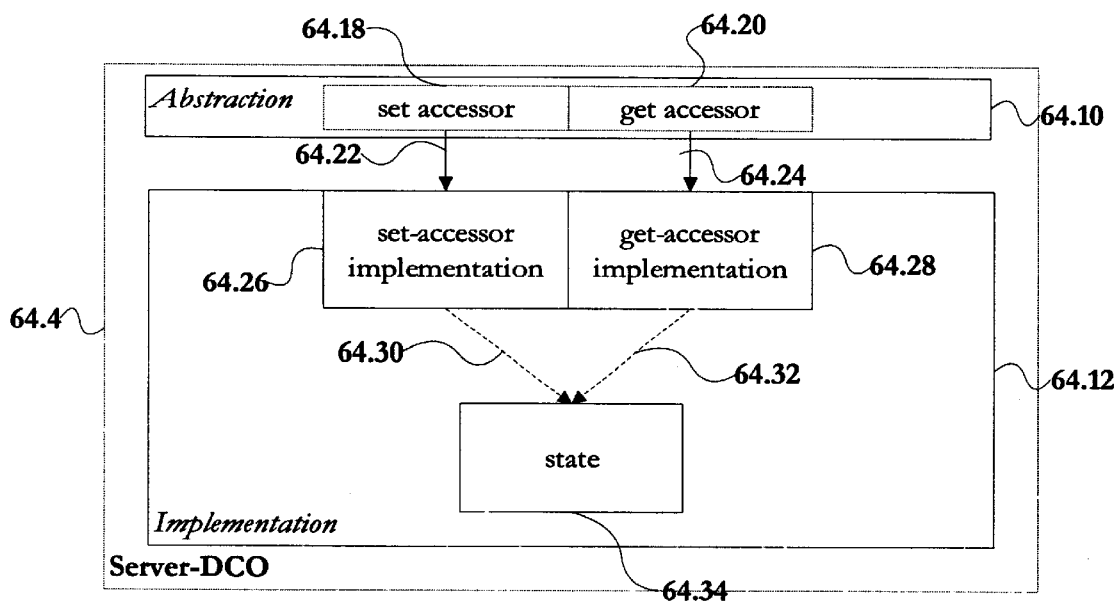
FIG. 64 depicts the relationship accessors according to a preferred embodiment of the present invention.

While some TSEs support other potential mechanisms, for example, smart pointers in C++, the technique presented here is portable across most TSE candidates. Referring to the FIG. 64, there are created method signatures in the abstraction 64.10 of the server-DCO 64.4 for get or read access 64.20, and set or update access 64.18. There are generated implementations 64.26, 64.28 for each of these that insert appropriate event propagation and state management for read access 64.32 and write access 64.32 to the internal state 64.34 of the implementation 64.12. These generated implementations 64.26, 64.28 are called by the abstraction layer 64.10 through communication paths 64.22, 64.24.

Figure 65:
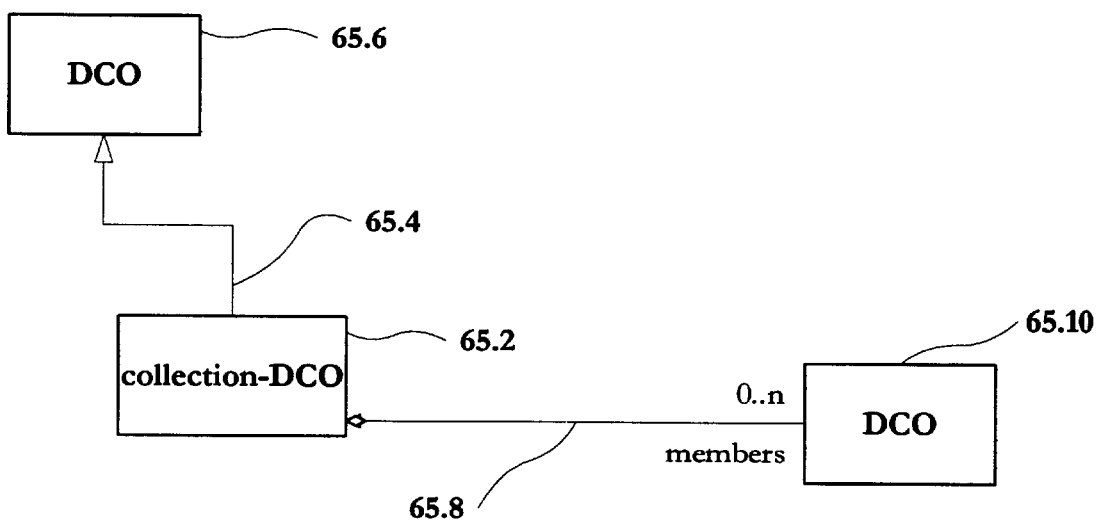
FIG. 65 is a UML depiction of the collection-DCO according to a preferred embodiment of the present invention.

As shown in FIG. 65, there is a construct called a collection-DCO 65.2, which is a generalization 65.4, of the type DCO 65.6. The type collection-DCO 65.2, includes a zero-to-many relationship called members 65.8, to the type DCO 65.10. The collection-DCO 65.2 is a special type of DCO that is used to hold one-to-many, or plural, relationships and manages various DCO-graph issues such as the passing of configuration requests and the propagation of events. The collection-DCO 65.2 also implements various collection operators such as insert, delete, count, etc. that are indicated as requirements for collections in the target TSE. These collection-DCOs 65.2 are constructed by the client DCO at run-time either when the client DCO is first constructed, or by the relationship accessor code when the associated one-to-many relationship in the client DCO is first accessed.

Figure 66:
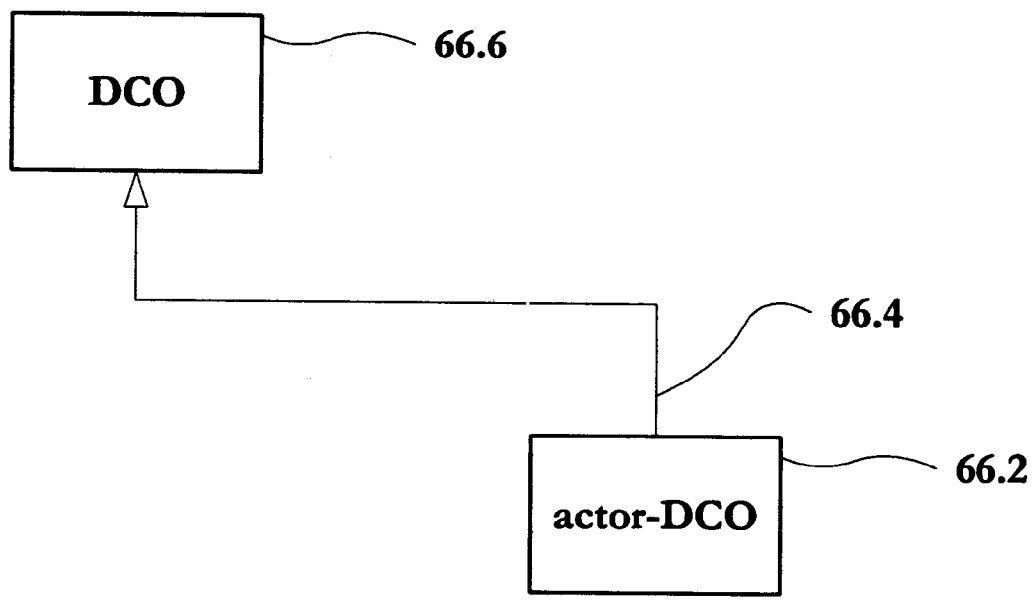
FIG. 66 is a UML depiction of the actor-DCO according to a preferred embodiment of the present invention.

As shown in FIG. 66, there is a construct called an actor-DCO 66.2, which is generalization 66.4, of the type DCO 66.6. This models a DCO that can be executable as in subprocess-DCOs or process-DCOs.

Figure 67:
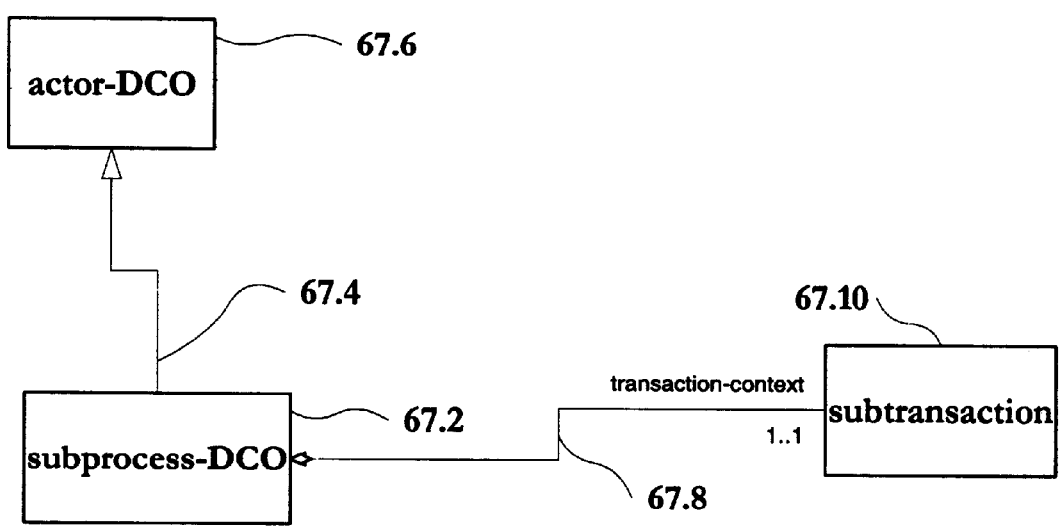
FIG. 67 is a UML depiction of the subprocess-DCO according to a preferred embodiment of the present invention.

As shown in FIG. 67, there is a construct called a subprocess-DCO 67.2, which is a generalization 67.4, of the type actor-DCO 67.6. The type subprocess-DCO 67.2, includes a one-to-one relationship called transaction-context 67.8, to the type sub-transaction 67.10. This DCO is the run-time embodiment of a subprocess module.

Figure 68:
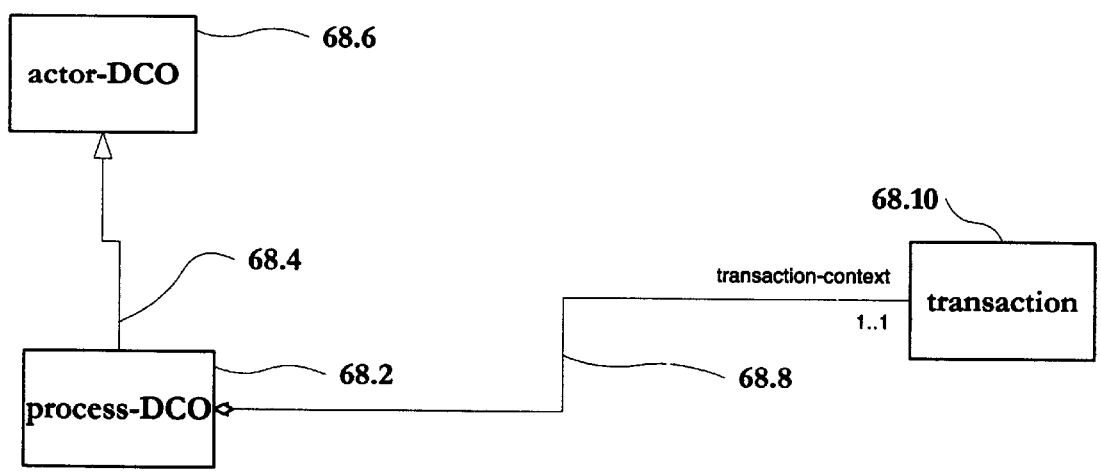
FIG. 68 is a UML depiction of the process-DCO according to a preferred embodiment of the present invention.

As shown in FIG. 68, there is a construct called a process-DCO 68.2, which is a generalization 68.4, of the type actor-DCO 68.6. The type process-DCO 68.2, includes a one-to-one relationship called transaction-context 68.8, to the type transaction 68.10. This DCO is the run-time embodiment of a process module 3.2 Design-time Services The following section describes the support for the management of DCSM design-time constructs. It discusses specification and generation of DCTs.

There are multiple strategies for managing DCSM design-time constructs and their translation to a particular TSE. These approaches include both an abstracted and an integrated strategy as described below. The translation process generates the TSE representations of DCTs along with dispatch routines as pictured in FIG. 63 and described in the associated text, and accessor routines as pictured in FIG. 64, and described in its associated text.

Figure 69:
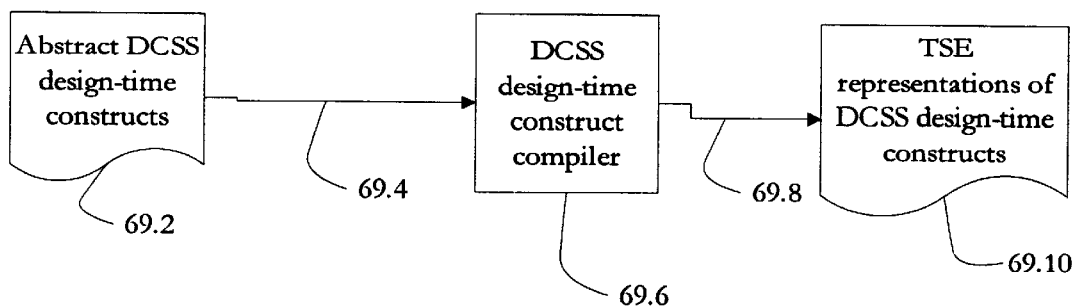
FIG. 69 depicts abstracted DCSS design-time constructs according to a preferred embodiment of the present invention.

FIG. 69 illustrates the abstracted strategy. Using this strategy there is an abstract DCSM design-time construct 69.2, that is read 69.4, by an abstract DCSM design-time construct compiler 69.6 which generates 69.8 a concrete DCSM design-time construct TSE representation 69.10. This approach allows the DCSM design-time constructs to be managed independently of the TSE representations and allows the DCSM design-time constructs to be abstracted above the TSE and potentially mapped to more than one TSE.

Figure 70:
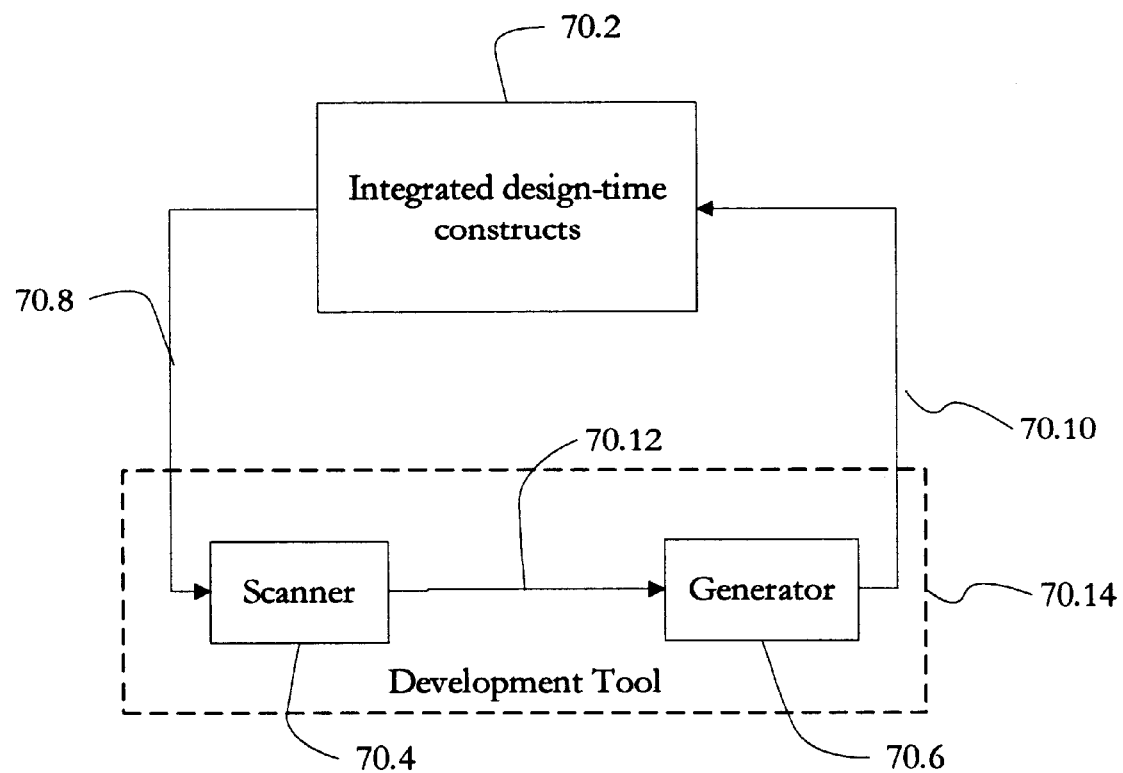
FIG. 70 depicts integrated DCT generation according to a preferred embodiment of the present invention.

FIG. 70 illustrates the integrated strategy where integrated design-time constructs 70.2, which are TSE representations of DCSM design-time constructs along with DCSM annotations are shown. These are read 70.8 by a scanner 70.4 that can read the TSE specific model and extract the DCSM design-time information. The results of this scan are passed 70.12 to a generator 70.6, which regenerates 70.10 the integrated design-time constructs 70.2, preserving the DCSM design-time specification. The combination of the scanner 70.4, and the generator 70.6, make up a DCSM development tool 70.14 that is used in conjunction with the native development tools of the TSE to create a DCSS.

3.3 Run-time Services

Figure 71:
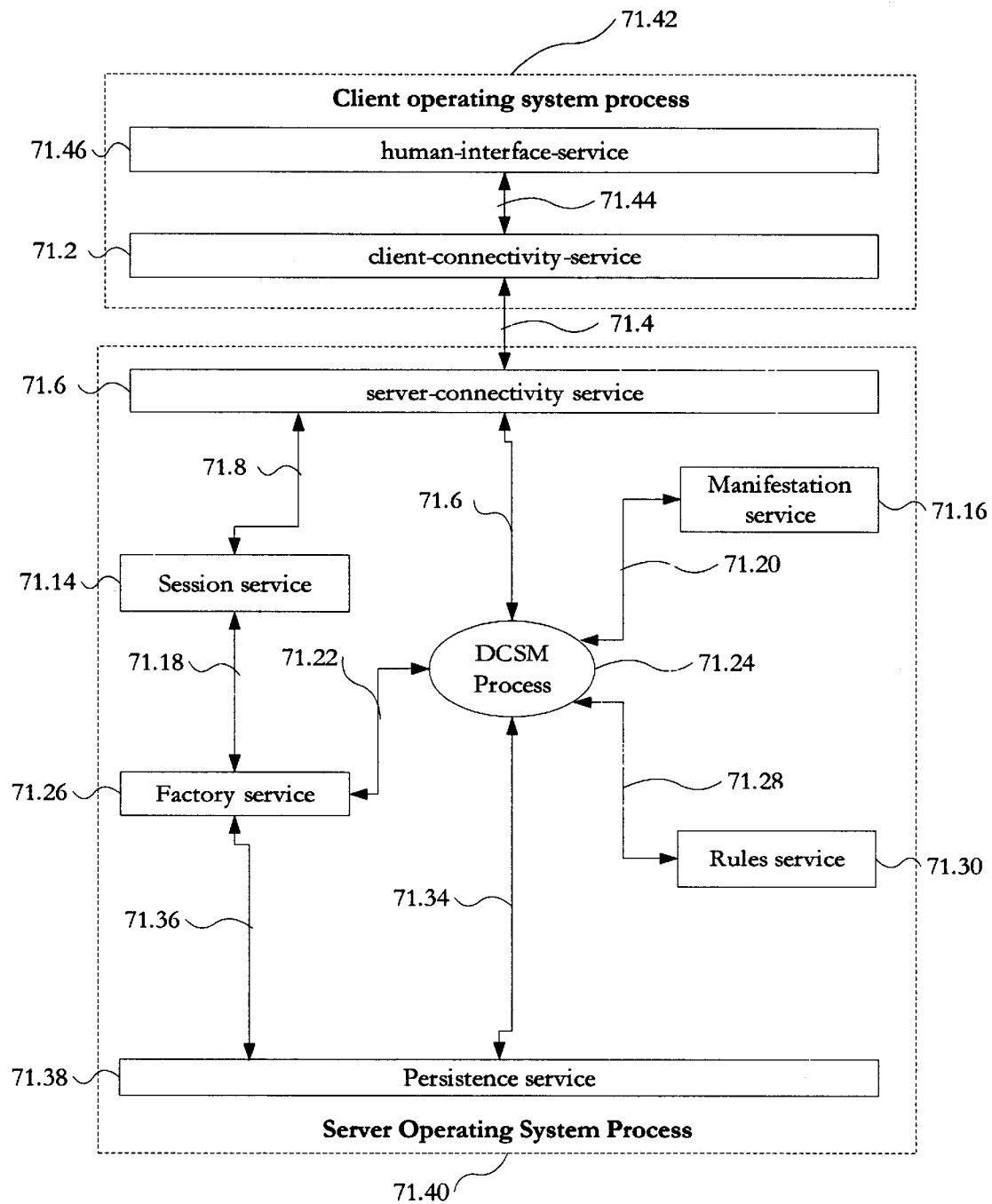
FIG. 71 depicts the services overview according to a preferred embodiment of the present invention.

The following section describes the run-time services provided in the DCSM. These are provided in a form suitable for the given TSE within which the DCSM is implemented. As shown in FIG. 71, the services associated with the DCSM have standard and non-standard elements. The overall service architecture is comprised of the following elements:

Two operating system processes, the client-operating-system-process 71.42, and the server-operating-system-process 71.40. The former represents one of many contexts of interaction with the latter. These two operating system processes may or may not be hosted by the same computer, but rather may be connected via networks between the two computers. It should be noted that it is possible to have these two processes in fact be the same process on the same computer.

A human-interface-service 71.46, in the client-operating-system-process 71.42, that presents to a human a visualization-representation of the DCSM-process 71.24, usually in the form of a graphical user interface, and which processes visualization-events directed by the human at the visualization usually in the form of keyboard key-strokes and mouse clicks and movement. The visualization-representation is generated by the manifestation-service 71.16, and sent to the human-interface-service 71.46, via the DCSM-process 71.24, the communication-path 71.46, the server-connectivity-service 71.6, the communication-path 71.4, the client-connectivity-service 71.2, and the communication-path 71.44. The visualization-events are forwarded by the human-interface-service 71.46, to the manifestation-service 71.16, using the reverse path.

A client-connectivity-service 71.2, in the client-operating-system-process 71.42, that establishes and maintains a communication-path 71.4, with a server-connectivity-service 71.6. If the client-operating-system-process 71.42, is in a separate operating system process or computer system from the server-operating-system-process 71.40, then the client-connectivity-service 71.2, and the server-connectivity-service 71.6, provide the appropriate special remote-process communication mechanisms. Note that the client-connectivity-service 71.2, can stand alone without the human-interface-service 71.46, if the client-operating-system-process 71.42, is not using the human-interface-service 71.46, for its purposes. This would be the case if the client-operating-system-process 71.42 either has its own human-interface implementation or is an interface with a system that does not have a human-interface.

A session-service 71.14, which through a communication-path 71.8, with the server-connectivity-service 71.6, provides the client-connectivity-service 71.2, a way of establishing and maintaining an appropriate context for interaction with the run-time services.

A factory-service 71.26, which provides to the session-service 71.14, through a communication-path 71.18, the ability to create or access a DCSM-process 71.24, so that the client-operating-system-process 71.42, can interact with the DCSM-process 71.24, through the communication-path 71.10, the server-connectivity-service 71.6, communication-path 71.4, and the client-connectivity-service 71.2. The factory-service 71.26, also provides to the DCSM-process 71.24, the ability to create and fetch DCOs through communication-path 71.22. The factory-service 71.26, is supported in this creation and fetching of DCOs via services provided to it by the persistence-service 71.38, via communication-path 71.36.

A manifestation-service 71.16, interacts with the DCSM-process 71.24, via communication-path 71.20, and generates an appropriate visualization-representation and processes forwarded visualization-events as described above.

A rules-service 71.30 that provides the appropriate rule scheduling and execution to the DCSM-process 71.24, via communication-path 71.28.

A persistence-service 71.38 that provides to the DCSM-process 71.24, via communication-path 71.34, and the factory-service 71.26 via communication-path 71.36, appropriate transaction, query, and persistence capabilities.

Figure 72:
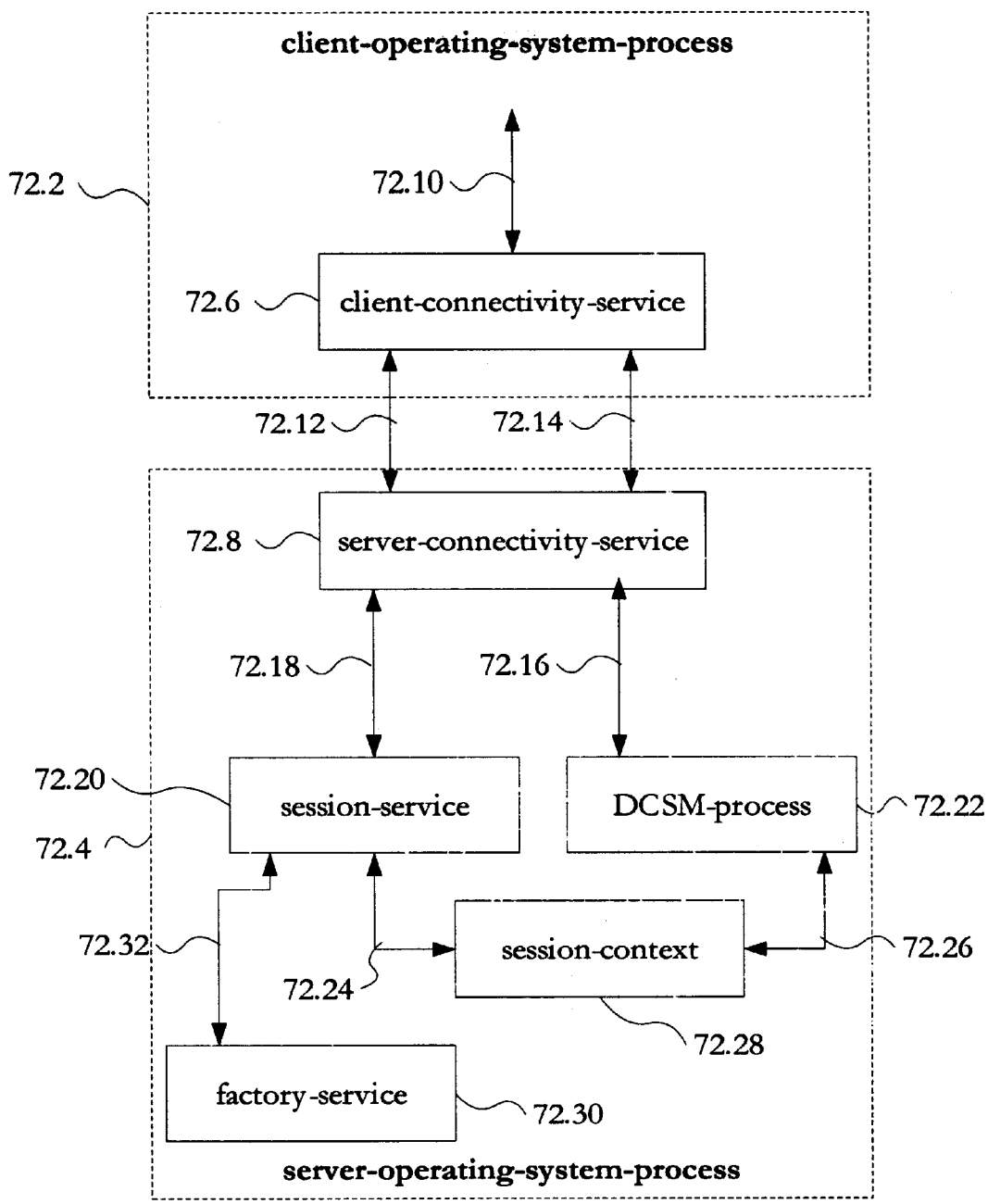
FIG. 72 depicts the connectivity and session services according to a preferred embodiment of the present invention.

As shown in FIG. 72, The client-connectivity-service 72.6, and the server-connectivity-service 72.8, are responsible for establishing and maintaining bidirectional communication between the client-operating-system-process 72.2, and the server-operating-system-process 72.4. The server-connectivity-service 72.8, listens for a connection-request from the client-connectivity-service 72.6, over communication-path 72.12, from an instance of a client-operating-system-process 72.2, and when this is received, it then forwards this connection-request to the session-service 72.20, over communication-path 72.18. The preferred embodiment of this listening capability is provided by a hyper-text-transmission-protocol (HTTP) style server socket, though others could be used.

The session-service 72.20, is responsible for setting up a session-context 72.28, for an instance of a client-operating-system-process 72.2, to interact with the server-operating-system-process 72.4. This context is authenticated, which means that an access-control tuple associated with the connection-request is looked up in a list of authorized access-control tuples. If there is a match, then the session-service 72.20, creates the session-context 72.28. The session-service 72.20, establishes a management relationship with the session-context 72.28, via communication-path 72.24.

At this point the client-operating-system-process 72.2, via the client-connectivity-service 72.6, and the server-connectivity-service 72.8, can request from the session-service 72.20, one or more instances of a DCSM-process 72.22, from the factory-service 72.30, over communication-path 72.32. Each instance of a DCSM-process 72.22, is attached to the session-context 72.28, via the communication-path 72.26 and returned to the server-connectivity-service 72.8, which forwards it to the client-connectivity-service 72.6. This DCSM-process 72.22, is now available as a remote-object in the client-operating-system-process 72.2, using standard distributed object protocols such as CORBA or Microsoft DCOM. From this point on, the client-operating-system-process 72.2, and the server-operating-system-process 72.4, communicate over communication-path 72.14, with the DCSM-process 72.22, using communication-path 72.16, and any other remote-objects the client-operating-system-process 72.2, obtains references to via the DCSM-process 72.22, using standard distributed-object protocols.

Figure 73:
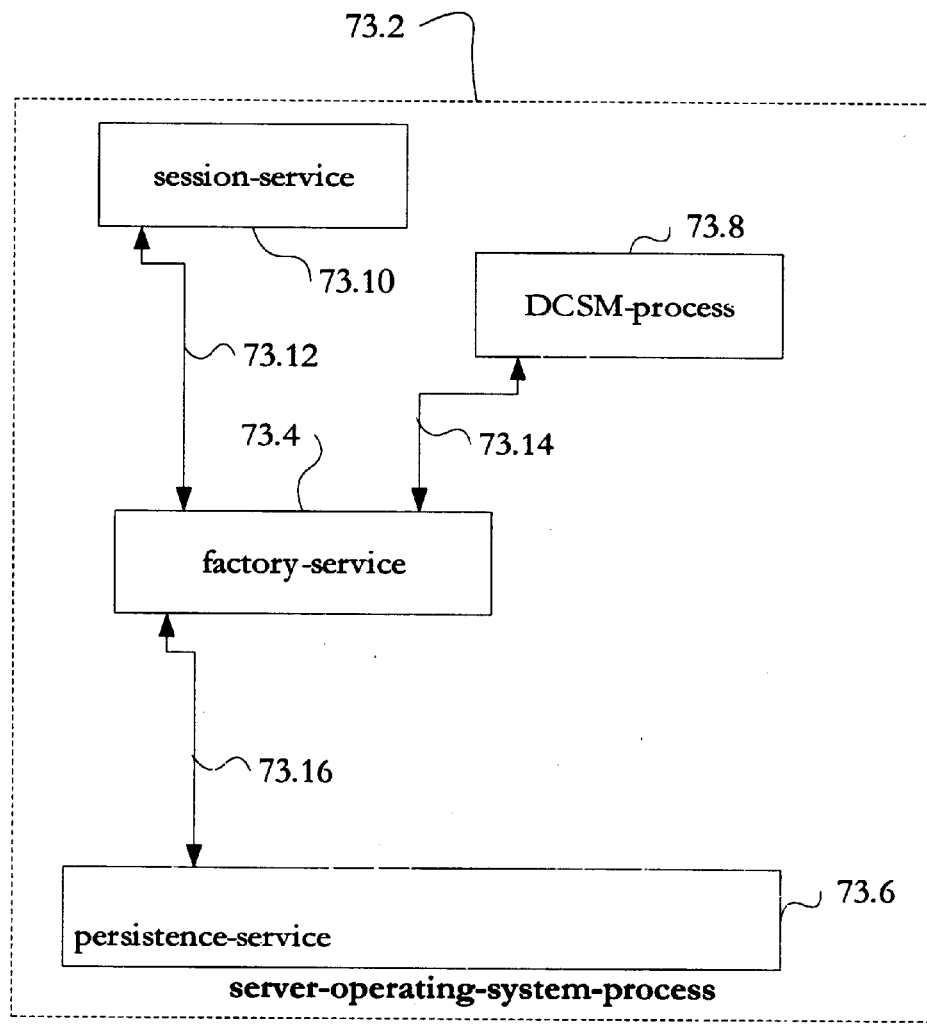
FIG. 73 depicts the factory service according to a preferred embodiment of the present invention.

As shown in FIG. 73, when either the session-service 73.10, over communication-path 73.12, or the DCSM-process 73.8, over communication-path 73.14, requests a new or previously created DCO including subprocess-DCOs and process-DCOs, the factory-service 73.4, in the server-operating-system-process 73.2, is responsible for the creation and access of these DCOs in cooperation with the persistence-service 73.6 via communication-path 73.16.

Figure 74:
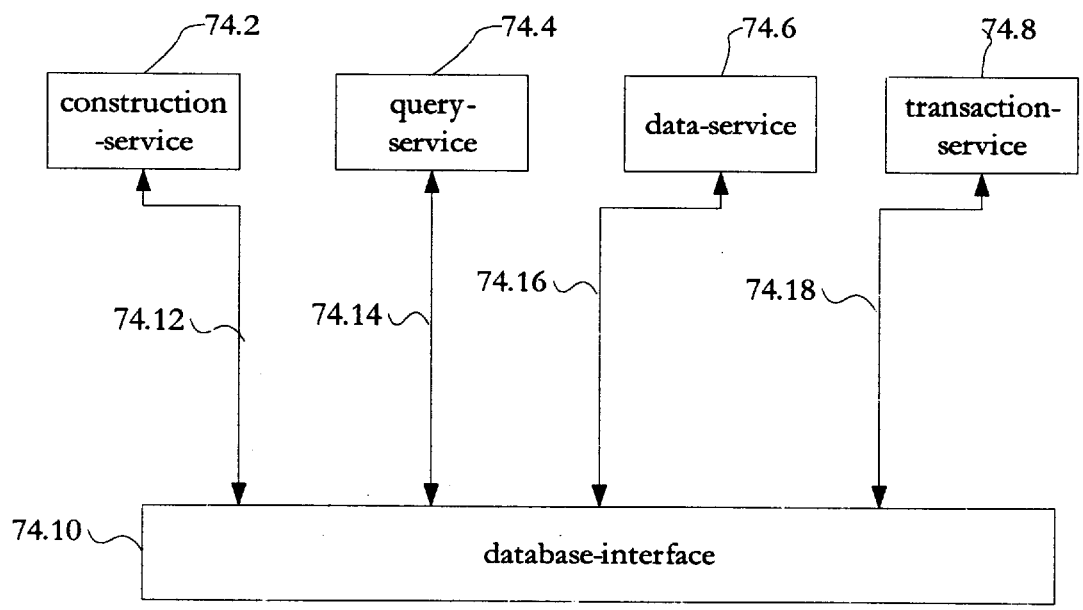
FIG. 74 depicts the persistence service detail according to a preferred embodiment of the present invention.

As shown in FIG. 74, the persistence-service is made up of several subcomponents. The first is a construction-service 74.2, which handles the creation of new DCOs and assignment of unique identities. The second is the query-service 74.4, which handles the fetching of DCOs based on their identity or other criteria using a standard query language. The third is the data-service 74.6, which handles the mapping of DCO data to and from the database. The third is the transaction-service 74.8, which handles contexts for DCO access that exhibit standard database style atomic, consistent, isolated, and durable operation characteristics. The final subcomponent is the database-interface 74.10, which translates the needs of the above services into interactions with a standard database product via communication-paths 74.12, 74.14, 74.16, 74.18 respectively.

4. Developing Instances of a DCSS

This section describes the process of developing instance of a DCSS.

Figure 75:
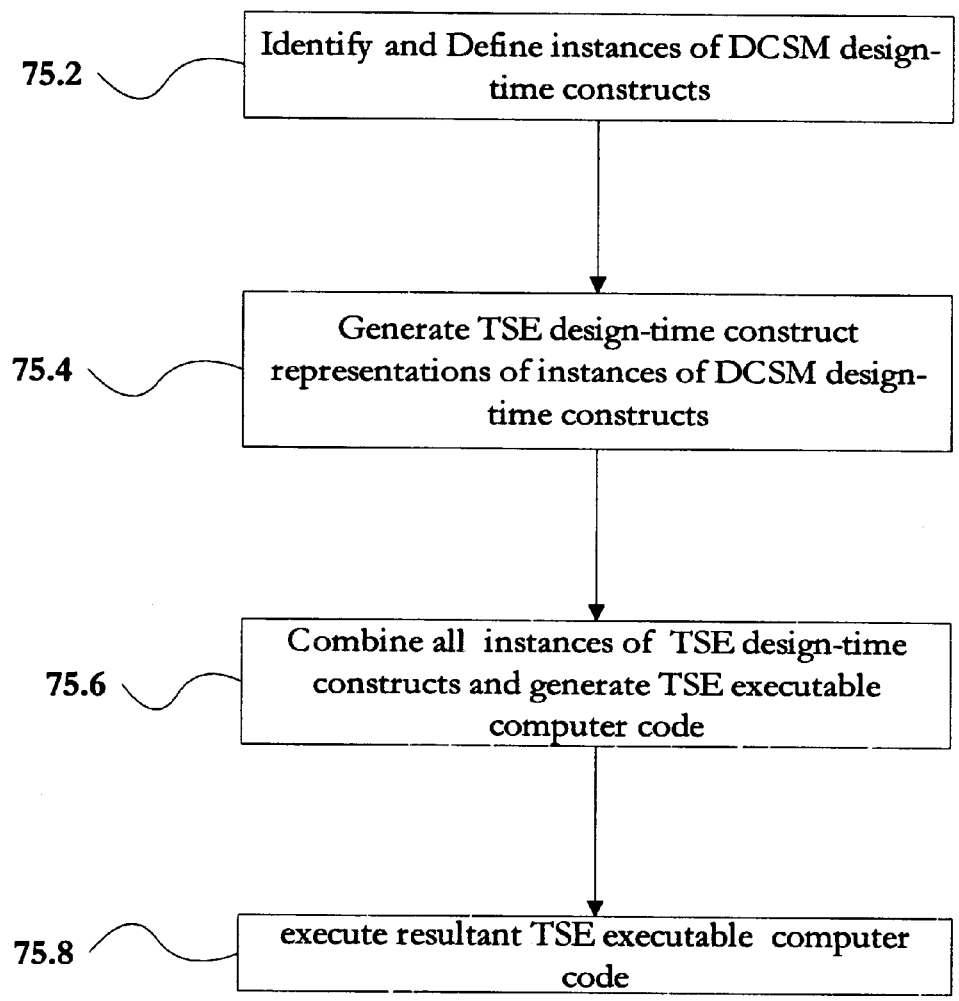
FIG. 75 is a flow chart depicting the process of developing an instance of a DCSS according to a preferred embodiment of the present invention.

As shown in FIG. 75, developing an instance of a DCSS is comprised of the following steps: 1. Identify and define instances of DCSM design-time constructs, as shown in 75.2. 2. Generate TSE representations of instances of DCSM design-time constructs, as shown in 75.4. 3. Combine all instances of TSE design-time constructs with TSE run-time service constructs and generate resultant TSE executable computer code, as shown in 75.6. 4. Execute resultant TSE executable computer code, as shown in 75.8.

Figure 76:
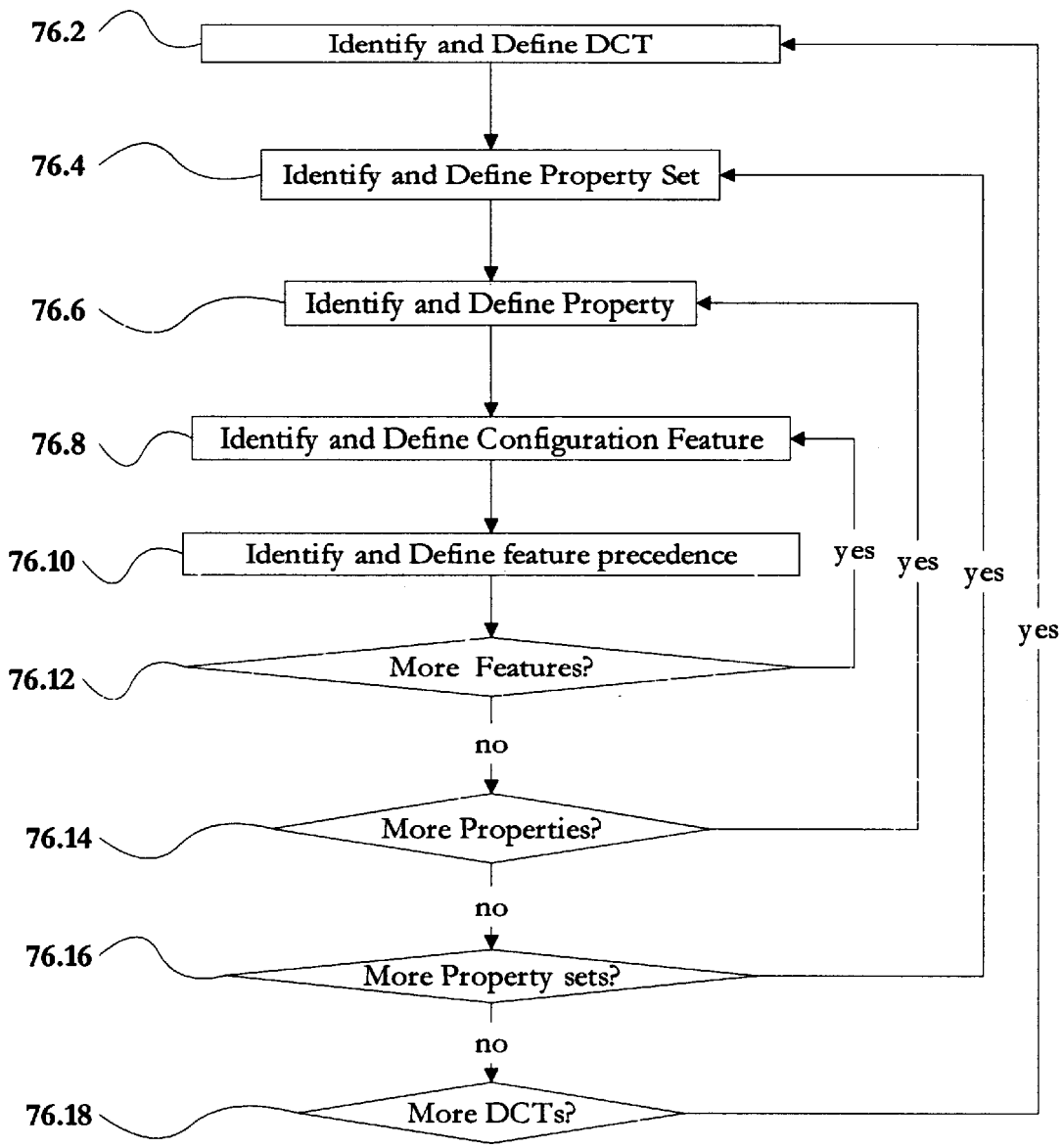
FIG. 76 is a flow chart depicting how to identify and define instances of DCSS design-time constructs according to a preferred embodiment of the present invention.

As shown in FIG. 76, the process of defining and creating DCSM design-time instances is comprised of the following steps: 1. Identify and define a DCT, 76.2. 2. Identify and define a property-set, 76.4. 3. Identify and define a property, 76.6. 4. Identify and define a feature, 76.8. 5. Identify and define the feature precedence, 76.10. 6. Test to see if there are more features in this property, 76.12. If so then go to step 4. 7. Test to see if there are more properties in this property-set, 76.14. If so then go to step 3. 8. Test to see if there are more property-sets in this dynamically-configurable type, 76.16. If so then go to step 2. 9. Test to see if there are DCTs, 76.18. If so then go to step 1.

Figure 77:
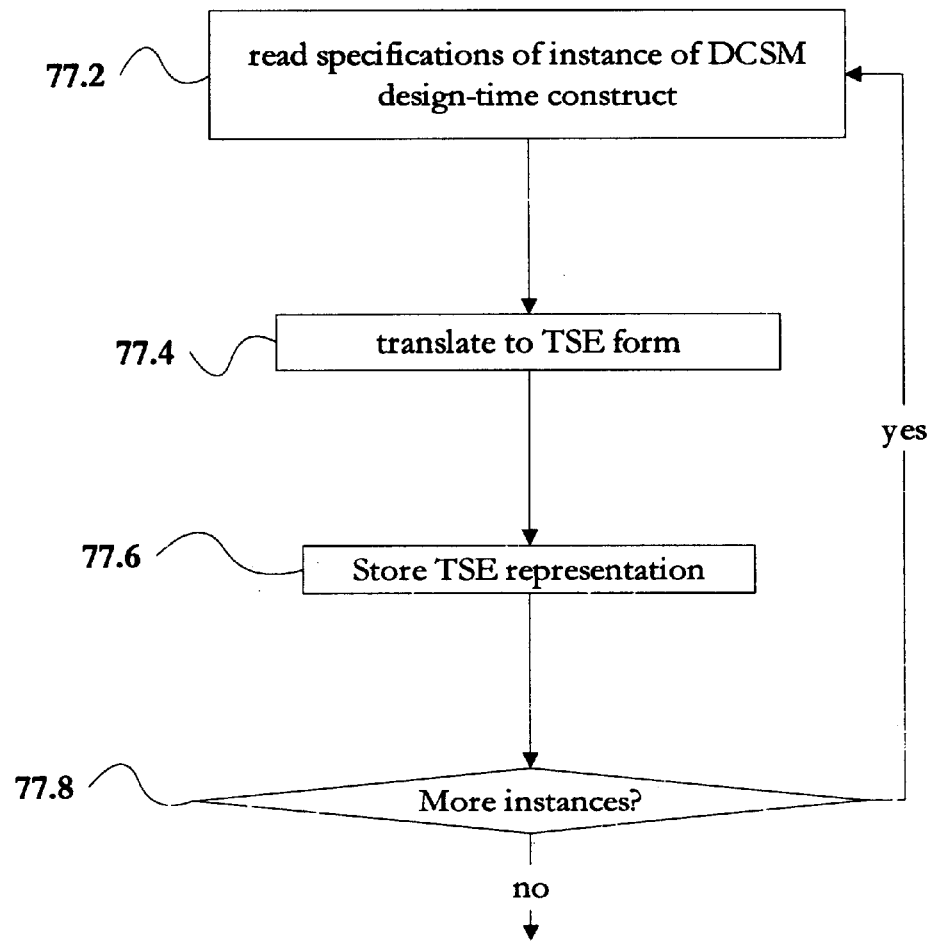
FIG. 77 is a flow chart depicting how to generate TSE representations of instances of DCSM design-time constructs according to a preferred embodiment of the present invention.
Figure 78:
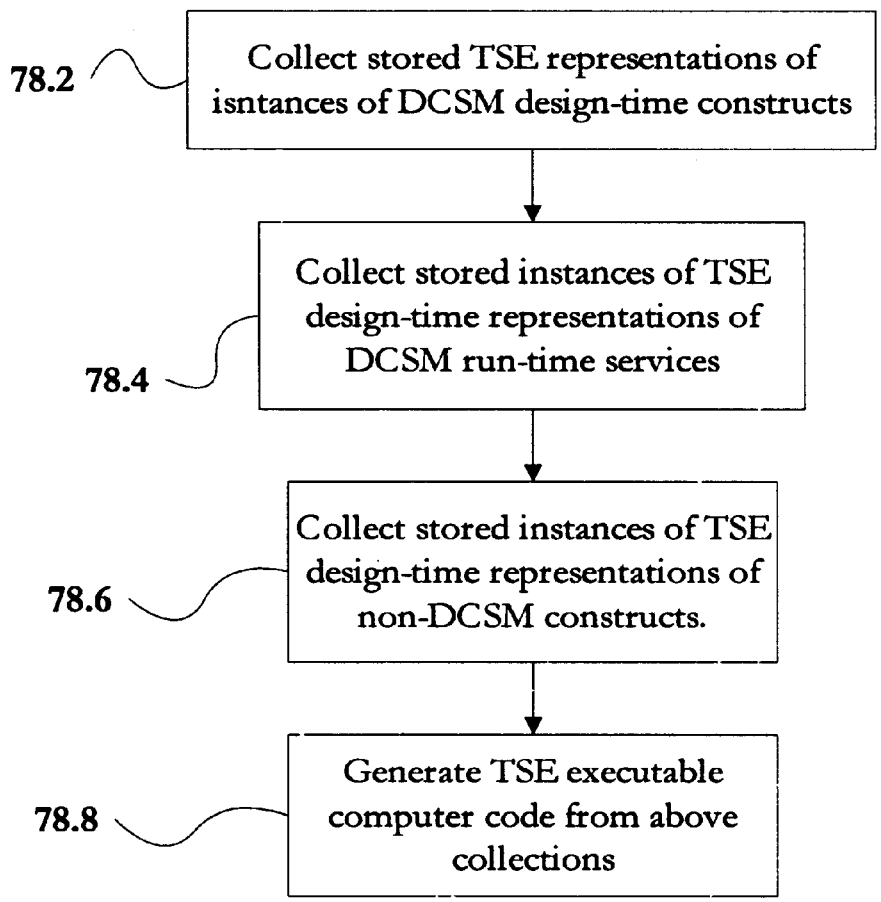
FIG. 78 is a flow chart depicting how to combine all instances of TSE design-time constructs according to a preferred embodiment of the present invention.

As shown in FIG. 77, the process of generating TSE representations of instances of DCSM design-time constructs is comprised of the following steps: 1. Read specifications of instances of DCSM design-time constructs, 77.2. 2. Translate to TSE form, 77.4. 3. Store TSE representation, 77.6. 4. Test to see if there are more instances, if yes then go to step 1, or exit, 77.8.

As shown in FIG. 77, the process of combining all instances of TSE design-time constructs and generate resultant TSE executable code is comprised of the following steps: 1. Collect stored TSE representations of instances of DCSM design-time constructs, 78.2. 2. Collect stored instances of TSE design-time representations of DCSM run-time services, 78.4. 3. Collect stored instances of TSE design-time representations of non-DCSM constructs, 78.6. 4. Generate TSE executable computer code from above collections. 78.8.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of developing dynamically configurable software systems (DCSS) comprising:
   (a) defining and creating one or more dynamically configurable types (DCTs) each with an associated plurality of defined collections of semantics, wherein the DCTs are collectively representative of a software solution to a problem, wherein the DCTs are used to model the run-time behavior of dynamically configurable objects (DCOs) which are instances of the DCTs; and
   (b) coupling the DCTs to predefined software services that at run-time will support DCOs, including the ability to combine the defined collections of semantics together in permutations at run-time in order to allow the DCOs to have different semantics over time to serve different purposes so that a software solution based on the DCOs allows dynamic configurability.

2. The method of claim 1 further comprising the step of:
   (c) generating computer executable code from a combination of the plurality of DCTs, and the predefined software services.

3. The method of claim 2 further comprising the step of:
   (d) executing the resultant computer executable code so as to provide to a user the benefits of the software solution to a problem.

4. The method of claim 1 further comprising the step of:
   (e) Providing software to automate step (a).

5. The method of claim 1 wherein step (a) further comprises the step of:
   (f) defining and creating certain DCTs to be dynamically configurable subprocesses (DCSs), wherein a run-time instance of each of the identified DCSs is a root of a graph including a set of DCOs coupled together to perform a part or the totality of a processing goal, and to provide a service context for run-time operations involving the set of DCOs.

6. The method of claim 5 wherein step (a) further comprises the step of:
   (g) defining and creating certain DCTs to be dynamically configurable processes (DCPs), wherein a run-time instance of a DCP includes one or more instances of a DCS and which controls and supports operations performed on the instances of a DCS in order to achieve a larger processing goal subdividing it into a set of smaller processing goals, each smaller processing goal achieved by one or more of the DCS instances.

7. The method of claim 1 wherein the combining of step (b) includes:
   (h) merging different collections of semantics in the plurality of collections of semantics in the plurality of DCTs to implement a software solution to the problem.

8. The method of claim 1 wherein the combining of step (b) includes:
   (i) merging collections of semantics in a specific DCT with collections of semantics in more general DCTs wherein the DCTs are organized into a hiearchy.

9. The method of claim 8 wherein the combining of step (b) includes:
   (j) selecting particular collections of semantics to be merged at each level of the hiearchy based on a shared identity in a common set of identities defined by a union of identities of all pluralities of collections of semantics from each of a set of those DCTs that are on a inclusive path from the specific DCT to the most general DCT in the hiearchy.

10. The method of claim 1 wherein step (a) further comprises the step of:
    (k) defining and creating, for each DCT, a plurality of configurations, each of which can be used to identify a set of collections of semantics to be combined at run-time.

11. The method of claim 10 wherein step (k) further comprises the step of:
    (l) defining and creating, for each DCT, a plurality of configurations, each of which can be used to identify a set of collections of semantics to be combined at run-time where in each configuration contains a set of identities for the collections of semantics to be combined.

12. The method of claim 10 wherein step (k) further comprises the step of:
    (m) defining and creating, for each DCT, a plurality of configurations, each of which can be used to identify a set of collections of semantics to be combined at run-time wherein each configuration contains a function that calculates a set of collections of semantics to be combined at run-time.

13. The method of claim 1 wherein step (a) further comprises the steps of:
(n) defining and creating, for each DCT, a plurality of property sets wherein each property set is representative of a collection of semantics; and
(o) defining and creating for each of the property sets in the plurality of property sets a plurality of properties.

14. The method of claim 13 further comprising the step of:
(p) defining and creating, for each DCT, a plurality of configurations, each of which can be used to identify a set of property sets to be combined at run-time.

15. The method of claim 13 wherein step (n) includes the steps of:
(q) defining and creating one of the plurality of property sets to be a base property set.

16. The method of claim 13 further comprising the step of:
(r) defining and creating, for each DCT, a plurality of configurations, each of which can be used to identify a set of property sets to be combined at run-time where in each configuration contains a set of identities for the property sets to be combined.

17. The method of claim 13 further comprising the step of:
(s) defining and creating, for each DCT, a plurality of configurations, each of which can be used to identify a set of property sets to be combined at run-time wherein each configuration contains a function that calculates a set of property sets to be combined at run-time.

18. The method of claim 13 wherein step (o) further comprises the step of:
(t) defining and creating properties to represent relationships to instances of other DCTs.

19. The method of claim 13 wherein step (o) further comprises the step of:
(u) defining and creating properties to represent methods on the DCT; and
(v) defining method implementations for each of the represented methods.

20. The method of claim 13 wherein step (o) further comprises the step of:
(w) defining and creating properties to represent rules on the DCT, wherein the rules are a specification of how to respond to events received by the DCT.

21. The method of claim 13 wherein the combining of step (b) includes:
(x) merging different property sets in the plurality of property-sets in the plurality of DCTs to implement a software solution to the problem.

22. The method of claim 13 wherein the combining of step (b) includes:
(y) merging different properties in the property sets in the plurality of property-sets in the plurality of DCTs to implement a software solution to the problem.

23. The method of claim 13 wherein step (b) includes:
(z) merging property sets in a specific DCT with property sets in more general DCTs wherein the DCTs are organized into a hiearchy.

24. The method of claim 22 wherein the combining of step (b) includes:
(aa) selecting particular property sets to be merged at each level of the hiearchy based on a shared identity in a common set of identities defined by the union of identities of all pluralities of property sets from each of a set of those DCTs that are on a inclusive path from the specific DCT to the most general DCT in the hiearchy.

25. The method of claim 13 wherein step (o) includes the step of:
(ab) defining and creating, for each property in each property set, a precedence which determines which property will be chosen during the combining of step (b), from among properties of the same identity in other property sets.

26. The method of claim 25 wherein the combining of step (b) includes:
(ac) merging different properties in the property sets in the plurality of property-sets in the plurality of DCTs to implement a software solution to the problem based on precedence, wherein the precedence identifies the property that is the result of the merge.

27. The method of claim 13 wherein step (o) includes the steps of:
(ad) defining and creating for each property, in each property set, a feature set containing a plurality of features; wherein each feature set defines combinable characteristics of the associated property;
(ae) defining and creating for each feature in the feature set, a feature kind which defines a kind of combinable characteristic that the feature represents in the associated property; and
(af) defining and creating how the feature of the associated property will be combined in step (b) with features of the same feature kind in other properties having the same identity in other property sets.

28. The method of claim 27 wherein step (ad) further comprises the step of:
(ag) defining and creating configuration feature kinds that represent transactional characteristics of a property.

29. The method of claim 27 wherein step (ad) further comprises the step of:
(ah) defining and creating configuration feature kinds that represent event handling characteristics of a property.

30. The method of claim 27 wherein step (ad) further comprises the step of:
(ai) defining and creating configuration feature kinds that represent user interface visualization and event handling characteristics of a property.

31. The method of claim 27 wherein the combining of step (b) includes:
(aj) merging different features of the properties in the property sets in the plurality of property-sets in the plurality of DCTs to implement a software solution to the problem.

32. The method of claim 27 wherein step (a) includes the step of:
(ak) defining and creating, for each feature in each feature set, a precedence which determines which feature will be chosen during the combining of step (b), from among features of the same kind in properties of the same identity in other property sets.

33. The method of claim 32 wherein the combining of step (b) includes:
(al) merging different features of the properties in the property sets in the plurality of property-sets in the plurality of DCTs to implement a software solution to the problem based on precedence, wherein the precedence identifies the feature that is the result of the merge.

34. The method of claim 33 wherein the combining of step (b) includes:
(am) sharing an identity for the properties being merged among a common set of identities based on a shared identity in a common set of identities defined by a union of identities of all the pluralities of property sets from each of a set of those DCTs that are on an inclusive path from a specific DCT to a most general DCT wherein the DCTs are disposed in a hiearchy.

35. The method of claim 1 wherein step (a) further includes:
(an) defining and creating of data structures and algorithms that allow storage, modification, and retrieval at run-time of a plurality of policy decisions that can be used to direct dynamic configuration of DCOs, wherein the DCSS changes at run-time in reaction to modifications of the plurality of policy decisions.

36. The method of claim 35 wherein step (a) further includes:
(ao) defining and creating of data structures and algorithms that support the presentation at run-time of a plurality of questions to a DCSS user, wherein a plurality of answers that the user provides in response to the plurality of questions are processed and stored as policy decisions.

37. The method of claim 1 wherein step (b) further includes:
(ap) coupling the DCTs to services that support the management and control of multiple DCOs connected together within a run-time context.

38. The method of claim 1 wherein step (a) further includes the step of defining and creating user interface definitions for each of the plurality of DCTs; and wherein step (b) further includes the step of providing services that support generation of a user interface from the user interface definitions each time a DCO undergoes configuration at run-time.

39. The method of claim 1 wherein step (a) further includes the step of defining and creating event response definitions for each of the plurality of DCTs; and wherein step (b) further includes the step of providing services that support the scheduling and execution of changing event responses from the event response definitions each time a DCO undergoes configuration at run-time.

40. The method of claim 1 wherein step (a) further includes the step of defining and creating transaction definitions for each of the plurality of DCTs; and wherein step (b) further includes the step of providing services that support transactionality at run-time.

41. The method of claim 1 wherein step (a) further includes the step of defining and creating persistence definitions for each of the plurality of DCTs; and wherein step (b) further includes the step of providing services that support persistence at run-time.

42. A method of developing dynamically configurable software systems (DCSS) comprising:
(a) Defining one or more dynamically configurable types (DCTs) each with an associated plurality of collections of semantics, wherein the one or more DCTs are collectively representative of a software solution to a problem, wherein the one or more DCTs are used to model the run-time behavior of dynamically configurable objects (DCOs) which are instances of the one or more DCTs; and
(b) Using the one or more DCTs to create a software solution to a problem.

43. A method of developing dynamically configurable software systems (DCSS) comprising:
(a) providing an environment for defining and executing one or more dynamically configurable types (DCTs) each with an associated plurality of defined collections of semantics, wherein the DCTs are collectively representative of a software solution to a problem, wherein the DCTs are used to model the run-time behavior of dynamically configurable objects (DCOs) which are instances of the DCTs; and
(b) coupling defined DCTs to predefined software services that at run-time will support DCOs, including the ability to combine the defined collections of semantics together in permutations at run-time in order to allow the DCOs to have different semantics over time to serve different purposes so that a software solution based on the DCOs allows dynamic configurability.

44. The method of claim 43 further comprising the step of:
(c) creating computer executable code from a combination of the plurality of DCTs, and the predefined software services.

45. The method of claim 44 further comprising the step of:
(d) executing the resultant computer executable code so as to provide to a user the software solution to a problem.

46. The method of claim 44 further comprising the step of:
(f) executing the resultant computer executable code so as to provide to a developer of a DCSS the benefits of the environment for defining and executing the software solution to a problem.

47. The method of claim 43 further comprising the step of:
(e) creating computer executable code that automates the definition of DCTs.

48. An apparatus for executing dynamically configurable software structures comprising:
(a) a plurality of dynamically configurable objects (DCOs) that each represent a run-time instantiation of a dynamically configurable type (DCT);
(b) a plurality of dynamically configurable relationships in each DCO each of which defines a coupling between one DCO and another;
(c) one or more DCO networks which include an arrangement of some of the plurality of DCOs based on the associated dynamically configurable relationships, each DCO network further having a root position, and each DCO network further operable to manage the generation, propagation, and reception of events within each DCO network;
(d) one or more dynamically configurable subprocesses (DCSs) which are disposed at the root position of the DCO network and control all operations performed within the DCO network;
(e) one or more dynamically configurable processes (DCPs) which contain a plurality of DCSs and support and manage all operations performed on each of, and the totality of the plurality of DCSs; and
(f) one or more services that provide support for the DCOs.

49. The apparatus of claim 48 wherein the services include:
(g) A persistence service which provides for storing, querying, retrieval and updating of the plurality of DCOs to and from a persistent data storage system.

50. The apparatus of claim 48 wherein the services include:
(h) A transaction service which provides transactional capabilities for the plurality of DCOs.

51. The apparatus of claim 48 wherein the services include:
(i) A rules service which provides for mapping of events to method invocations on DCOs.

52. The apparatus of claim 48 wherein the services include:
  (j) a configuration service which configures and re-configures the DCOs.

53. The apparatus of claim 48 wherein the services include:
  (k) a factory service which provides for the creation of DCOs and the retrieval of the DCO based on their identity from the persistence service.

54. A method of developing dynamically configurable software systems comprising:
  (a) Defining a plurality of dynamically configurable types each with an associated plurality of collections of semantics, wherein the plurality of dynamically configurable types are collectively representative of a software solution to a problem;
  (b) Providing configuration services that at run-time will configure the dynamically configurable types by combining one or more of the collections of semantics in each of the plurality of dynamically configured types;
  (c) Creating computer executable code from a combination of the plurality of dynamically configurable types and the configuration services; and
  (d) Executing the computer executable code wherein dynamically configurable types are configured through application of the configuration services.

55. The method of claim 54 wherein step (a) further includes:
  (e) defining and creating certain dynamically configurable types to be dynamically configurable subprocess types; wherein a run-time instance of each of the identified DCTs is the root of a graph consisting of a set of instances of DCTs connected at run-time to perform a processing goal, and to provide a run-time service context for run-time operations involving the set of instances of DCTs.

56. The method of claim 55 wherein step (a) includes:
  (f) defining and creating certain dynamically configurable types to be dynamically configurable process types; wherein the dynamically configurable process type includes a plurality of the dynamically configured subprocess objects and which controls all operations performed on the plurality of dynamically configured subprocess type instances.

57. The method of claim 54 wherein the combining of step (b) includes:
  (g) merging different collections of semantics in the plurality of collections of semantics in the plurality of dynamically configurable types to implement a software solution to the problem.

58. The method of claim 54 wherein the combining step of (b) includes:
  (h) combining collections of semantics in a specific DCT with collections of semantics in more general DCTs wherein the DCTs are organized into a hierarchy.

59. The method of claim 58 wherein the combining of step (b) includes:
  (i) selecting particular collections of semantics to be merged at each level of the hiearchy based on a shared identity in a common set of identities defined by a union of identities of all pluralities of collections of semantics from each of a set of those DCTs that are on a inclusive path from the specific DCT to the most general DCT in the hiearchy.

60. The method of claim 54 wherein step (a) includes the step of:
  (k) defining and creating, for each dynamically configurable type, a plurality of configurations, each of which can be used to identify a set of collections of semantics to be combined at run-time.

61. The method of claim 60 wherein step (j) comprises the following steps:
  (k) defining and creating, for each dynamically configurable type, a plurality of configurations, each of which can be used to identify a set of collections of semantics to be combined at run-time where in each configuration contains a set of identities for the collections of semantics to be combined.

62. The method of claim 60 wherein step (j) comprises the following steps:
  (l) defining and creating, for each dynamically configurable type, a plurality of configurations, each of which can be used to identify a set of collections of semantics to be combined at run-time wherein each configuration contains a function that calculates a set of collections of semantics to be combined at run-time.

63. The method of claim 54 wherein step (a) comprises the steps of:
  (m) defining and creating, for each dynamically configurable types, a plurality of property sets wherein each property set is representative of a collection of semantics; and
  (n) defining and creating for each of the property sets in the plurality of property sets a plurality of properties.

64. The method of claim 63 wherein further including the step of:
  (o) defining and creating, for each dynamically configurable type, a plurality of configurations, each of which can be used to identify a set of property sets to be combined at run-time.

65. The method of claim 63 wherein step (m) includes the steps of:
  (p) defining and creating a one of the plurality of property sets to be a base property set.

66. The method of claim 63 wherein step (j) comprises the following steps:
  (q) defining and creating, for each dynamically configurable type, a plurality of configurations, each of which can be used to identify a set of property sets to be combined at run-time where in each configuration contains a set of identities for the property sets to be combined.

67. The method of claim 63 wherein step (j) comprises the following steps:
  (r) defining and creating, for each dynamically configurable type, a plurality of configurations, each of which can be used to identify a set of property sets to be combined at run-time wherein each configuration contains a function that calculates a set of property sets to be combined at run-time.

68. The method of claim 63 wherein step (n) includes:
  (s) defining and creating properties to represent relationships to instances of other dynamically configurable types.

69. The method of claim 63 wherein step (n) includes:
  (t) defining and creating properties to represent methods on the dynamically configurable type; and
  (u) defining method implementations for each of the represented methods.

70. The method of claim 63 wherein step (n) includes:
  (v) defining and creating properties to represent rules on the dynamically configurable type; wherein the rules are a specification of how to respond to events received by the dynamically configurable type.

71. The method of claim 63 wherein the combining of step (b) includes:
   (w) merging different property sets in the plurality of property-sets in the plurality of dynamically configurable types to implement a software solution to the problem.

72. The method of claim 63 wherein the combining of step (b) includes:
   (x) merging different properties in the property sets in the plurality of property-sets in the plurality of dynamically configurable types to implement a software solution to the problem.

73. The method of claim 63 wherein step (b) includes:
   (y) combining property sets in a specific DCT with property sets in more general DCTs wherein the DCTs are organized into a hiearchy.

74. The method of claim 73 wherein the combining of step (b) includes:
   (z) selecting particular property sets to be merged at each level of the hiearchy based on a shared identity in a common set of identities defined by the union of identities of all pluralities of property sets from each of a set of those DCTs that are on a inclusive path from the specific DCT to the most general DCT in the hiearchy.

75. The method of claim 63 wherein step (n) includes the step of:
   (aa) defining and creating, for each property in each property set, a precedence which determines which property will be chosen during the combining of step (b), from among properties of the same identity in other property sets.

76. The method of claim 75 wherein the combining of step (b) includes:
   (ab) merging different properties in the property sets in the plurality of property-sets in the plurality of dynamically configurable types to implement a software solution to the problem based on precedence, wherein the precedence identifies the property that is the result of the merge.

77. The method of claim 63 wherein step (n) includes the steps of:
   (ac) defining and creating for each property, in each property set, a feature set containing a plurality of features; wherein each feature set defines combinable characteristics of the associated property;
   (ad) defining and creating for each feature in the feature set, a feature kind which defines a kind of combinable characteristic that the feature represents in the associated property; and
   (ae) defining and creating how the feature of the associated property will be combined in step (b) with features of the same feature kind in other properties having the same identity in other property sets.

78. The method of claim 77 wherein step (ad) includes:
   (af) defining and creating configuration feature kinds that represent transactional characteristics of a property.

79. The method of claim 77 wherein step (ad) includes:
   (ag) defining and creating configuration feature kinds that represent event handling characteristics of a property.

80. The method of claim 77 wherein step (ad) includes:
   (ah) defining and creating configuration feature kinds that represent user interface visualization and event handling characteristics of a property.

81. The method of claim 77 wherein the combining of step (b) includes:
   (ai) merging different features of the properties in the property sets in the plurality of property-sets in the plurality of dynamically configurable types to implement a software solution to the problem.

82. The method of claim 77 wherein step (ae) includes the step of:
   (aj) defining and creating, for each feature in each feature set, a precedence which determines which feature will be chosen during the combining of step (b), from among features of the same kind in properties of the same identity in other property sets.

83. The method of claim 82 wherein the combining of step (b) includes:
   (ak) merging different features of the properties in the property sets in the plurality of property-sets in the plurality of dynamically configurable types to implement a software solution to the problem based on precedence, wherein the precedence identifies the feature that is the result of the merge.

84. The method of claim 83 wherein the combining of step (b) includes:
   (al) sharing an identity for the properties being merged among a common set of identities based on a shared identity in a common set of identities defined by a union of identities of all the pluralities of property sets from each of a set of those DCTs that are on an inclusive path from a specific DCT to a most general DCT wherein the DCTs are disposed in a hiearchy.

85. An apparatus for executing dynamically configurable software structures comprising:
   (a) a plurality of dynamically configurable objects that each represent a run-time instantiation of a dynamic configurable type each having an identity;
   (b) a plurality of dynamically configurable relationships in each dynamically configurable object, each of which defines a coupling between one dynamically configurable object and another;
   (c) one or more dynamically configurable object networks which include an arrangement of some of the plurality of dynamically configurable objects based on the associated dynamically configurable relationships, each dynamically configurable object network further having a root position, and each dynamically configurable object network further operable to manage the generation, propagation, and reception of events within each dynamically configurable object network;
   (d) one or more dynamically configurable action objects which are disposed at the root position of the dynamically configurable object network and operable to control operations performed within the dynamically configurable object network;
   (e) a persistence service which provides for storing, querying, retrieval and updating of the dynamically configurable objects to and from a persistent data storage system;
   (f) a transaction service which provides transactional capabilities for the plurality of dynamically configurable objects;
   (g) a factory service which provides for the creation of the dynamically configurable objects and the retrieval of the dynamically configurable objects based on their identity from the persistence service;
   (h) a client process;

(i) a session service which provides authentication and connection management for the client process to interact with the dynamically configurable software structures;

(j) a manifestation service which provides to the client process an abstracted representation of dynamically configurable action objects and forwards events generated by the client process to the represented dynamically configurable object network;

(k) a rules service which provides for mapping of events to method invocations on dynamically configurable objects; and (l) a configuration service which configures and re-configures the dynamically configurable objects.

86. An apparatus for developing dynamically configurable software systems (DCSS) comprising:

(a) means for defining, one or more dynamically configurable types (DCTs) each with an associated plurality of collections of semantics, wherein the one or more DCTs are collectively representative of a software solution to a problem, wherein the one or more DCTs are used to model the run-time behavior of dynamically configurable objects (DCOs) which are instances of the one or more DCTs; and (b) means for using the one or more DCTs to create a software solution to a problem.

87. An article of manufacture comprising a computer usable medium having a computer readable program code embodied in said medium for developing and executing dynamically configurable software, the computer readable program code in said article of manufacture comprising:

(a) computer readable instructions for enabling the computer to allow defining and creating of one or more dynamically configurable types (DCTs) each with an associated plurality of defined collections of semantics, wherein the DCTs are collectively representative of a software solution to a problem, wherein the DCTs are used to model the run-time behavior of dynamically configurable objects (DCOs) which are instances of the DCTs; and (b) computer readable instructions for enabling the computer to allow coupling the DCTs to predefined software services that at run-time will support DCOs including the ability to combine the defined collections of semantics together in permutations at run-time in order to allow the DCOs to have different semantics over time to serve different purposes so that a software solution based on the DCOs allows dynamic configurability.

88. An apparatus for developing dynamically configurable software systems (DCSS) comprising:

(a) means for defining and creating, one or more dynamically configurable types (DCTs) each with an associated plurality of defined collections of semantics, wherein the DCTs are collectively representative of a software solution to a problem, wherein the DCTs are used to model the run-time behavior of dynamically configurable objects (DCOs) which are instances of the DCTs; and (b) means for coupling the DCTs to predefined software services that at run-time will support DCOs including the ability to combine the defined collections of semantics together in permutations at run-time in order to allow the DCOs to have different semantics over time to serve different purposes so that a software solution based on the DCOs allows dynamic configurability.

89. A transmission medium comprising a computer accessible medium transmitting a computer readable program code embodied in said transmission for developing and executing dynamically configurable software, the computer readable program code in said transmission medium comprising:

(a) computer readable instructions for enabling the computer to allow defining and creating of one or more dynamically configurable types (DCTs) each with an associated plurality of defined collections of semantics, wherein the DCTs are collectively representative of a software solution to a problem, wherein the DCTs are used to model the run-time behavior of dynamically configurable objects (DCOs) which are instances of the DCTs; and (b) computer readable instructions for enabling the computer to allow coupling the DCTs to predefined software services that at run-time will support DCOs including the ability to combine the defined collections of semantics together in permutations at run-time in order to allow the DCOs to have different semantics over time to serve different purposes so that a software solution based on the DCOs allows dynamic configurability.

* * * * *